(12) United States Patent
Thomsen

(10) Patent No.: US 10,945,494 B1
(45) Date of Patent: Mar. 16, 2021

(54) CLASP

(71) Applicant: Johannes Thomsen, Venice, FL (US)

(72) Inventor: Johannes Thomsen, Venice, FL (US)

(*) Notice: Subject to any disclaimer, the term of this patent is extended or adjusted under 35 U.S.C. 154(b) by 0 days.

(21) Appl. No.: 16/593,683

(22) Filed: Oct. 4, 2019

Related U.S. Application Data

(60) Continuation-in-part of application No. 15/953,721, filed on Apr. 16, 2018, now Pat. No. 10,433,621, which is a division of application No. 15/133,987, filed on Apr. 20, 2016, now Pat. No. 9,943,142.

(51) Int. Cl.
*A44B 99/00* (2010.01)
*A44B 17/00* (2006.01)

(52) U.S. Cl.
CPC ........ *A44B 99/005* (2013.01); *A44B 17/0011* (2013.01); *A44B 17/0041* (2013.01); *A44B 17/0076* (2013.01)

(58) Field of Classification Search
CPC ............ A44B 17/0011; A44B 17/0041; A44B 17/0076; A44B 99/005
See application file for complete search history.

(56) References Cited

U.S. PATENT DOCUMENTS

| | | | |
|---|---|---|---|
| 147,965 A | 2/1874 | Opdyke | |
| 805,674 A * | 11/1905 | Senderling | F16B 21/165 24/573.11 |
| 867,162 A | 9/1907 | Seidl | |
| 913,854 A | 3/1909 | Seidl | |
| 1,199,690 A | 9/1916 | Gillen | |
| 3,286,316 A | 11/1966 | Marosy | |
| 3,487,512 A | 1/1970 | Marosy | |
| 3,540,087 A | 11/1970 | Marosy | |
| 3,540,091 A | 11/1970 | Marosy | |
| 3,675,499 A | 7/1972 | Marosy | |
| 4,184,232 A | 1/1980 | Marosy | |
| 4,236,283 A | 12/1980 | Marosy | |
| 4,246,679 A * | 1/1981 | Monett | A44C 5/2076 24/108 |
| 4,364,155 A | 12/1982 | Synowicki | |
| 4,622,726 A * | 11/1986 | Nakamura | A44C 5/2057 24/303 |
| 5,095,594 A | 3/1992 | Marosy | |
| 5,367,891 A * | 11/1994 | Furuyama | A44C 5/2057 24/303 |
| 6,883,211 B2 * | 4/2005 | Hoshino | A44C 5/2061 24/663 |
| 7,788,774 B1 | 9/2010 | Cravey | |
| 8,578,573 B2 * | 11/2013 | Hashimoto | A44C 7/003 24/595.1 |
| 8,955,828 B2 * | 2/2015 | Campbell | H01R 13/625 256/10 |
| 9,351,544 B2 * | 5/2016 | Matsumori | A44C 25/00 |

* cited by examiner

*Primary Examiner* — Robert Sandy
*Assistant Examiner* — David M Upchurch
(74) *Attorney, Agent, or Firm* — Frijouf, Rust & Pyle, P.A.

(57) ABSTRACT

A clasp which has a primary body and a secondary body couples a first elongated member with a second elongated member. The primary body has a bore and a pin extending within the bore. The secondary body has a rod. A pin bore is within the rod and defines an interior rod wall. A groove is within the interior rod wall. A leg is coupled to the pin. A locking channel is within the interior rod wall and coupled to the groove. The leg engages with the shaped locking channel for coupling and decoupling the primary body with the secondary body.

27 Claims, 37 Drawing Sheets

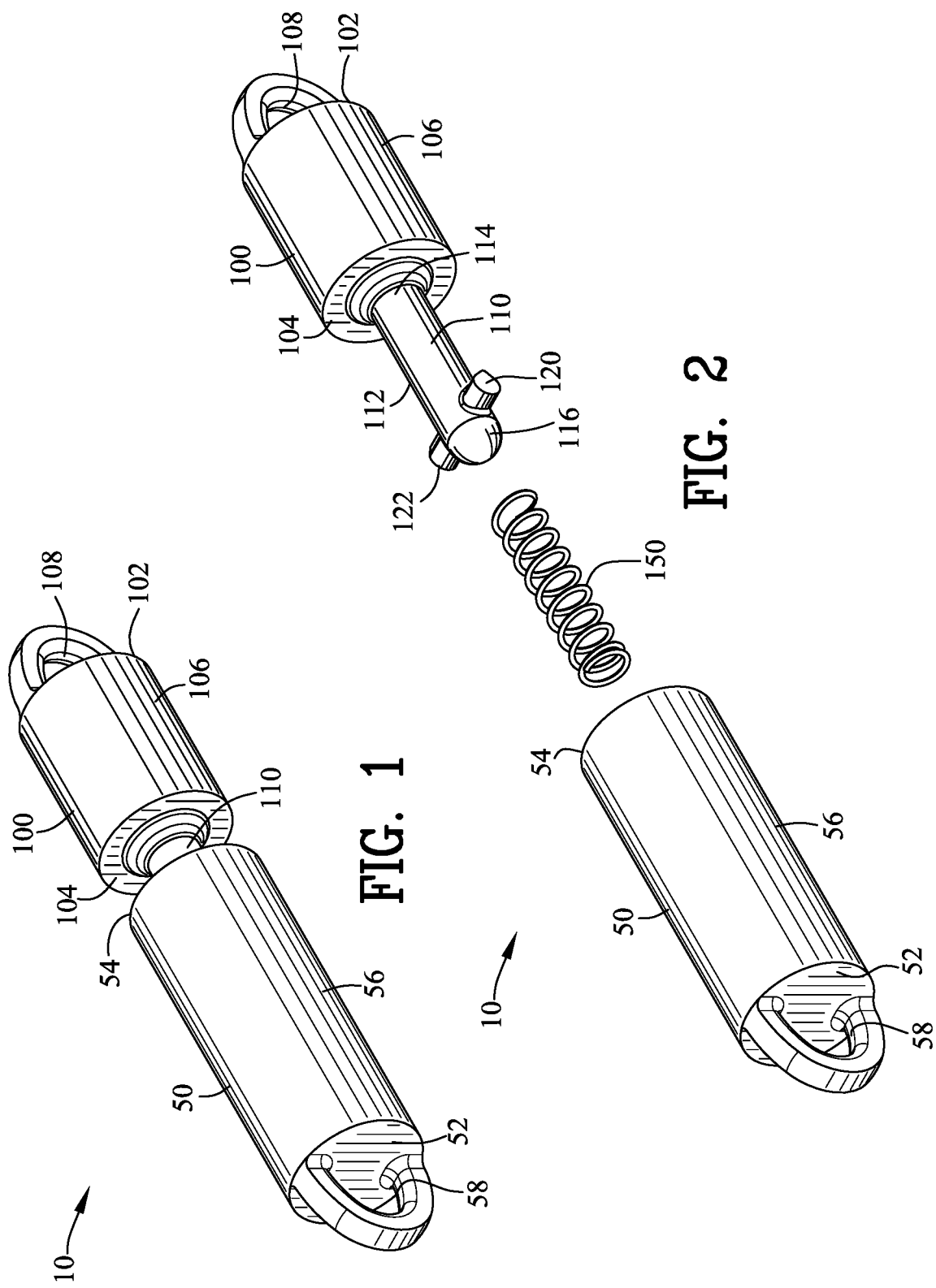

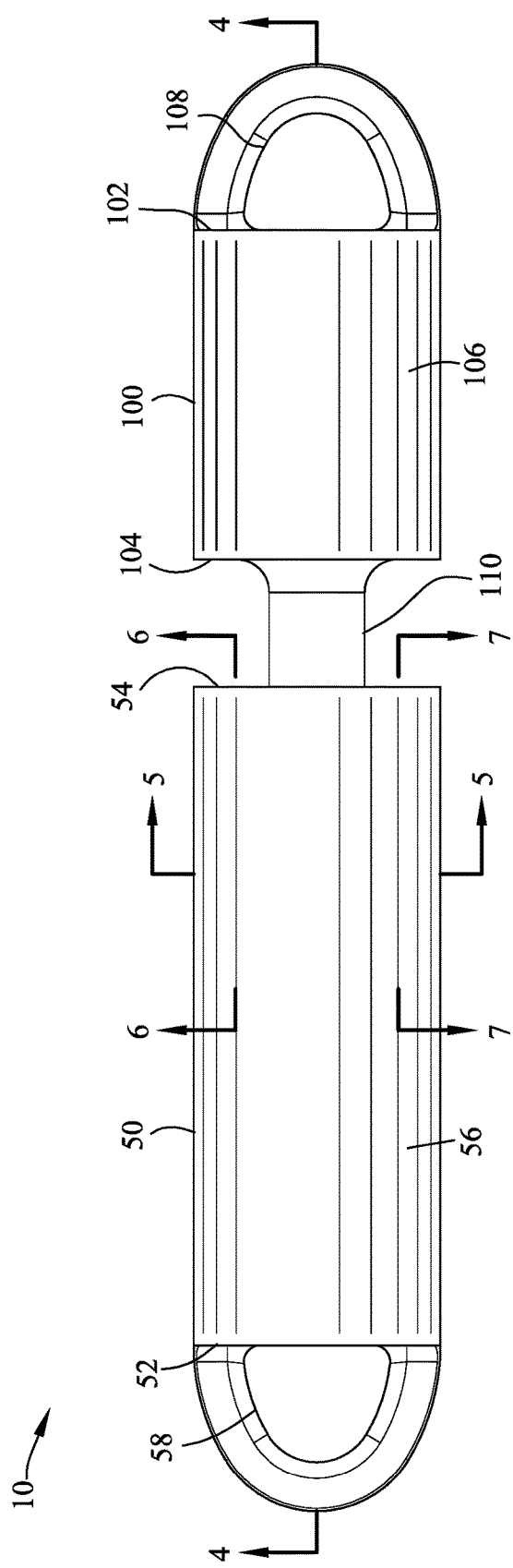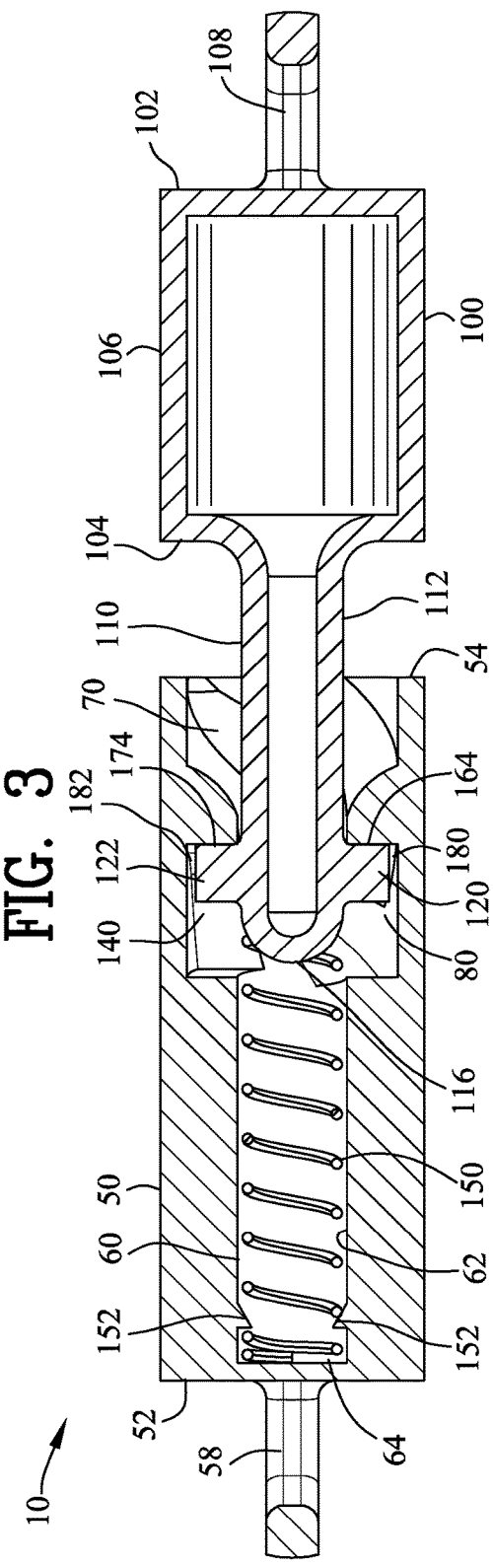
FIG. 3
FIG. 4

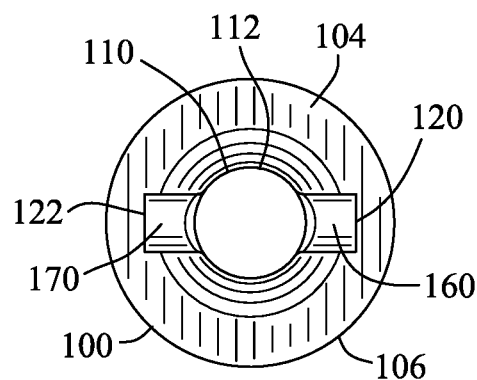 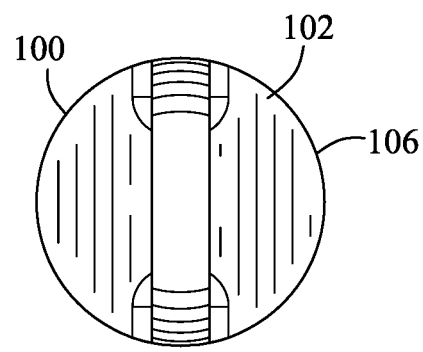
FIG. 19     FIG. 20
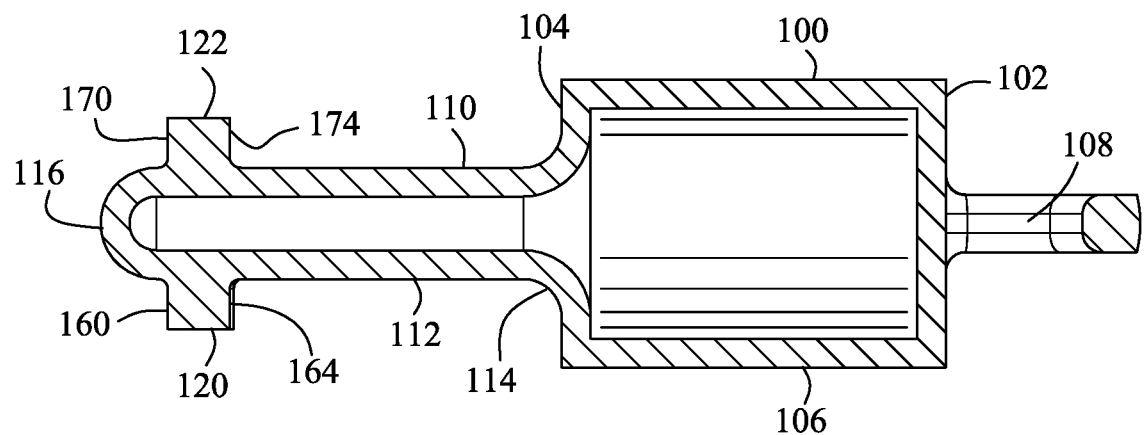
FIG. 21

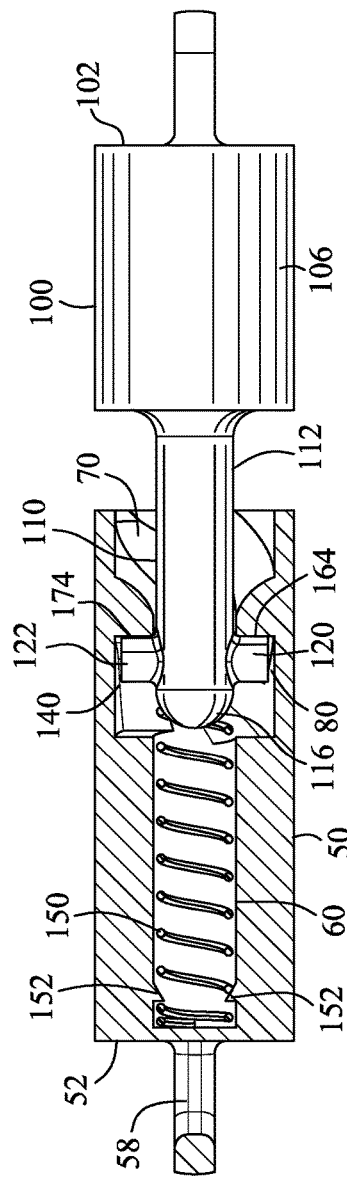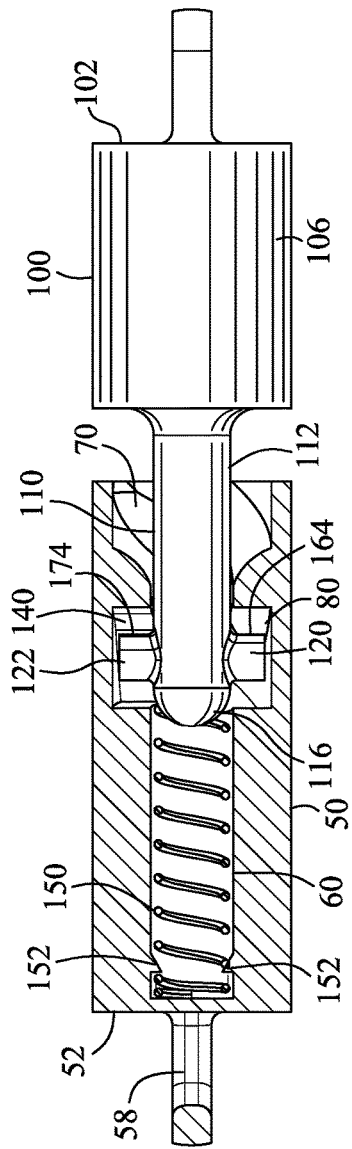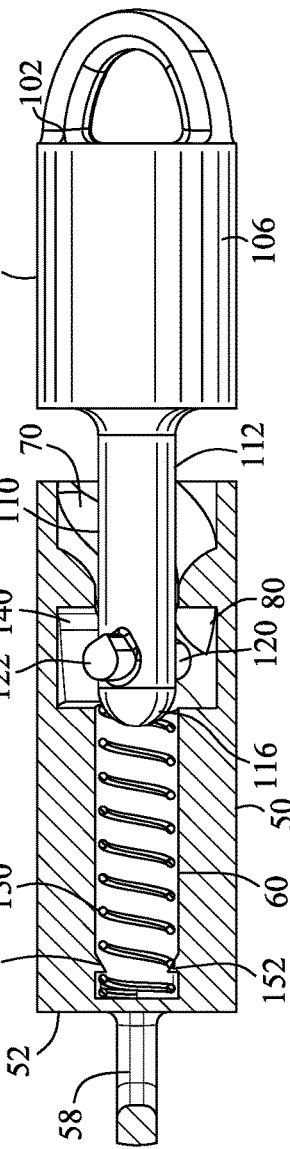

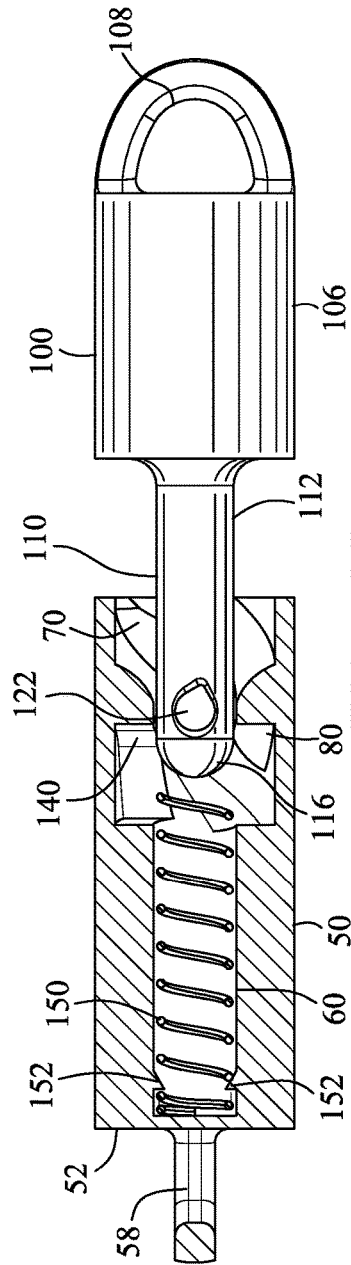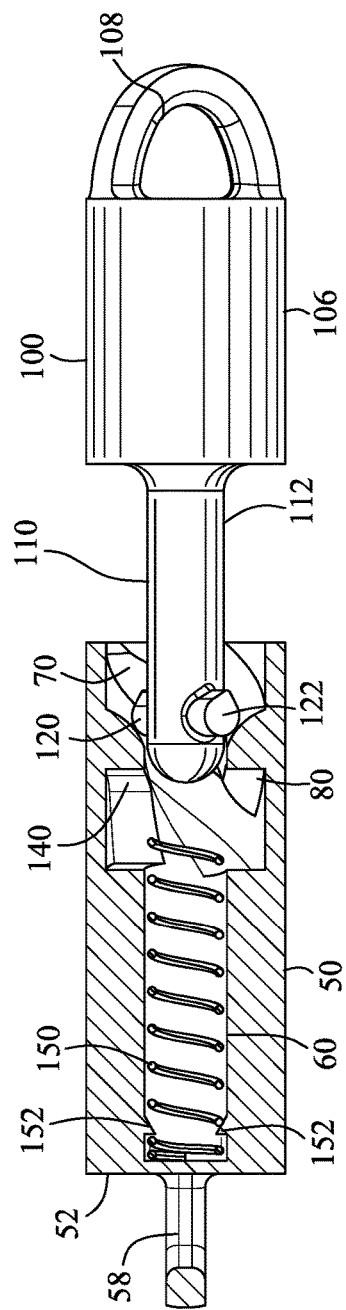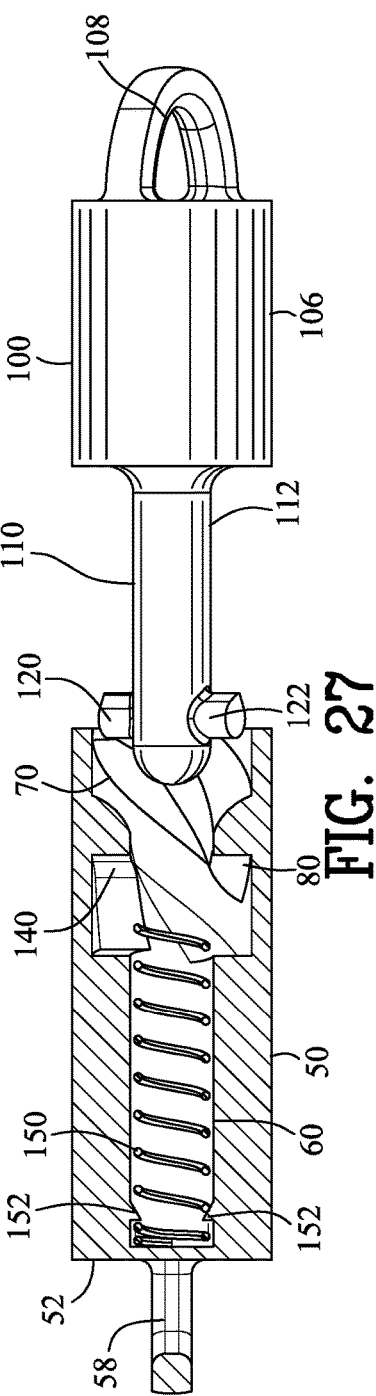

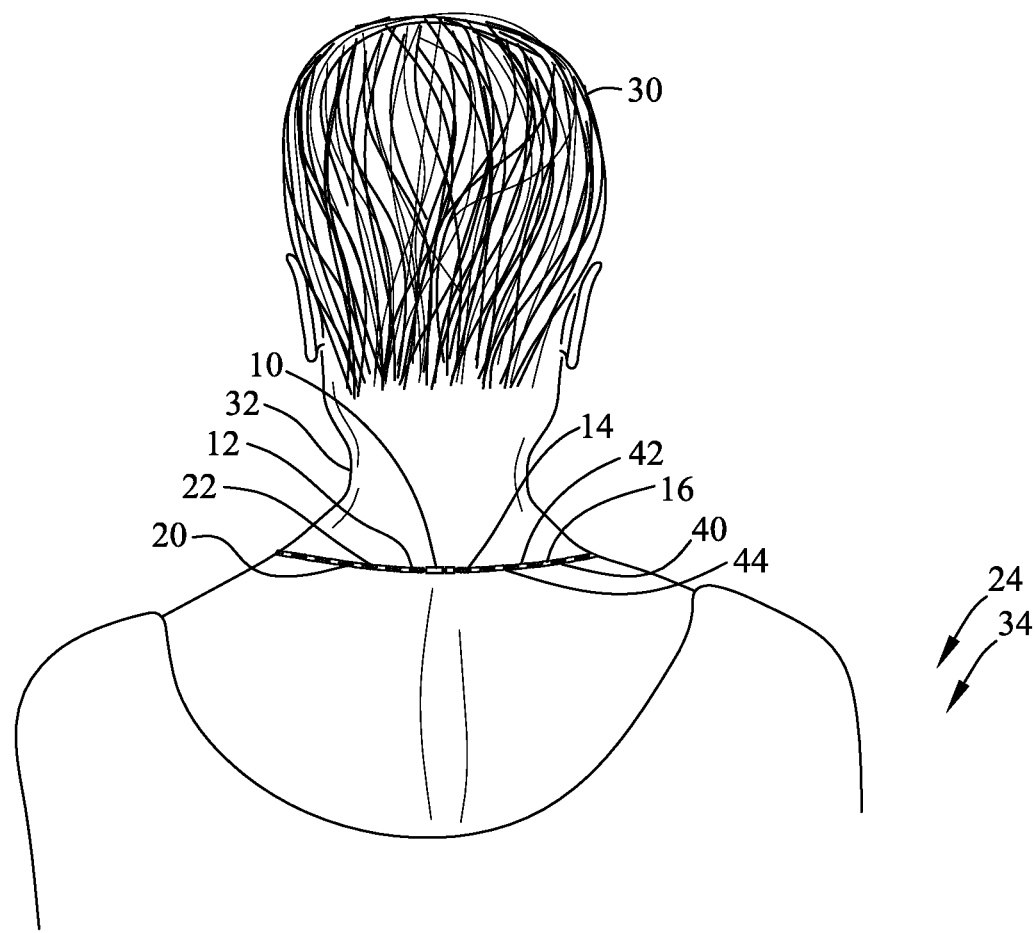
FIG. 28
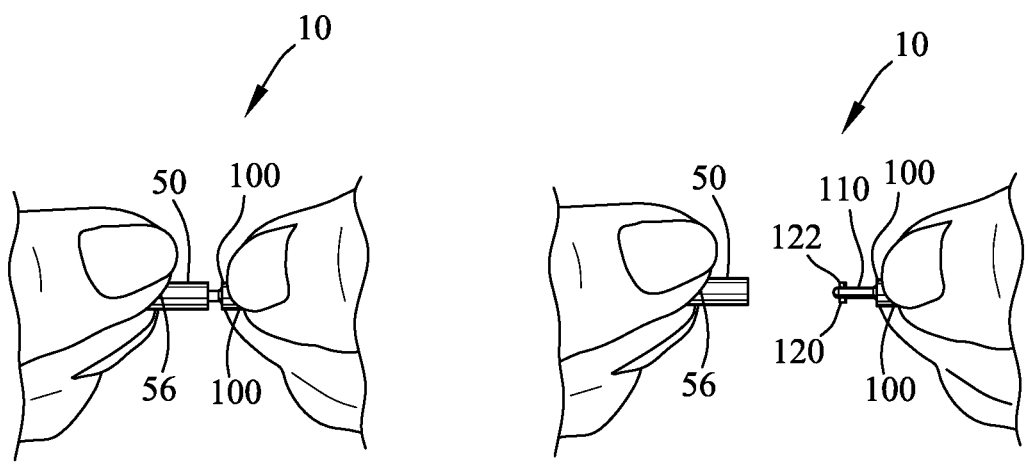
FIG. 29
FIG. 30

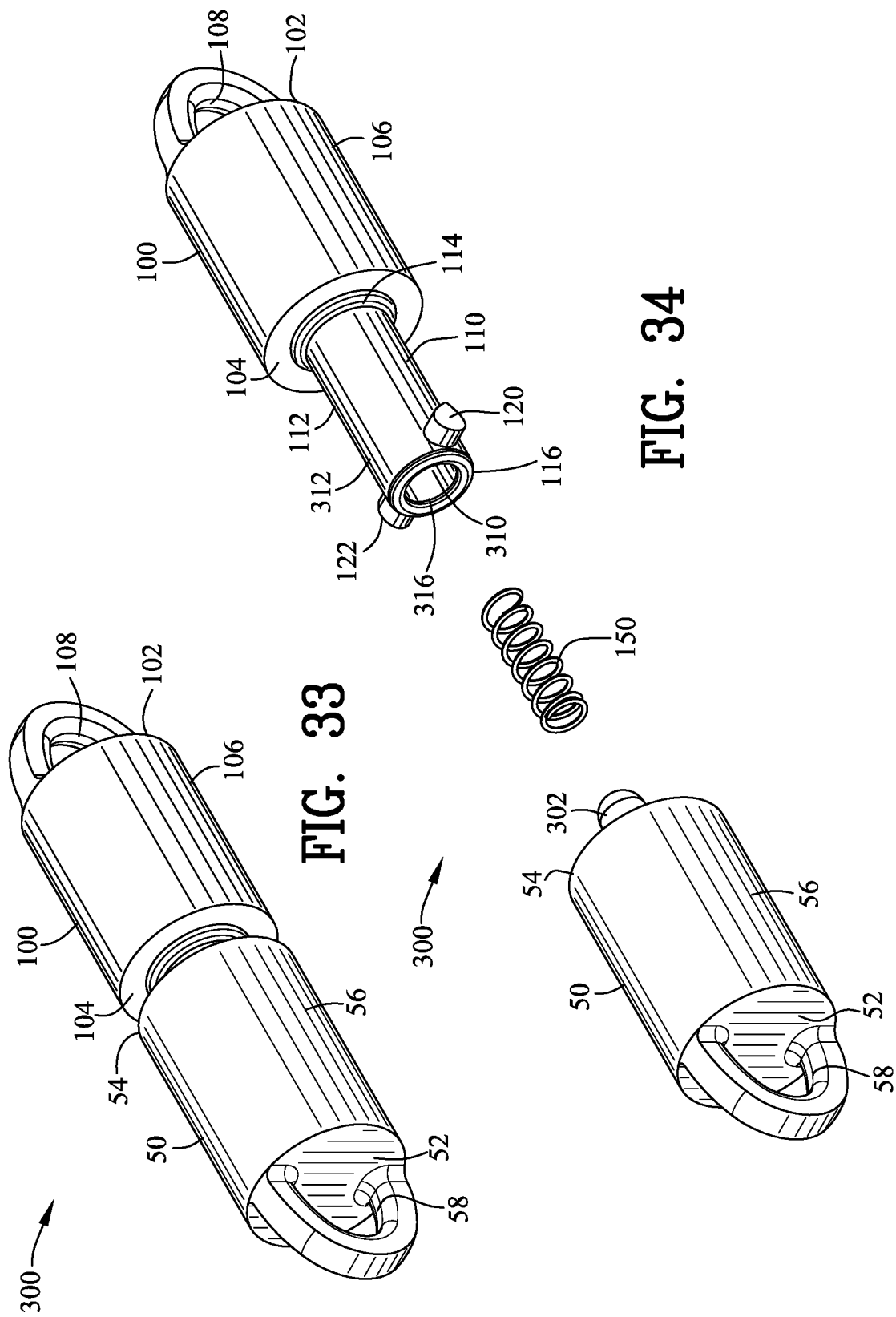

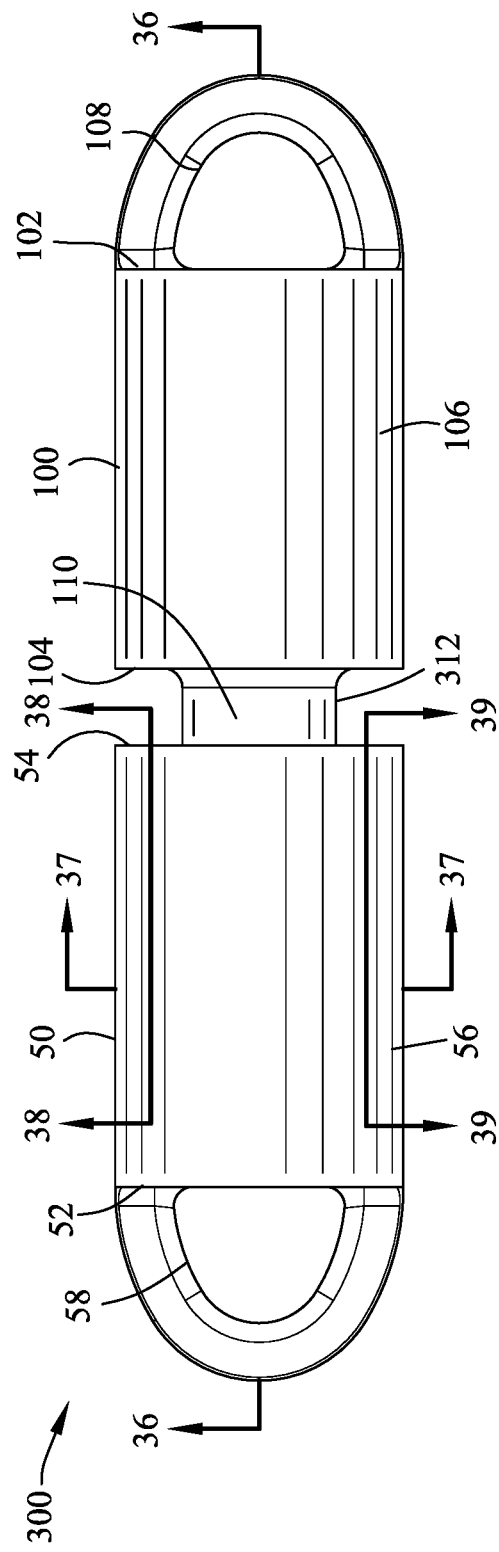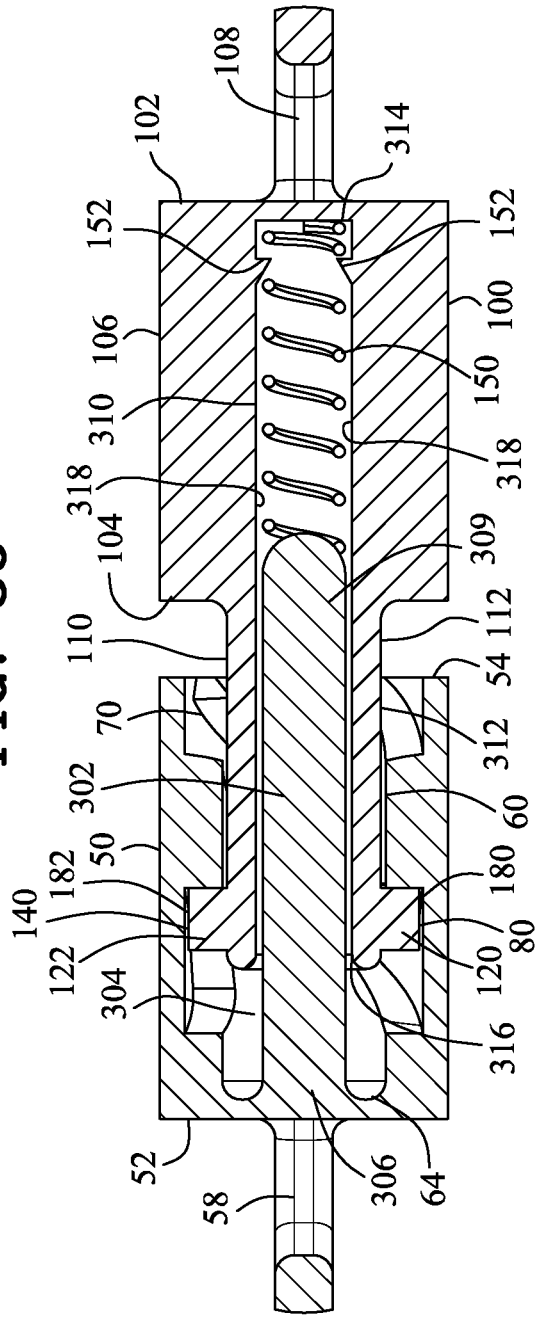

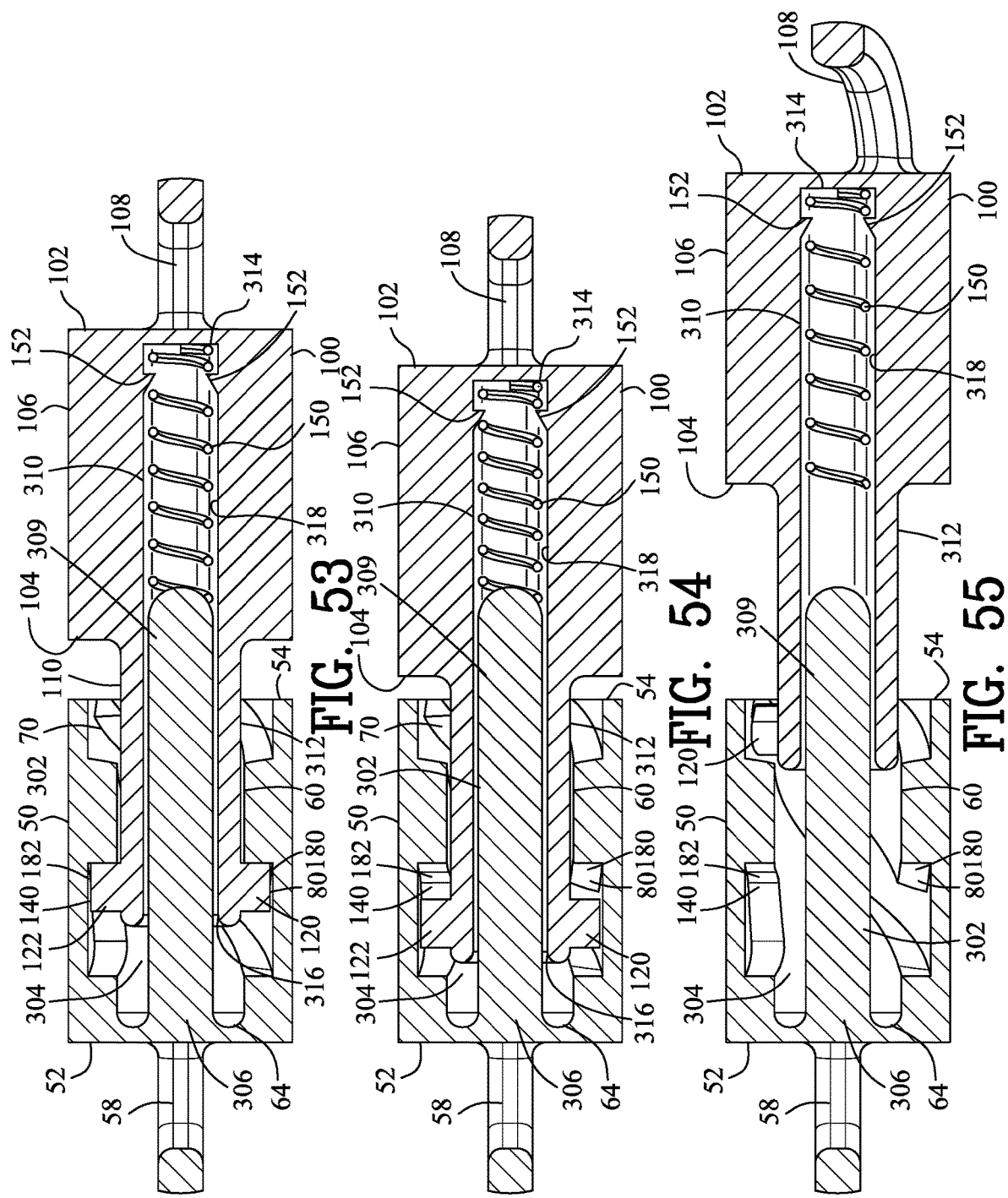

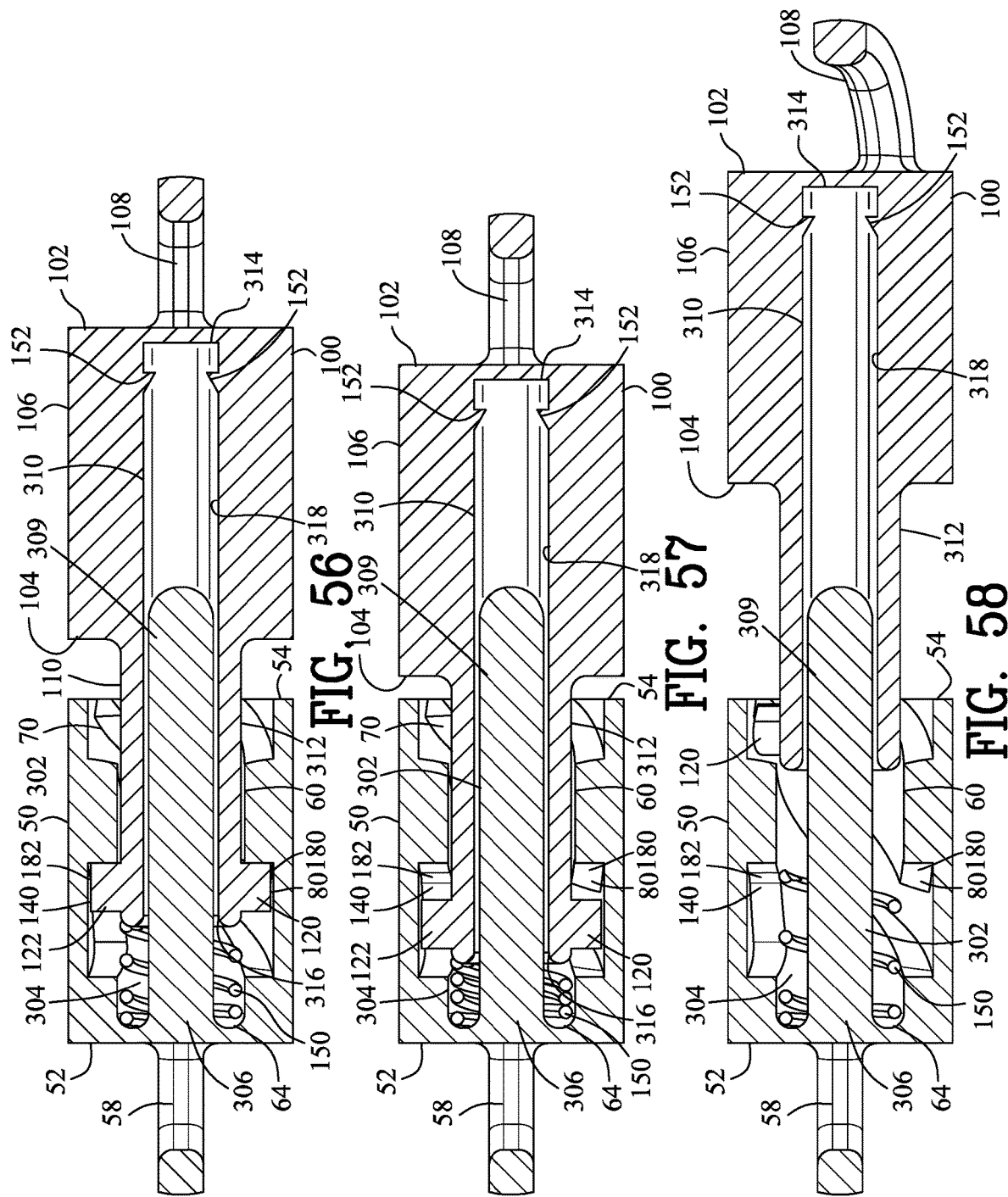

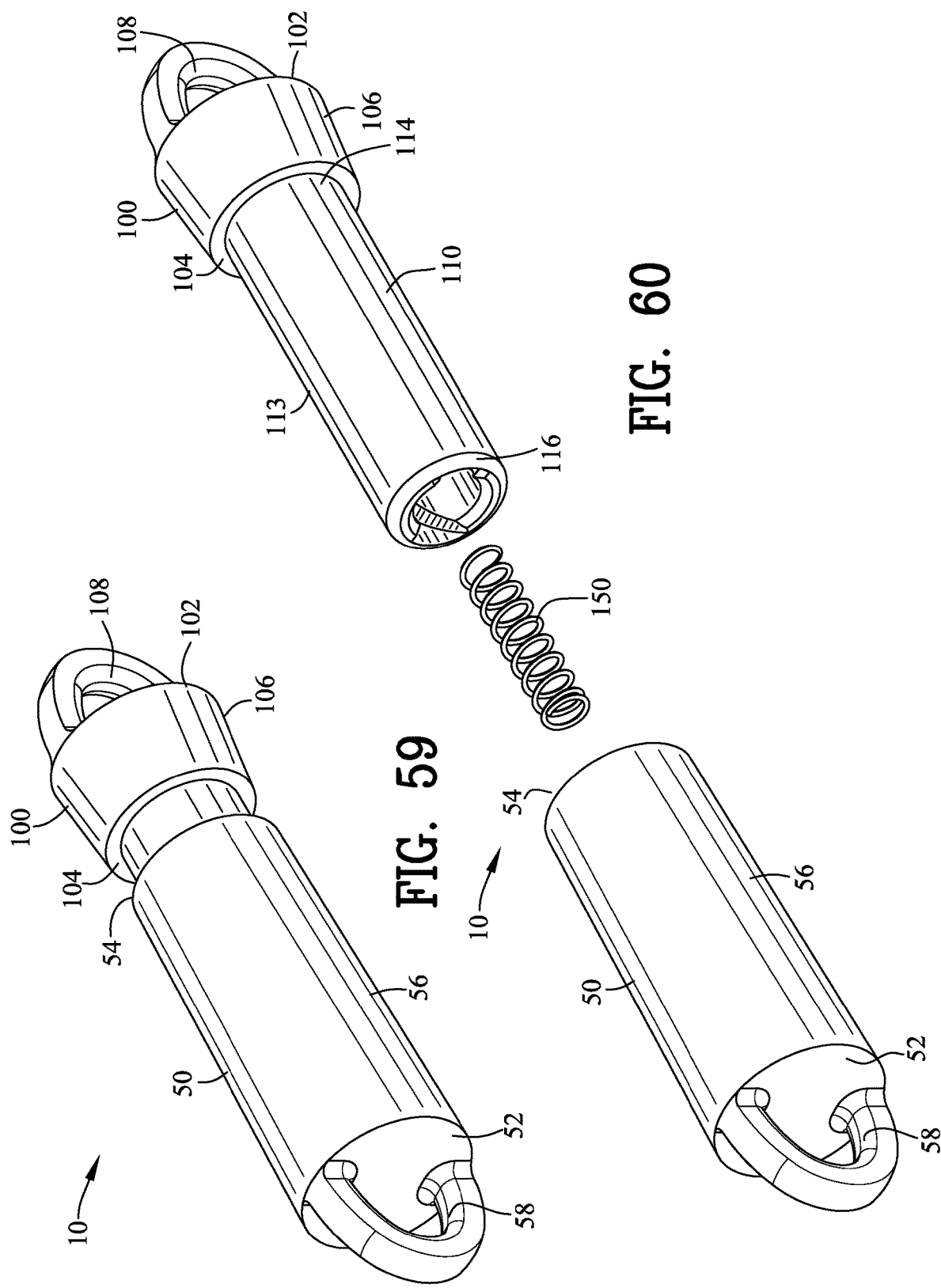

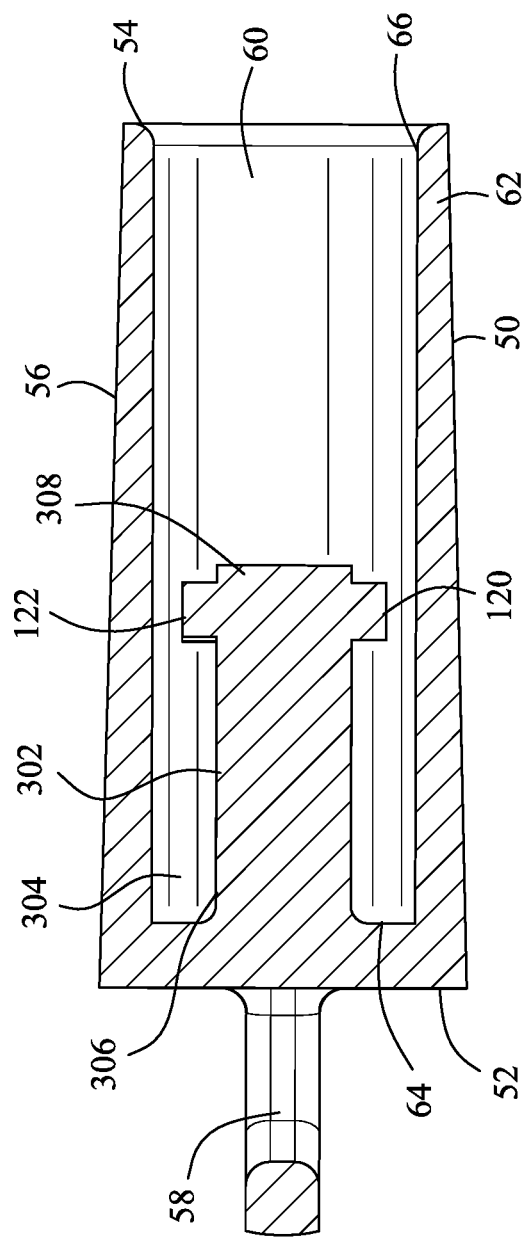
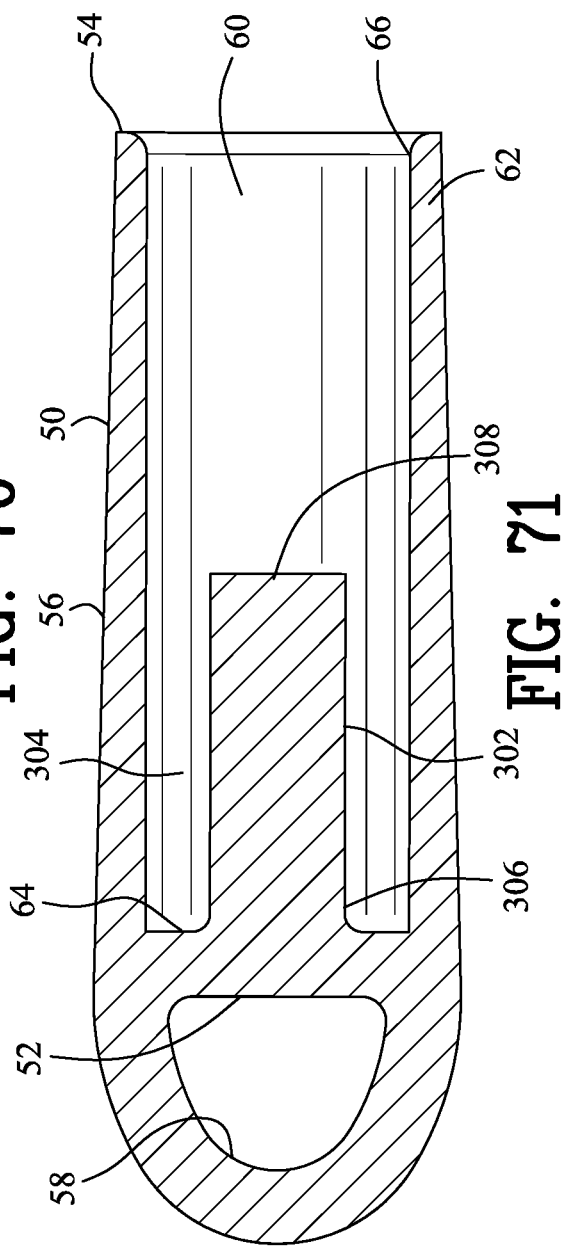

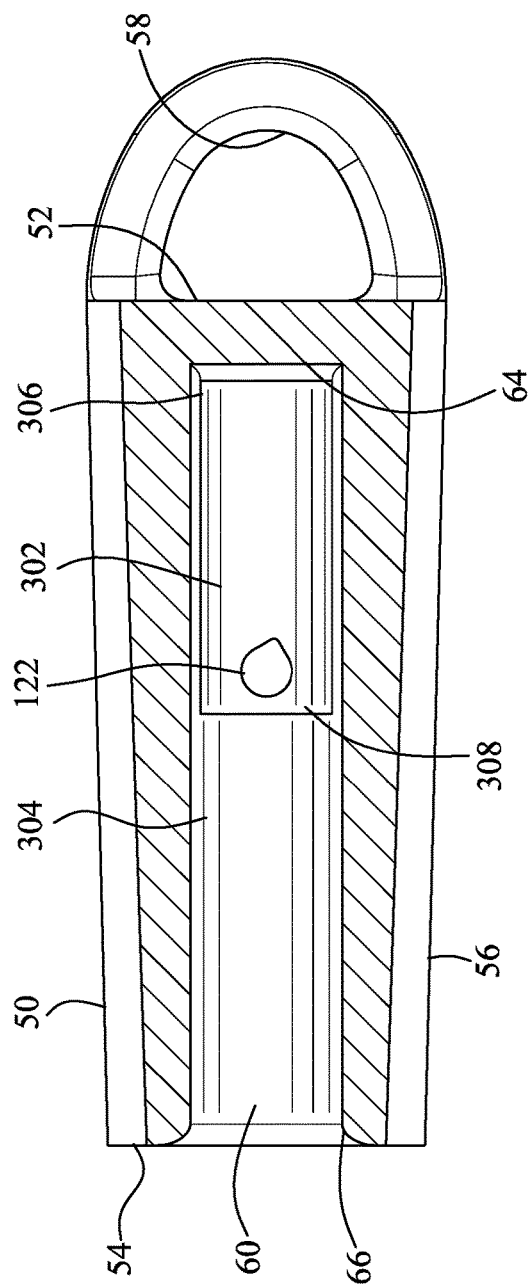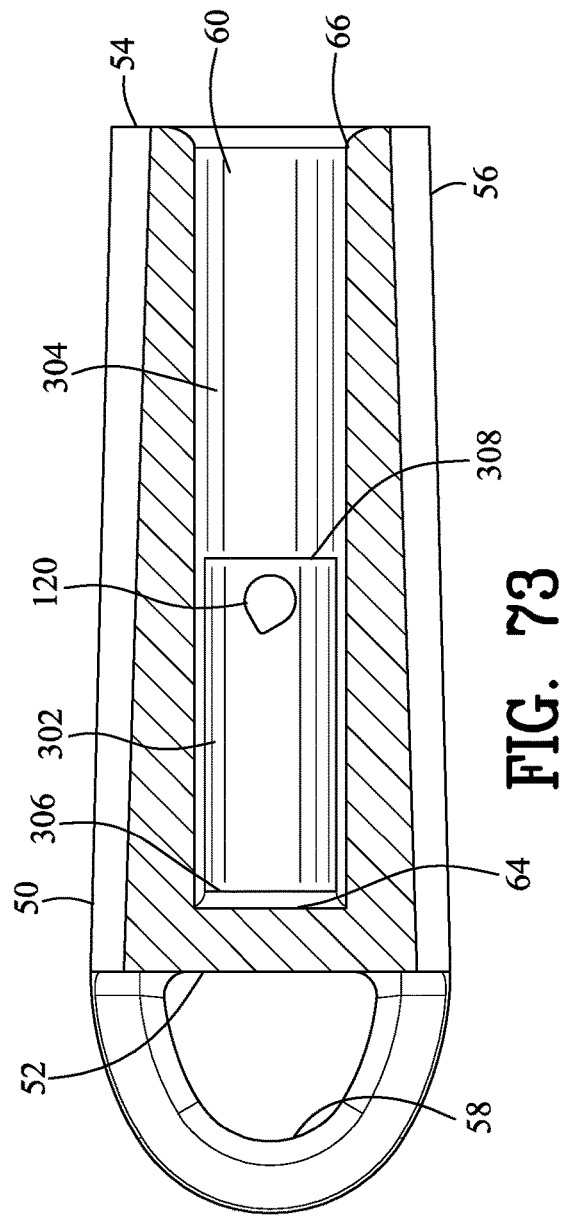

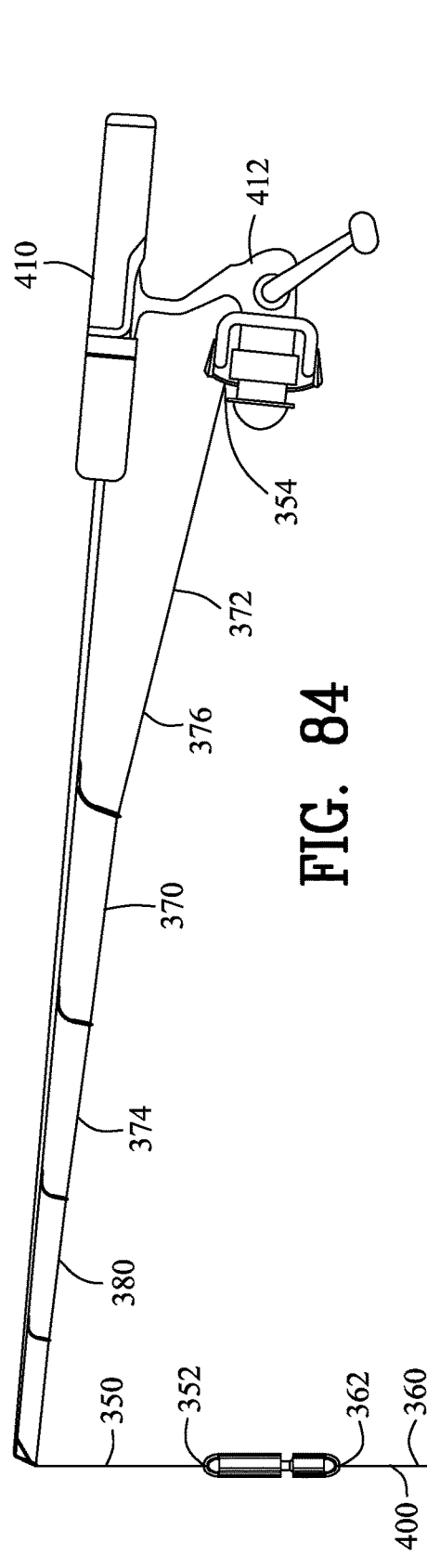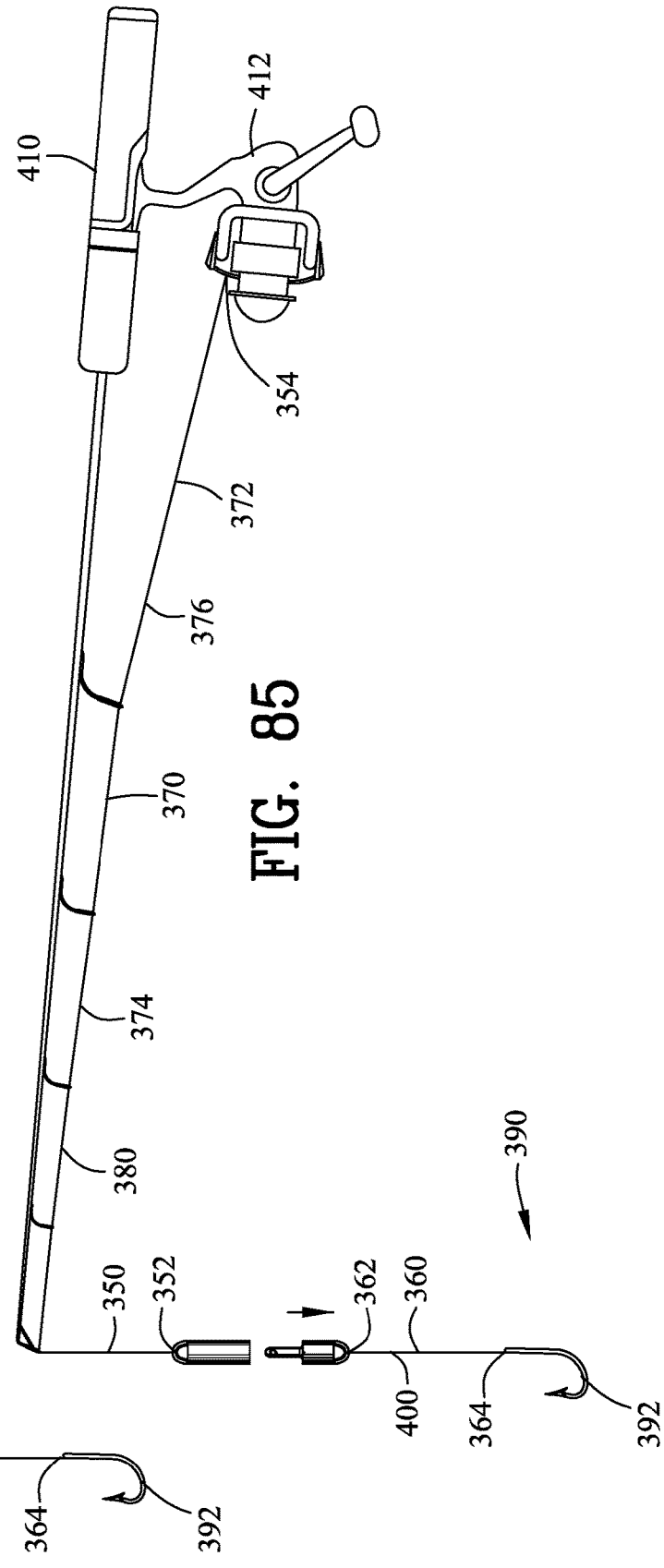

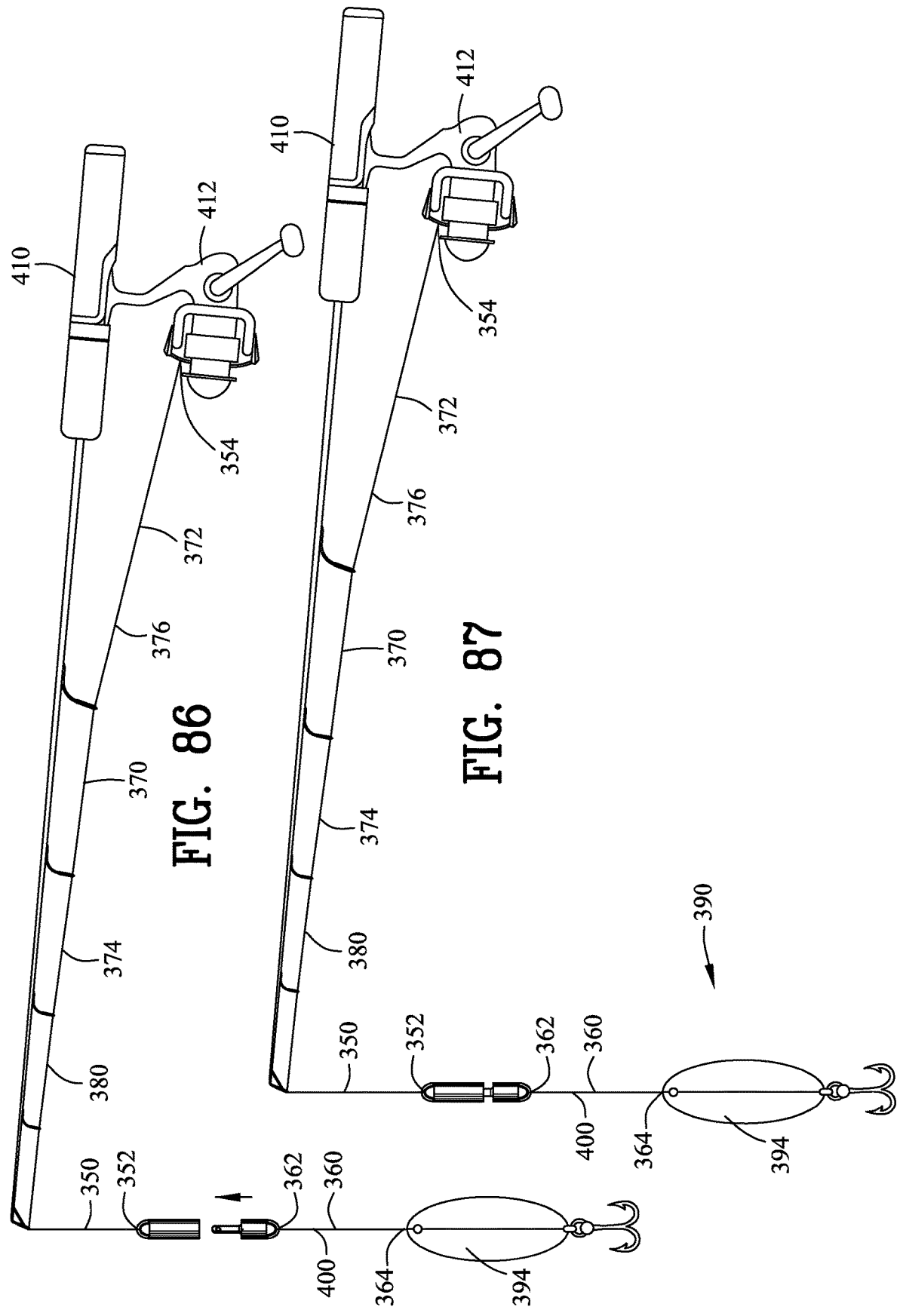

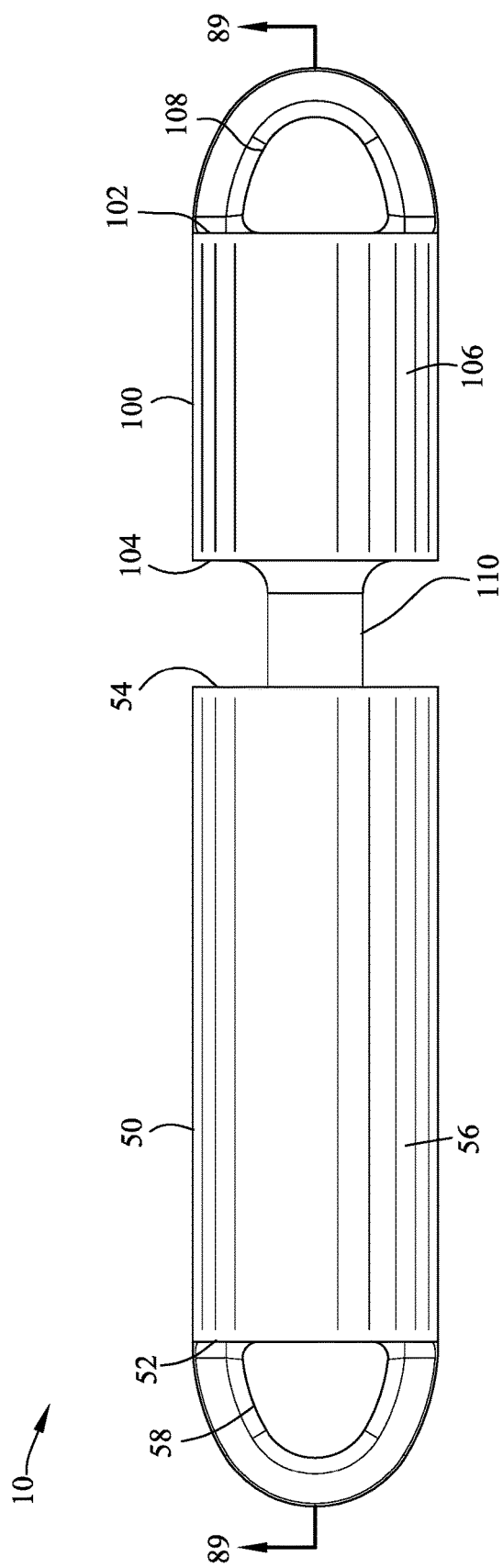
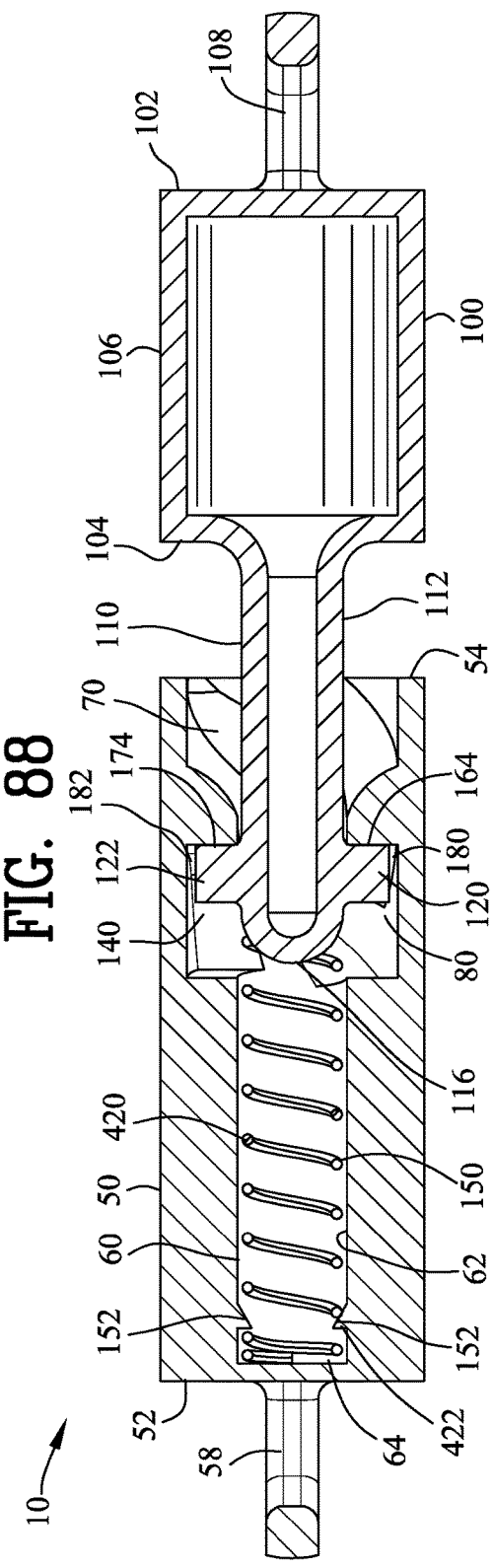
FIG. 88
FIG. 89

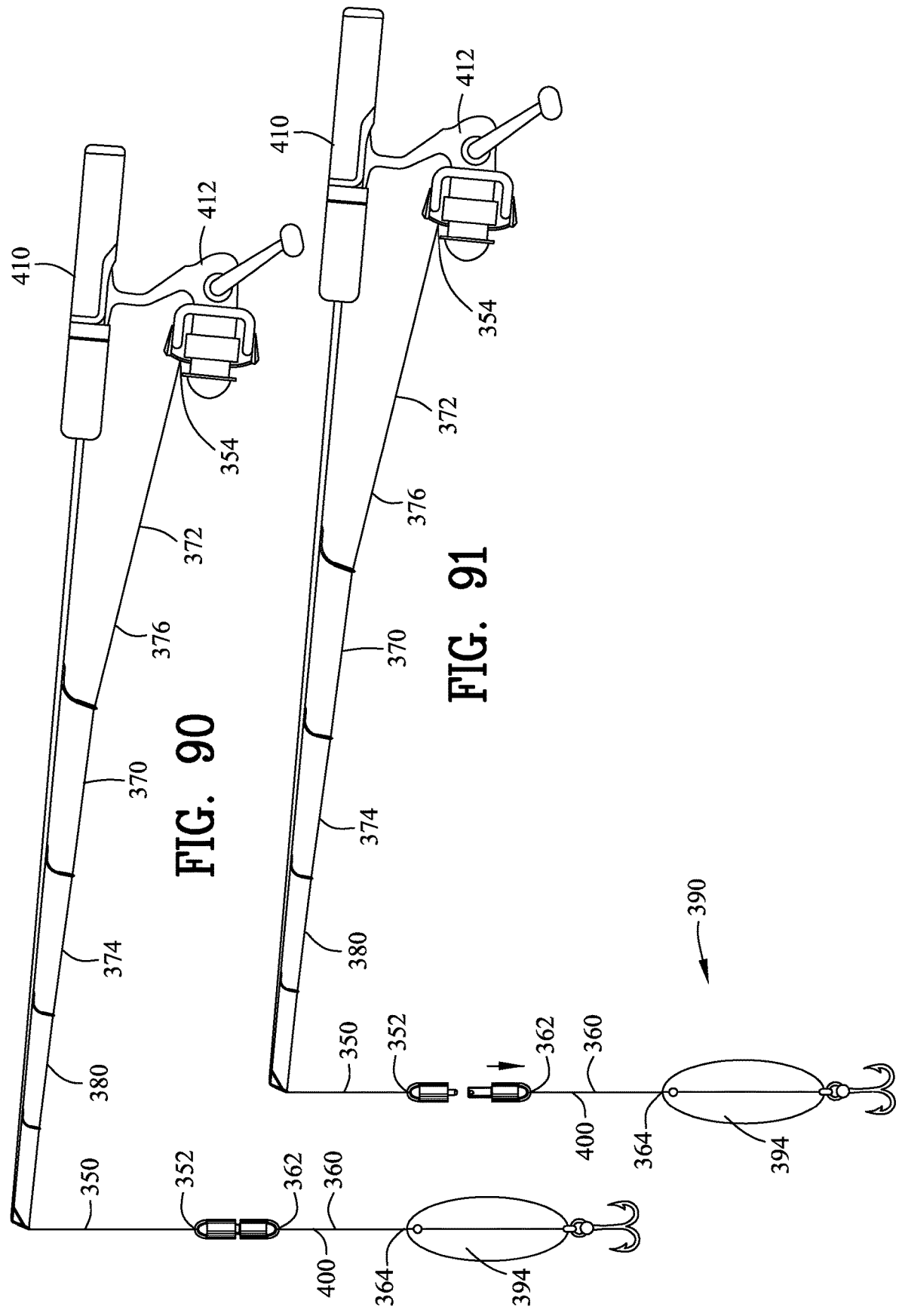

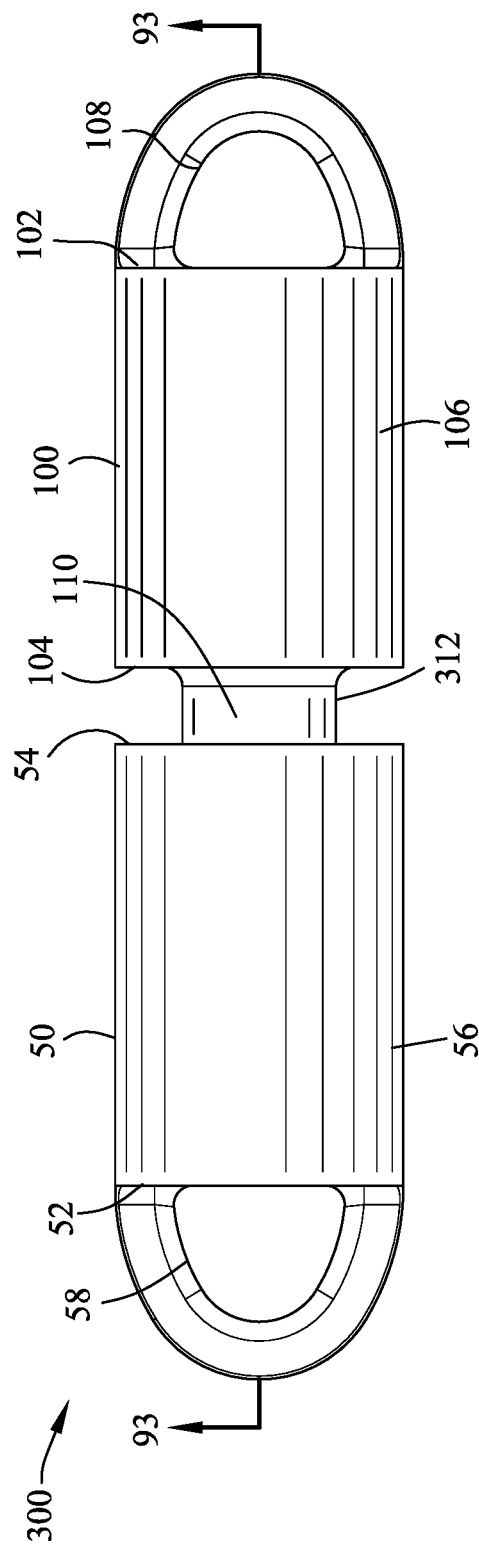
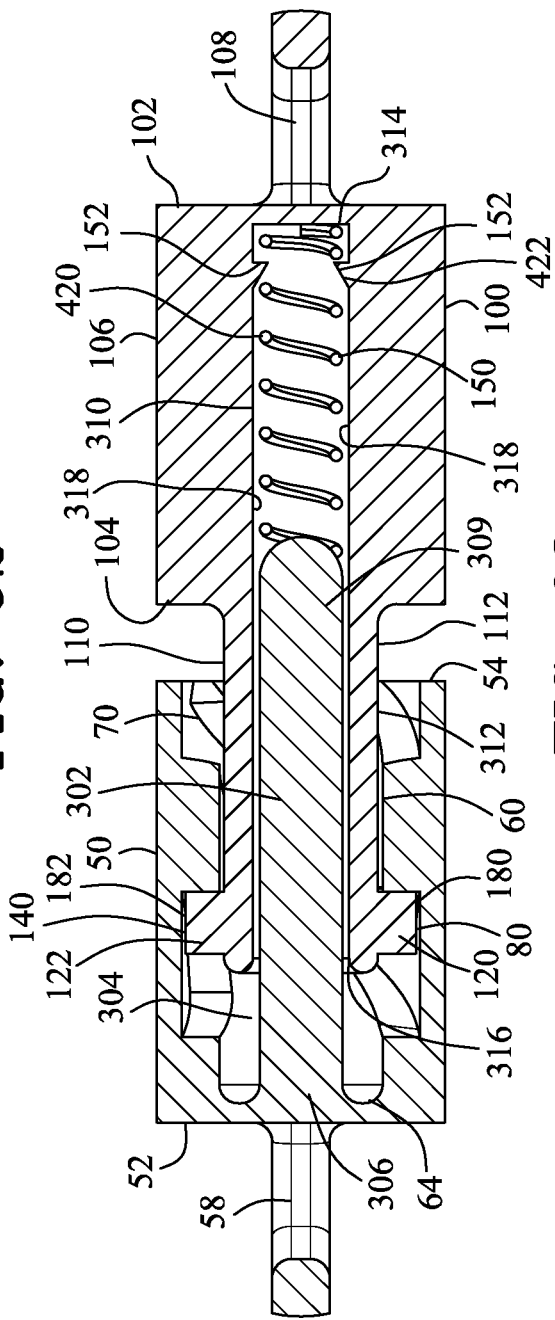
FIG. 92
FIG. 93

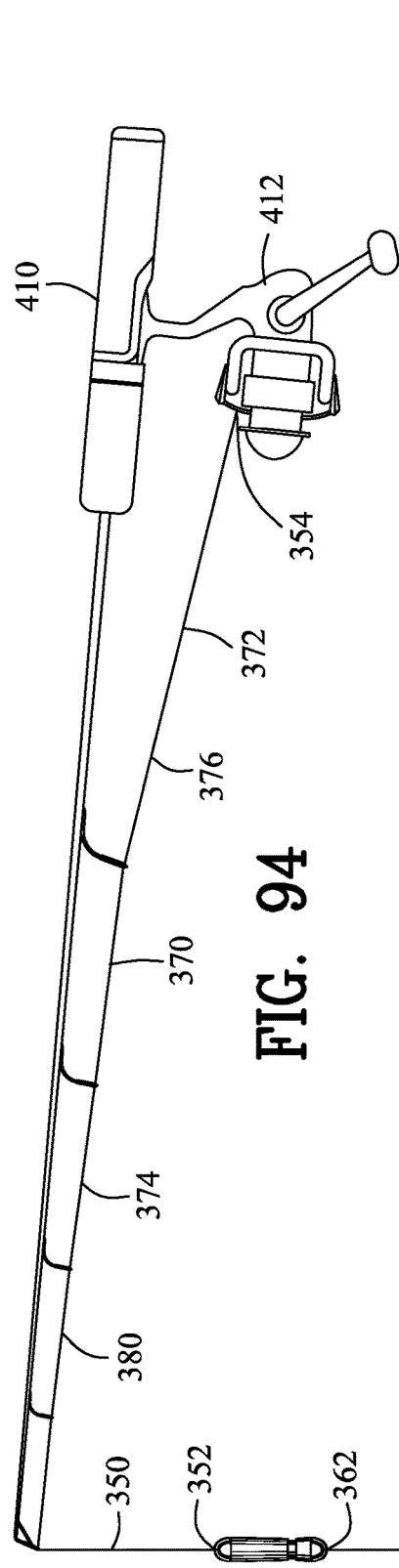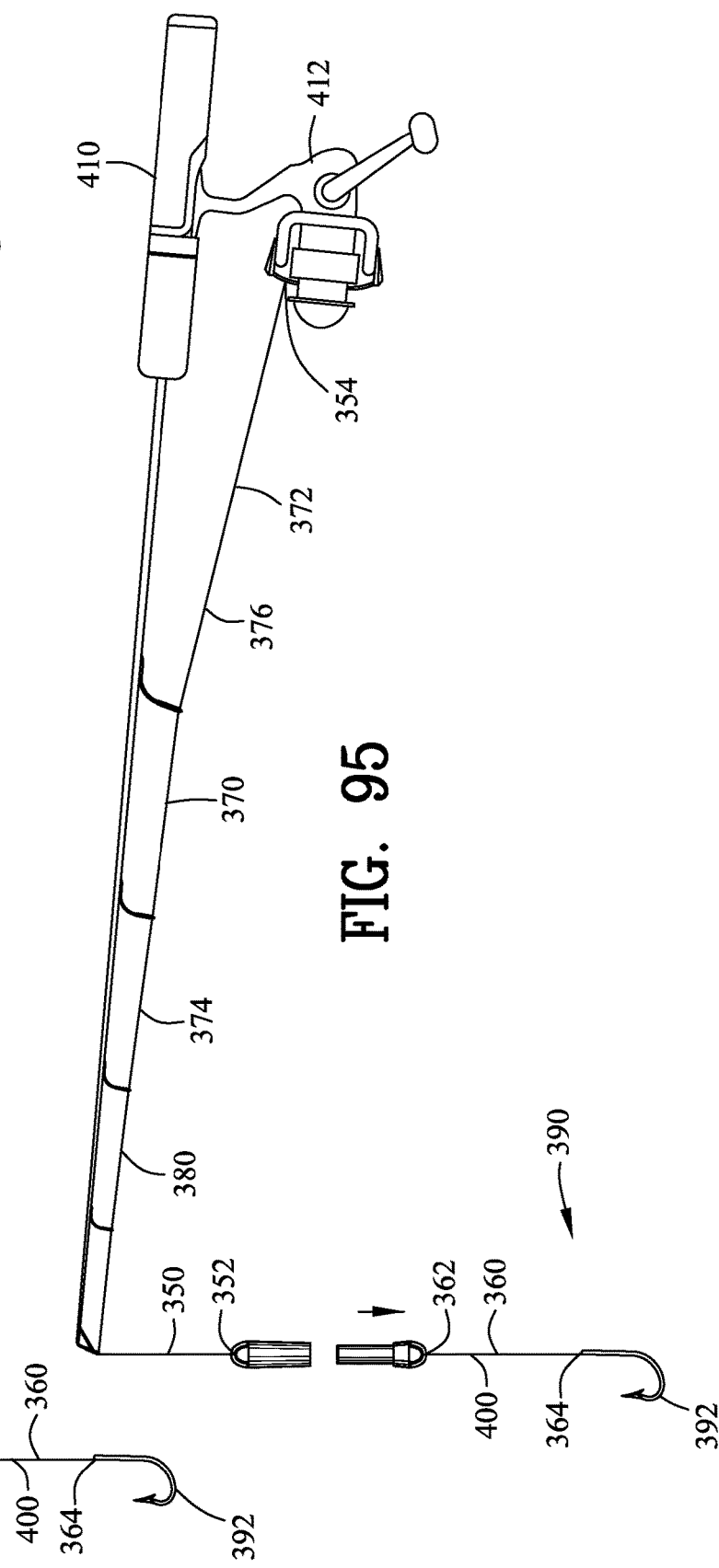

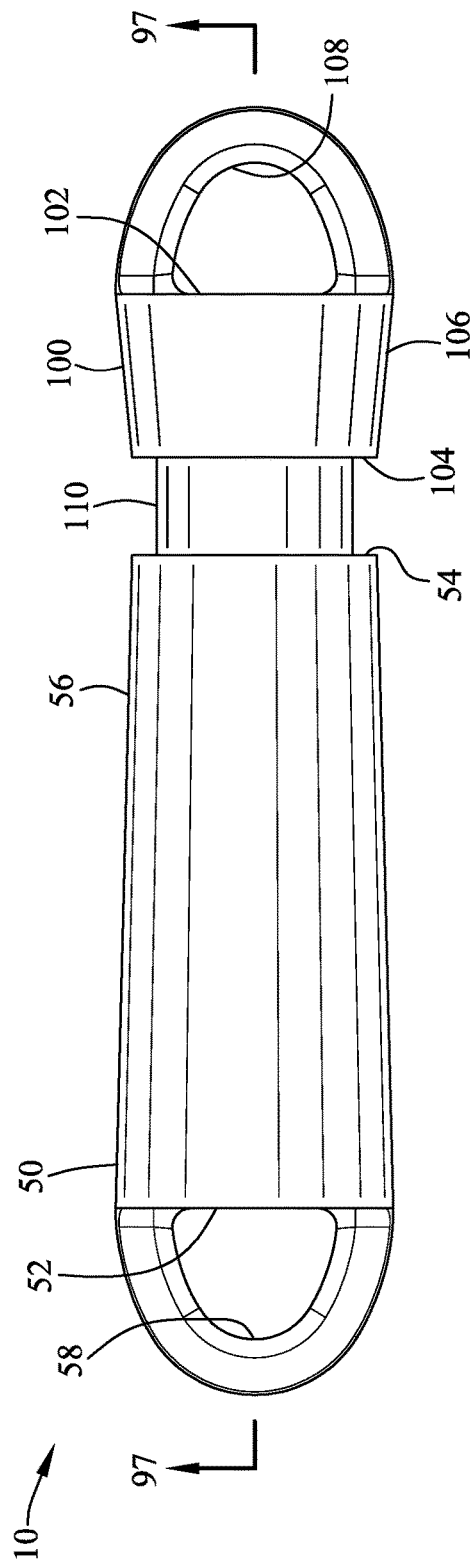
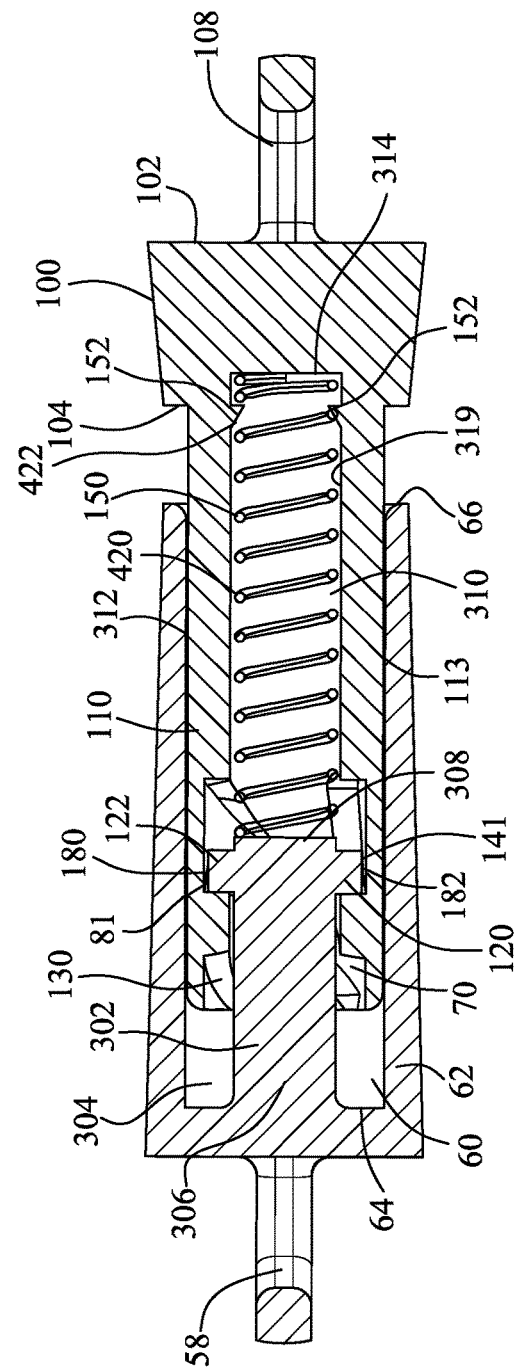
FIG. 96
FIG. 97

CLASP

CROSS-REFERENCE TO RELATED APPLICATIONS

This is a continuation-in-part of U.S. patent application Ser. No. 15/953,721 filed Apr. 16, 2018. All subject matter set forth in application Ser. No. 15/953,721 is hereby incorporated by reference into the present application as if fully set forth herein.

U.S. patent application Ser. No. 15/953,721 filed Apr. 16, 2018 is a divisional patent application of U.S. patent application Ser. No. 15/133,987 filed Apr. 20, 2016. U.S. patent application Ser. No. 15/133,987 filed Apr. 20, 2016 was issued on Apr. 17, 2018 under U.S. Pat. No. 9,943,142. All subject matter set forth in application Ser. No. 15/133,987 and U.S. Pat. No. 9,943,142 is hereby incorporated by reference into the present application as if fully set forth herein.

BACKGROUND OF THE INVENTION

Field of the Invention

This invention relates to couplers and more particularly to a clasp for coupling a first end and a second end of an elongated member.

Background of the Invention

Around 400 BC, necklaces utilizing a ring and hook as a clasp began to replace the ribbon or string formerly used for tying a necklace or bracelet in place. In the late 18th century, metal spring rings (aka bolt ring) were being used as clasps. A hook and box clasp was developed in the 1920's. The pin and barrel clasp, wherein the pin is inserted into a hollow cylinder or barrel has undergone many variations and refinements through the years. All clasps face the problem of having the necklace wearer affix the clasp behind their head, thereby relying only on feel and touch to accomplish the task. If one attempts to rotate the necklace such that the clasp is in front of the wearer and a mirror is employed to assist in affixing the clasp, difference between the feel of the clasp and the reversed visual mirror image tends to cause confusion between the visual and tactile senses. The pin and barrel type class also has the need for a locking means to be provided to prevent the clasp from inadvertently opening.

There have been many in the prior art who have attempted to solve these problems with varying degrees of success. None, however completely satisfies the requirements for a complete solution to the aforestated problem. The following U.S. Patents are attempts of the prior art to solve this problem.

U.S. Pat. No. 147,965 to Opdyke discloses a necklace-clasp, with the locking and unlocking of which is effected by the aid of a device which shall perform its duty without detracting from the symmetrical finish of the exterior. The clasp is made in the manner where the clasp comprises two portions. The first portion consists of a hollow cylinder, closed at the outer end, where there is an eye, for receiving one end of the necklace or chain. A collar, surrounds and is secured to this cylinder, beyond the open end of which a portion of the collar projects. The second portion of the clasp consists of a cylinder, of the same diameter as the first cylinder, and has at its outer end an eye, for receiving the other end of the chain or necklace. A cylindrical projection, on this portion of the clasp is arranged to fit freely into the first cylinder, while a portion of the cylinder fits into the end of the collar. A coiled spring is placed in the end of the cylinder, and in the outer edge of this cylinder, within the collar, a slot is cut, communicating with a recess.

U.S. Pat. No. 867,162 to Seidl discloses a clasp comprising a tubular member with a slot terminating in a pocket, a plunger constructed to snugly fit within the tubular member, a lug carried by the plunger and adapted to enter the slot and seat against the bottom-wall of the pocket. A reinforcing ring is secured about the periphery of the tubular member a slight axial distance from the bottom wall of the pocket, whereby pressure of the lug against the bottom wall of the pocket will be borne entirely by the tubular member without the exertion of any displacing pressure on the reinforcing ring. A spindle is carried by the plunger, and a sleeve slidably engages the spindle and is provided with an enlarged bore throughout a portion of its length. A head is secured to the spindle and slidably mounted in the enlarged bore of the sleeve. A spring is confined in the enlarged bore between the slidable head and the bottom of the bore.

U.S. Pat. No. 913,864 to Seidl discloses a clasp comprising an inner and an outer telescoping-member. The inner member has a projecting pin in the side and the outer member has a locking-slot comprising an entering portion extending longitudinally and an engaging portion extending transversely to the axis and has its side next to the outer end extending from the entering portion in an oblique direction toward the outer end. The side of the engaging portion opposite the oblique side makes an angle not less than a right angle with the entering portion of the slot.

U.S. Pat. No. 1,199,690 to Gillan discloses a fastener, with a barrel open at one end, and longitudinally disposed plates fixed within the barrel and having longitudinal slots extending a portion of their length. A locking member is slidable in the barrel and is engageable with the inner end of the locking member. The locking member has a head spaced from the lugs to be flush with the open end of the barrel when the locking member is at its outermost limit. A spring in the barrel forces the plunger outward.

U.S. Pat. No. 3,286,316 to Marosy discloses a coupling comprising a male member and a female member. The male member comprises a rod having at least one lateral extension adjacent one end thereof, and the female member comprises a tubular housing. An end closure on one end of the housing has a slot operative to receive the end of the male member including the lateral extension. A locking element is slidably mounted within the tubular housing. A means is provided for biasing the locking element into abutment with the interior side of the end closure. The side of the locking element adjacent to the end closure has a groove formed laterally therein with its greatest depth in the center and with at least one side sloping from the center to the edges of the locking element. A guide means in the tubular housing is in engagement with the locking element and positions the locking element with an outermost point of the sloping side in alignment with the slot in the end closure of the tubular housing whereby insertion of the rod of the male member through the end closure forces the locking element away from the end closure. Rotation of the male member allows the locking element to move into closure relation to said end closure.

U.S. Pat. No. 3,487,512 to Marosy discloses a coupling comprising a male member and a female member. The male member comprises a rod having at least one lateral extension adjacent one end thereof. The female member comprises a tubular housing. An end closure on one end of the housing has an opening including a notch operative to receive the end of the rod with the lateral extension received in the notch. A locking element is slidably mounted within the tubular housing, and a guide means in the tubular housing is in engagement with the locking element. A means is provided for biasing the locking element toward the end closure. The improvement consists of the locking element comprising a disc-shaped member. At least one marginal edge portion of the disc shaped member is spiraled outwardly therefrom around the periphery thereof towards the end closure. The guide means positions the locking element with a portion of the marginal edge portion in alignment with the notch in the end closure of the tubular housing, whereby insertion of the rod of the male member through the end closure results in contact of the lateral extension with the marginal edge portion and forces the locking element away from the end closure with the marginal edge portion camming the lateral extension to rotate the male member about its axis after insertion of the lateral extension through the end closure.

U.S. Pat. No. 3,540,087 to Marosy discloses a quick-connect, positive locking coupling member. The coupling includes a male member and a female member. The male member has a rod with at least one lateral extension on one end thereof. The female member includes a tubular housing with an end closure which has an opening to receive the rod and a notch operative to receive the lateral extension of the rod. A locking element is slidably mounted within the tubular housing. Spring means bias the locking element towards the end closure. The locking element is a cylindrical member with at least one marginal edge spiraled outwardly around the periphery towards the end closure. The guide means position the locking element with a portion of the marginal edge portion in alignment with the notch in the end closure. The extension is cammed along this edge portion upon insertion of the male member and is received in a notch provided in the locking element after it has passed over the marginal edge portion to be locked in place. Means are associated with the guide means to permit holding of the locking element in a position away from the end closure to permit removal of the lateral extension from the notch and relative rotation of the male member for disengagement of the two members.

U.S. Pat. No. 3,540,091 to Marosy discloses a coupling including a male member with lateral extensions at one end adapted for insertion through a slotted cover plate in a female member. As the male member is inserted into the female member the forward edges of the lateral extensions engage a pair of cam surfaces formed on a locking element that is rotatably mounted within the female member. With further insertion of the male member the pair of cams on the locking element cause the element to be rotated against a biasing element. When the male member has been inserted a sufficient distance into the female element so that the lateral extensions have cleared the cover plate, the male member is rotated about its axis by the biasing element, firmly locking the male member within the female member.

U.S. Pat. No. 3,675,499 to Marosy discloses a quick connect and disconnect coupling particularly adapted for connecting chains, wires, cables or other members together. The coupling generally comprises a male member and a female member with the female member including a slide member urged by a spring toward an end plate. The male member includes laterally extending flanges and the end plate has a slotted opening for receiving the male member. Locking the members together is accomplished by inserting the male member through the opening and against the slide member to move the slide member away from the end plate, rotating the male member and then releasing the male member to release the spring to thereby clamp the flanges of the male member between the slide member and the end plate.

U.S. Pat. No. 4,184,232 to Marosy discloses a quick connect and disconnect coupling for connecting the free ends of chains, wires or cables and more particularly for connecting the free ends of pieces of jewelry such as bracelets, chain bracelets, neck chains, necklaces and the like. The coupling of the invention comprises a male member having a T-shaped element which is adapted to be introduced into a slotted aperture in the end plate of a female member. A pair of flat springs disposed in the female member engages the branches of the T-shaped element and resiliently rotate the male member such that the projecting lateral ears of the T-shaped element are engaged behind the end plate of the female member. For disconnecting the coupling, the male and female members are rotated relative to each other, against the torque exerted by the springs, until the laterally projecting ears of the T-shaped element registers with the slot in the female member end plate and the male member may be removed from the female member.

U.S. Pat. No. 4,236,283 to Marosy discloses a quick connect and disconnect coupling for connecting the free ends of chains, wires or cables and more particularly for connecting the free ends of pieces of jewelry such as bracelets, chain bracelets, neck chains, necklaces and the like. The coupling of the invention comprises a male member having a T-shaped element which is adapted to be introduced into a slotted aperture in the end plate of a female member. A pair of flat springs disposed in the female member engages the branches of the T-shaped element and resiliently rotate the male member such that the projecting lateral ears of the T-shaped element are engaged behind the end plate of the female member. For disconnecting the coupling, the male and female members are rotated relative to each other, against the torque exerted by the springs, until the laterally projecting ears of the T-shaped element registers with the slot in the female member end plate and the male member may be removed from the female member. A modification of the coupling of the invention comprises a groove on the inner face of the female member end plate and a cam arrangement directing the inner face of the lateral ears of the T-shaped element into the groove to lock the members together against accidental uncoupling.

U.S. Pat. No. 4,364,155 to Synowicki discloses a quick-engageable, quick-disengageable coupling or clasp for connecting the ends of a piece of jewelry such as a necklace or bracelet. The clasp includes two initially separate longitudinal bodies end-alined in use, one body having a lengthwise projecting, inner end tongue, and the other body having an inner end slot and adapted for reception, by longitudinal insertion through the slot, of the tongue; the clasp being particularly characterized by the inclusion of instrumentalities operative, without more, to secure the tongue in the other body and thus quick-engage the clasp upon the tongue being so inserted, and to release the tongue upon relative rotation of the bodies and thus quick-disengage the clasp.

U.S. Pat. No. 5,095,594 to Marosy discloses a coupling comprising a male and a female member. The female member includes a spring-biased receiving member biased toward a slotted and apertured end plate. The male member includes an inverse V-shaped cam surface which, upon insertion into the slot, engages opposed sides of the receiving member. The inward motion of the male member causes the receiving member to rotate against the action of a spring. Further inward motion of the male member, past the slot, permits the receiving member to spring back to its original orientation carrying with it the male member to a latched position. In the latched position, the male member resides at approximately 90 degrees with respect to the slot.

U.S. Pat. No. 7,788,774 to Cravey discloses a releasable clasp or coupling including a female member and a male member each having a cylindrical body, a flat front end disposed at an angle diagonal to the longitudinal axis of its body, and a rear end adapted to be connected to the end of a flexible member such a necklace, or the like. The female member has an aperture through its diagonal front end and the male member has a tongue element that extends outwardly from its diagonal front end. The aperture and the tongue element are aligned and slidably engaged to place the diagonal front ends face-to-face, and upon relative pivotal movement of the bodies, the longitudinal axis of the male and female members become axially aligned and the aperture and tongue element become oriented out of alignment to prevent accidental removal. The tongue may also frictionally engage the female member.

Although the aforementioned prior art have contributed to the development of the art of clasps, none of these prior art patents have solved the needs of this art.

Therefore, it is an object of the present invention to provide a clasp which is an improvement over the existing art.

Another object of this invention is to provide an improved clasp that is easy for the wearer to open and close.

Another object of this invention is to provide an improved clasp that provides an improved locking means.

Another object of this invention is to provide an improved clasp that is easy to cost effectively produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved clasp for coupling a first elongated member to a second elongated member. The clasp comprises a primary body extending between a primary proximal end and a primary distal end. A bore defines a bore wall within the primary body extending from a bore proximal end and a bore distal end. The bore distal end is commensurate with the primary distal end. A groove is within the bore wall and extends from a first proximal end and a first distal end. The first distal end is commensurate to the primary distal end. A first curved locking channel is coupled to the first proximal end of the first groove. The primary proximal end of the primary body is coupled to the first elongated member. A secondary body extends between a secondary proximal end and a secondary distal end. A rod defines a rod wall extending from a rod proximal end and a rod distal end. The rod proximal end is coupled to the secondary distal end. A leg extends from the rod wall adjacent to the rod distal end. The secondary proximal end of the secondary body is coupled to the second elongated member. The leg slidably engages within the first groove during converging and rotating the primary body relative to the secondary body and positioning the leg adjacent to the first curved locking channel. The leg slidably engages within first curved locking channel upon diverging the primary body with the secondary body for coupling the primary body with the secondary body. The leg slidably disengages within the first curved locking channel upon converging the primary body with the secondary body for decoupling the primary body with the secondary body. The leg slidably engages within the first groove during diverging and rotating the primary body relative to the secondary body and withdrawing the leg from the first groove for decoupling the primary body with the secondary body.

In a more specific embodiment of the invention, a second groove is within the bore wall extending from a second proximal end and a second distal end. The second distal end is commensurate to the primary distal end. A second curved locking channel is coupled to the second proximal end of the second groove. A second leg extends from the rod wall adjacent to the rod distal end. The second leg slidably engages within the second groove during converging and rotating the primary body relative to the secondary body and positioning the second leg adjacent to the second curved locking channel. The second leg slidably engages within second curved locking channel upon diverging the primary body with the secondary body for coupling the primary body with the secondary body. The second leg slidably disengages within the second curved locking channel upon converging the primary body with the secondary body for decoupling the primary body with the secondary body. The second leg slidably engages within the second groove during diverging and rotating the primary body relative to the secondary body and withdrawing second leg from the second groove for decoupling the primary body with the secondary body.

In a more specific embodiment of the invention, the groove includes a first spiral groove and the second groove includes a second spiral groove. The curved locking channel includes a first general J-shaped locking channel and the second curved locking channel includes a second general J-shaped locking channel.

In another embodiment of the invention, a pin is coupled to the bore proximal end and extends within the bore. The pin and the bore wall define an annular channel. A pin bore is within the rod for defining an annular shaft. The pin is inserting into the pin bore and the annular shaft slidably engages within the annular channel during coupling and decoupling the primary body with the secondary body for aligning the primary body relative to the secondary body.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 1 is a front upper isometric view of a clasp incorporating the present invention;
FIG. 2 is an exploded view of FIG. 1;
FIG. 3 is a front view of FIG. 1;
FIG. 4 is a sectional view along line 4-4 in FIG. 3;
FIG. 19 is a view along line 19-19 in FIG. 16;
FIG. 20 is a view along line 20-20 in FIG. 16;
FIG. 21 is a sectional view along line 21-21 in FIG. 16;
FIG. 22 is a view similar to FIG. 4 illustrating a spring applying an expansion force for maintaining a first leg within a first general J shaped locking channel and a second leg within a second general J shaped locking channel and preventing inadvertent separation of the primary body and the secondary body;
FIG. 23 is a view similar to FIG. 22 illustrating the primary body and the secondary body converging and compressing the spring for disengaging the first leg slidably disengaging within the first general J shaped locking channel and the second leg slidably disengaging within the second general J shaped locking channel upon converging the primary body with the secondary body;
FIG. 24 is a view similar to FIG. 23 illustrating the first leg being removed from the first general J shaped locking channel and the second leg being removed from the second general J shaped locking channel upon rotating the primary body relative to the secondary body;
FIG. 25 is a view similar to FIG. 24 illustrating the first leg slidably engaging within a first spiral groove and the second leg slidably engaging within a second spiral groove during diverging and rotating the primary body relative to the secondary body;
FIG. 26 is a view similar to FIG. 25 illustrating the first leg further slidably engaging within the first spiral groove and the second leg further slidably engaging within the second spiral groove during diverging and rotating the primary body relative to the secondary body;
FIG. 27 is a view similar to FIG. 26 illustrating the first leg being removed from the first spiral groove and the second leg being removed from the second spiral groove for decoupling the primary body from the secondary body;
FIG. 28 is a view of FIG. 3 illustrating the clasp is coupling a necklace around a neck of an individual;
FIG. 29 is an enlarged view of FIG. 28 illustrating the individual grasping the clasp for converging the primary body with the secondary body for decoupling the primary body with the secondary body;
FIG. 30 is a view similar to FIG. 29 illustrating the primary body decoupled from the secondary body;
FIG. 33 is a front upper isometric view of a second clasp incorporating the present invention;
FIG. 34 is an exploded view of FIG. 33;
FIG. 35 is a front view of FIG. 33;
FIG. 36 is a sectional view along line 36-36 in FIG. 35;
FIG. 53 is a view similar to FIG. 36 illustrating a spring positioned within the secondary body and applying an expansion force for maintaining a first leg within a first general J shaped locking channel and a second leg within a second general J shaped locking channel and preventing inadvertent separation of the primary body and the secondary body;
FIG. 54 is a view similar to FIG. 53 illustrating the primary body and the secondary body converging and compressing the spring for disengaging the first leg slidably disengaging within the first general J shaped locking channel and the second leg slidably disengaging within the second general J shaped locking channel upon converging the primary body with the secondary body;
FIG. 55 is a view similar to FIG. 54 illustrating the first leg slidably engaging within a first spiral groove and the second leg slidably engaging within a second spiral groove during diverging and rotating the primary body relative to the secondary body;
FIG. 56 is a view similar to FIG. 36 illustrating a spring positioned within the primary body and applying an expansion force for maintaining a first leg within a first general J shaped locking channel and a second leg within a second general J shaped locking channel and preventing inadvertent separation of the primary body and the secondary body;
FIG. 57 is a view similar to FIG. 56 illustrating the primary body and the secondary body converging and compressing the spring for disengaging the first leg slidably disengaging within the first general J shaped locking channel and the second leg slidably disengaging within the second general J shaped locking channel upon converging the primary body with the secondary body;
FIG. 58 is a view similar to FIG. 57 illustrating the first leg slidably engaging within a first spiral groove and the second leg slidably engaging within a second spiral groove during diverging and rotating the primary body relative to the secondary body;
FIG. 59 is a front upper isometric view of a third clasp incorporating the present invention;
FIG. 60 is an exploded view of FIG. 59.

FIG. 70 is a sectional view along line 70-70 in FIG. 66;
FIG. 71 is a sectional view along line 71-71 in FIG. 67;
FIG. 72 is a sectional view along line 72-72 in FIG. 69;
FIG. 73 is a sectional view along line 73-73 in FIG. 69;
FIG. 84 is a view of the first clasp as shown in FIGS. 1-32 coupling a first elongated member with a second elongated member, the second elongated member tethering a fishing hook;
FIG. 85 is a view similar to FIG. 84 illustrating the clasp disengaged for separating the first elongated member with the second elongated member;
FIG. 86 is a view similar to FIG. 85 illustrating the clasp engaged for coupling the first elongated member with the second elongated member, the second elongated member tethering a fishing lure;
FIG. 87 is a view similar to FIG. 86 illustrating the clasp coupling the first elongated member with the second elongated member;
FIG. 88 is an enlarged view of the clasp of FIG. 84;
FIG. 89 is a sectional view along line 89-89 in FIG. 88;
FIG. 90 is a view of the second clasp as shown in FIGS. 33-58 coupling the first elongated member with the second elongated member, the second elongated member tethering the fishing lure;
FIG. 91 is a view similar to FIG. 90 illustrating the clasp disengaged for separating the first elongated member with the second elongated member;
FIG. 92 is an enlarged view of the clasp of FIG. 90;
FIG. 93 is a sectional view along line 93-93 in FIG. 92;
FIG. 94 is a view of the third clasp as shown in FIGS. 59-83 coupling the first elongated member with the second elongated member, the second elongated member tethering the fishing hook;
FIG. 95 is a view similar to FIG. 94 illustrating the clasp disengaged for separating the first elongated member with the second elongated member;
FIG. 96 is an enlarged view of the clasp of FIG. 94;
FIG. 97 is a sectional view along line 97-97 in FIG. 96.

Similar reference characters refer to similar parts throughout the several Figures of the drawings.

DETAILED DISCUSSION

Figure 5:
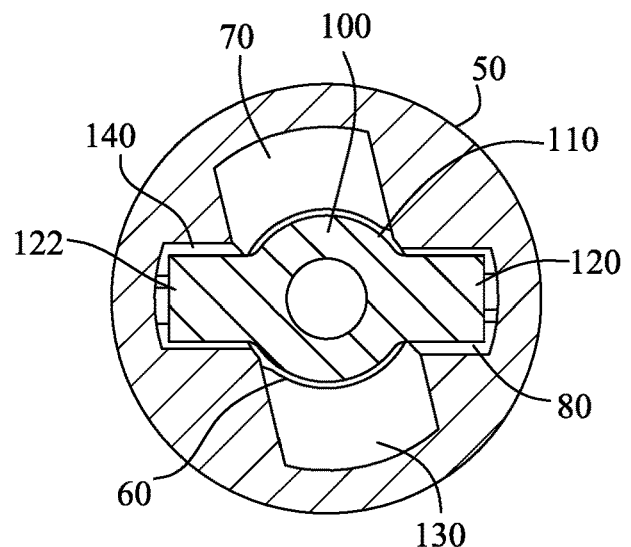
FIG. 5 is a sectional view along line 5-5 in FIG. 3.
Figure 6:
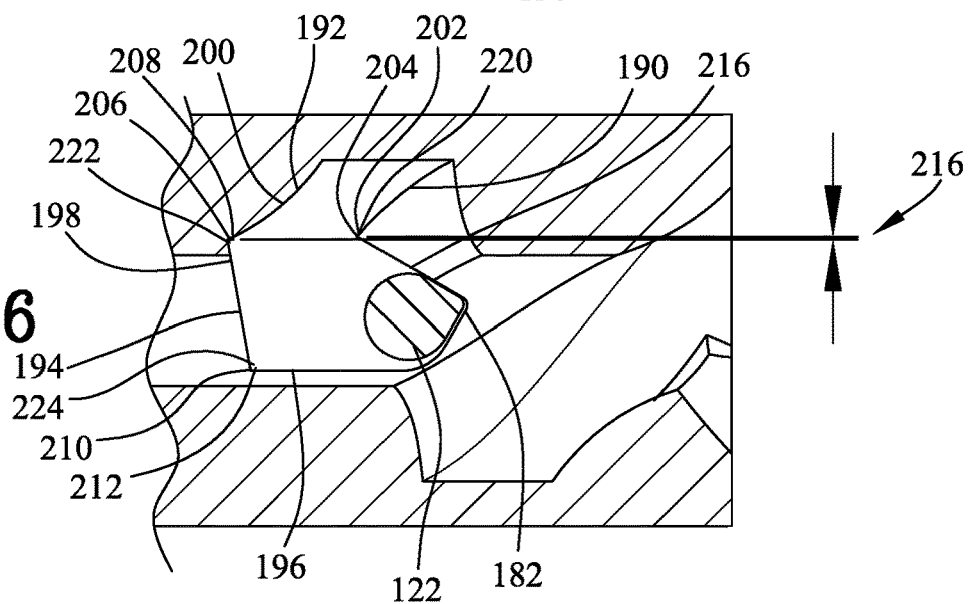
FIG. 6 is a sectional view along line 6-6 in FIG. 3.
Figure 7:
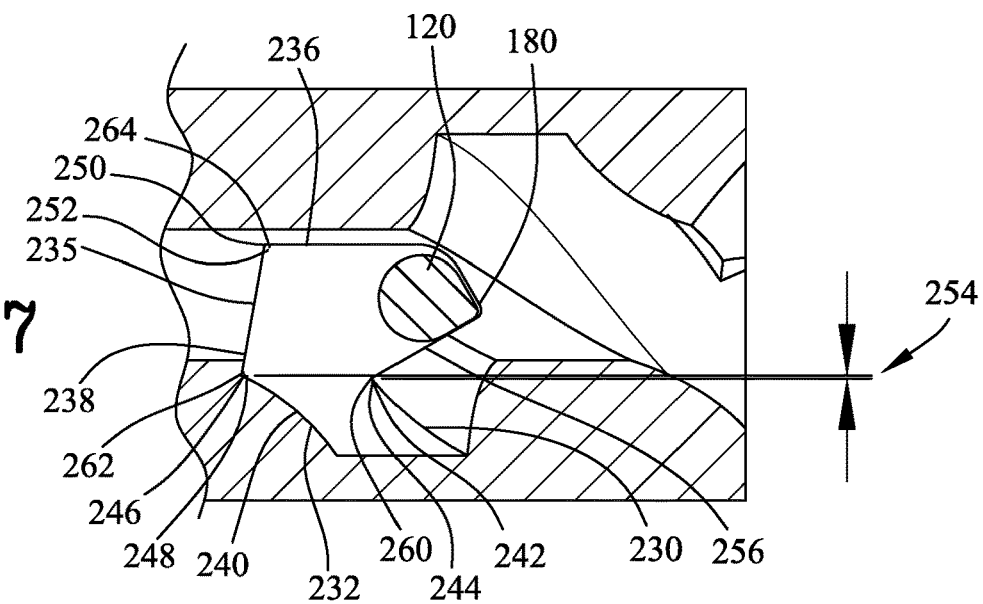
FIG. 7 is a sectional view along line 7-7 in FIG. 3.
Figure 8:
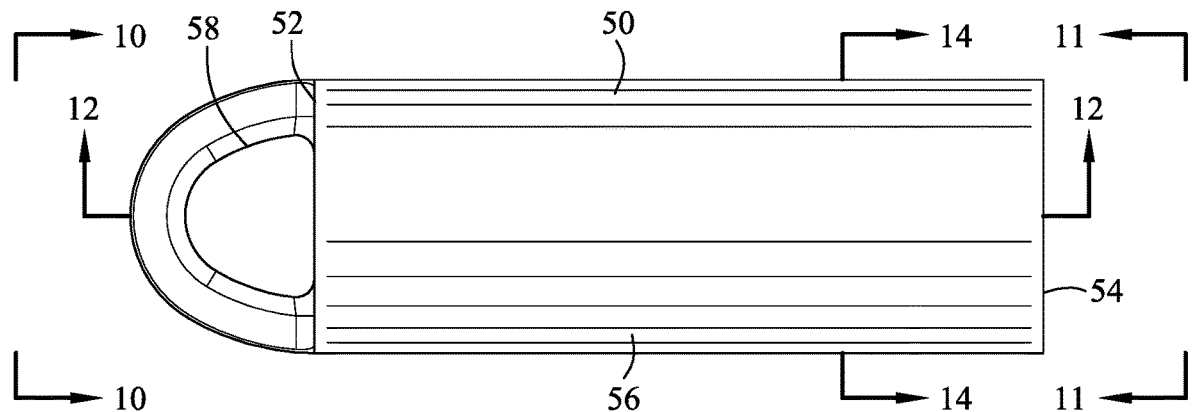
FIG. 8 is a front view of a primary body in FIG. 3.
Figure 9:
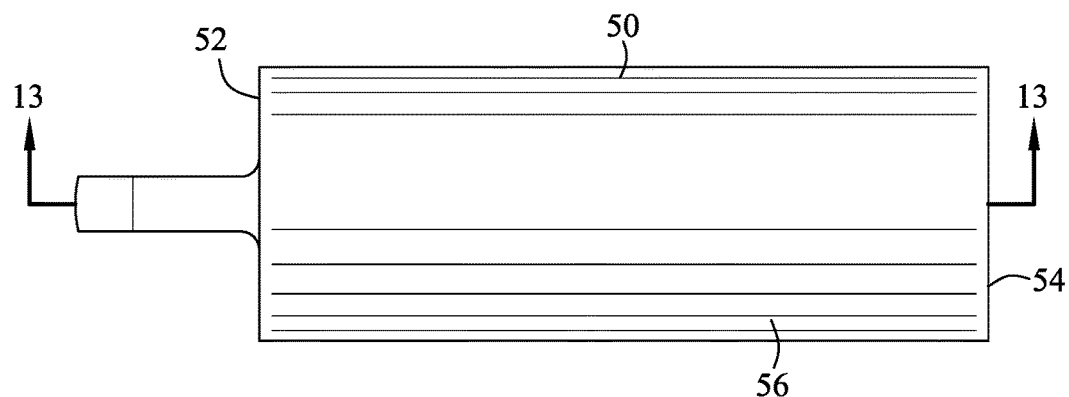
FIG. 9 is a top view of FIG. 8.
Figure 10:
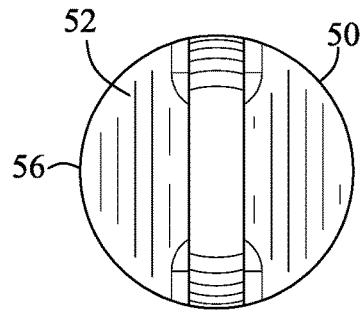
FIG. 10 is a view along line 10-10 in FIG. 8.
Figure 11:
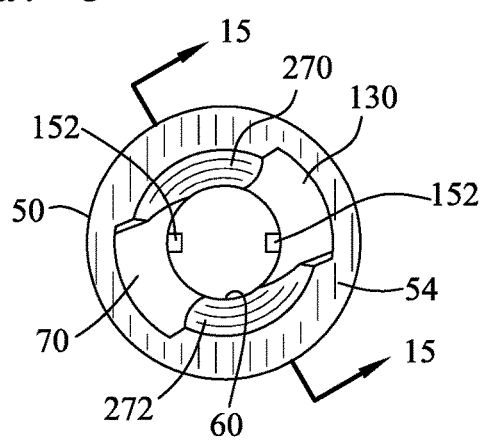
FIG. 11 is a view along line 11-11 in FIG. 8.
Figure 12:
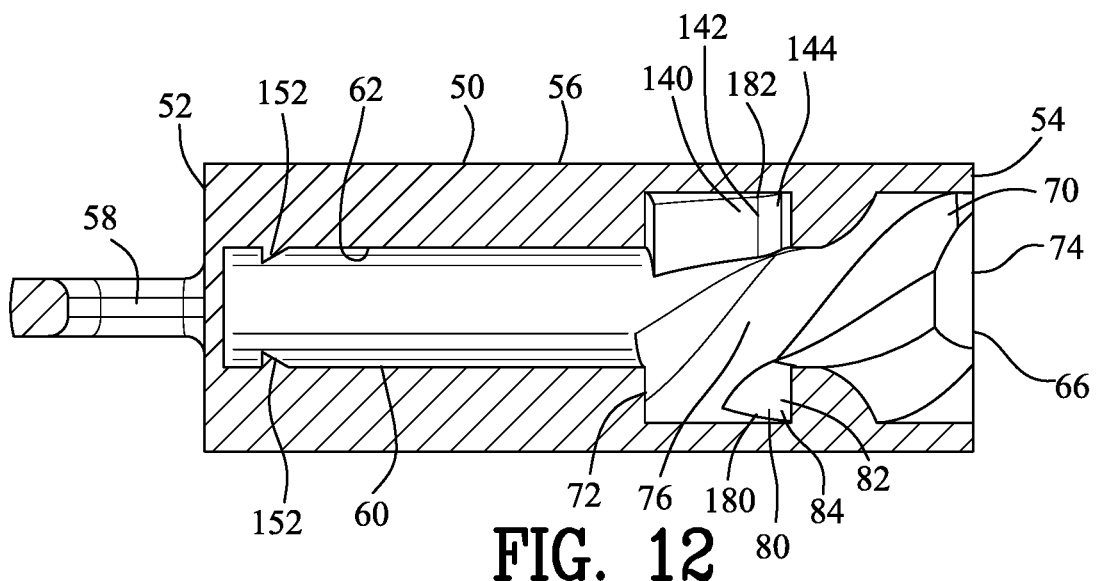
FIG. 12 is a sectional view along line 12-12 in FIG. 8.
Figure 13:
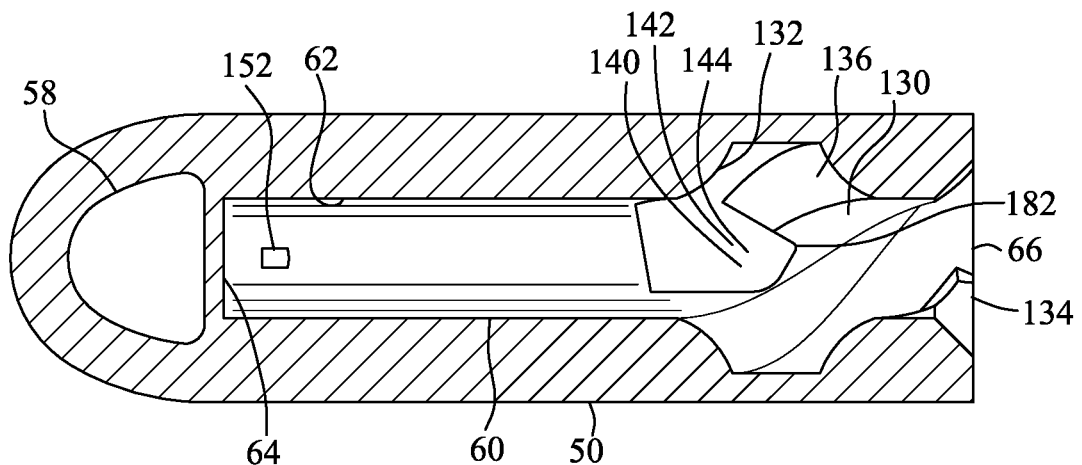
FIG. 13 is a sectional view along line 13-13 in FIG. 9.
Figure 14:
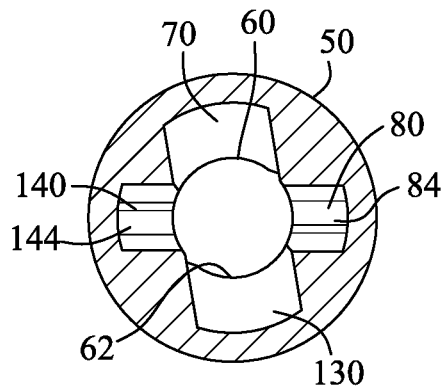
FIG. 14 is a sectional view along line 14-14 in FIG. 8.
Figure 15:
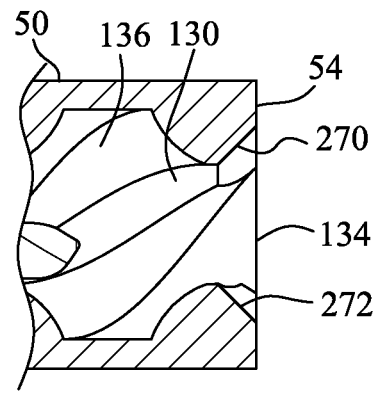
FIG. 15 is a sectional view along line 15-15 in FIG. 11.
Figure 16:
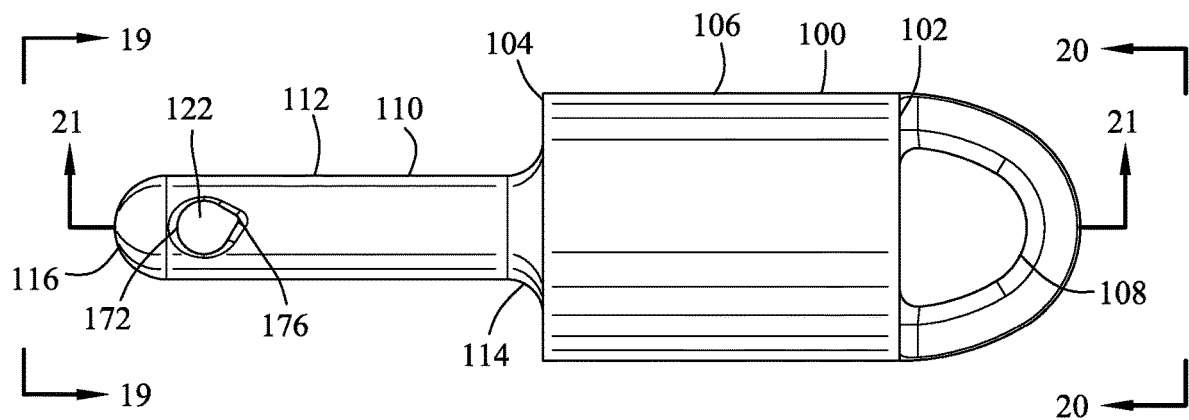
FIG. 16 is a front view of a secondary body in FIG. 3.
Figure 17:
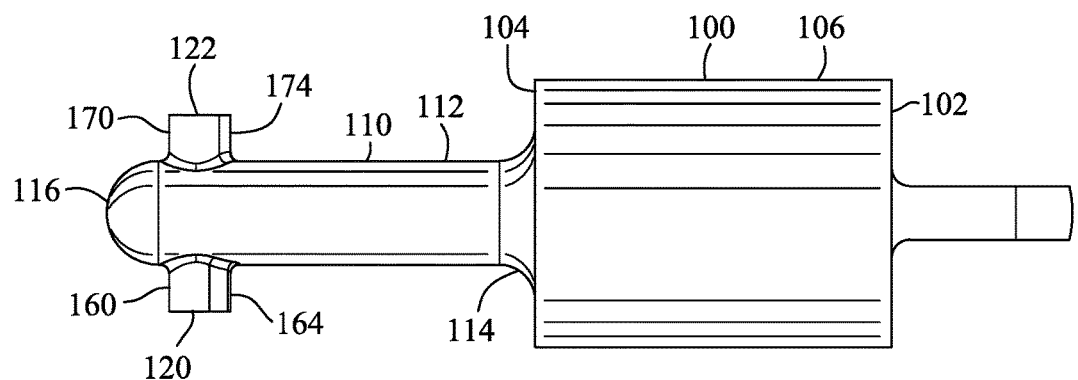
FIG. 17 is a top view of FIG. 16.
Figure 18:
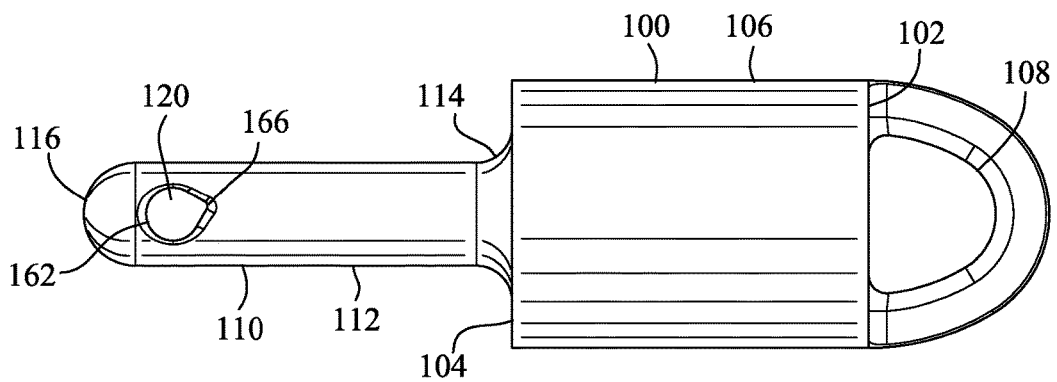
FIG. 18 is a rear view of FIG. 16.
Figure 31:
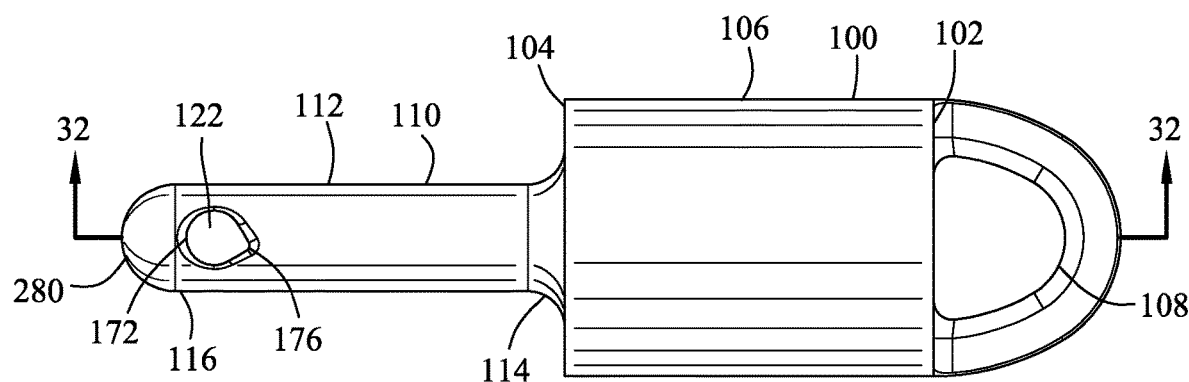
FIG. 31 is a view similar to FIG. 16 illustrating a reinforcing cap coupled to a rod of the secondary body.
Figure 32:
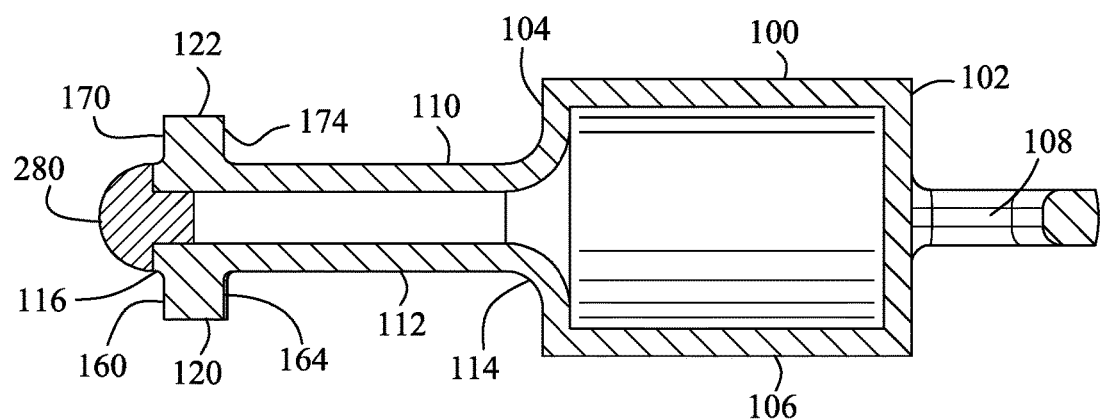
FIG. 32 is a sectional view along line 32-32 in FIG. 31.
Figure 37:
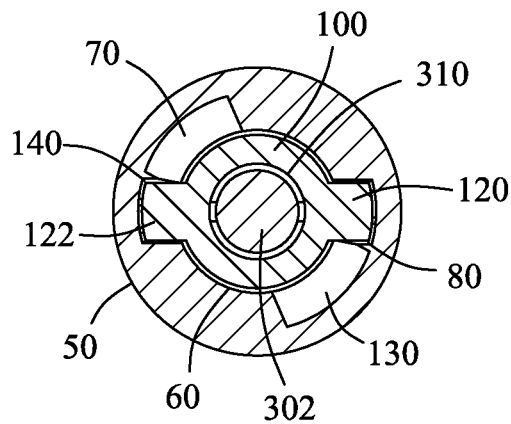
FIG. 37 is a sectional view along line 37-37 in FIG. 35.
Figure 38:
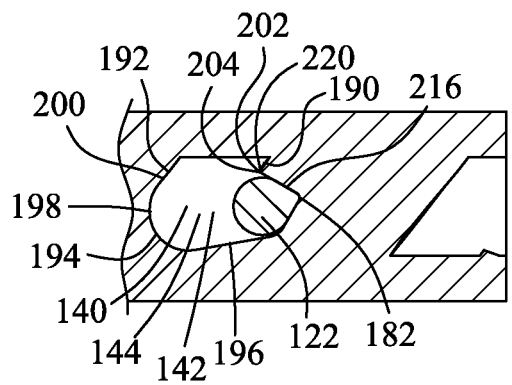
FIG. 38 is a sectional view along line 38-38 in FIG. 35.
Figure 39:
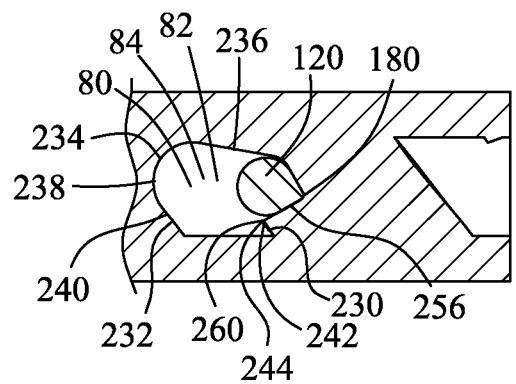
FIG. 39 is a sectional view along line 39-39 in FIG. 35.
Figure 40:
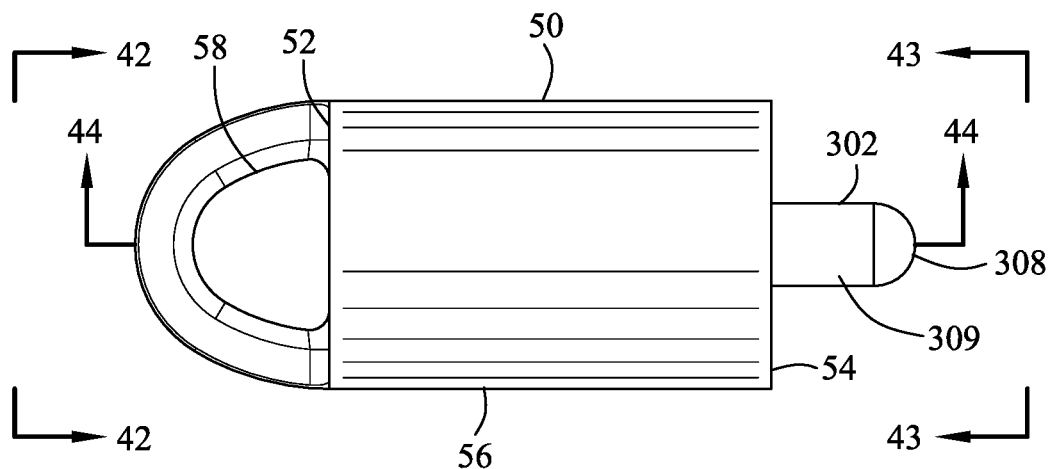
FIG. 40 is a front view of a primary body in FIG. 33.
Figure 41:
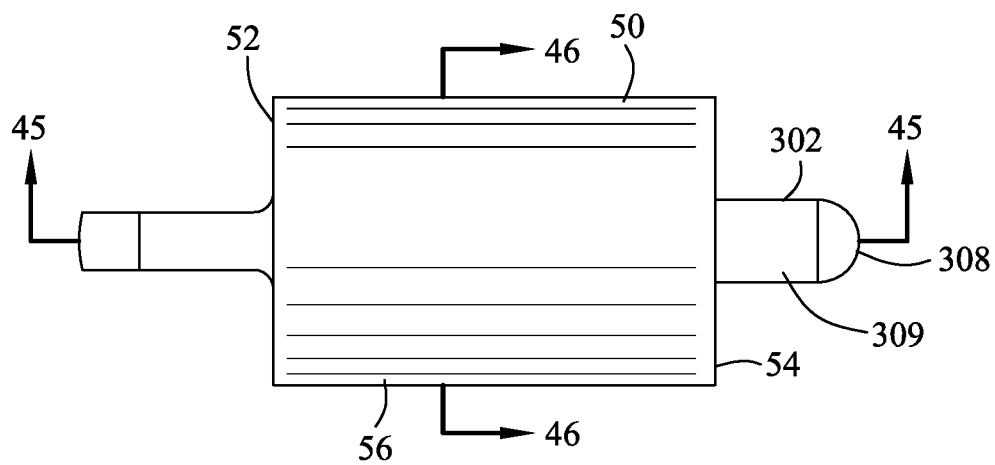
FIG. 41 is a top view of FIG. 40.
Figure 42:
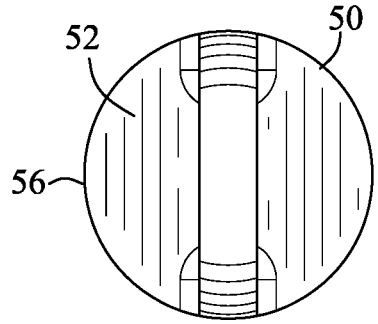
FIG. 42 is a view along line 42-42 in FIG. 40.
Figure 43:
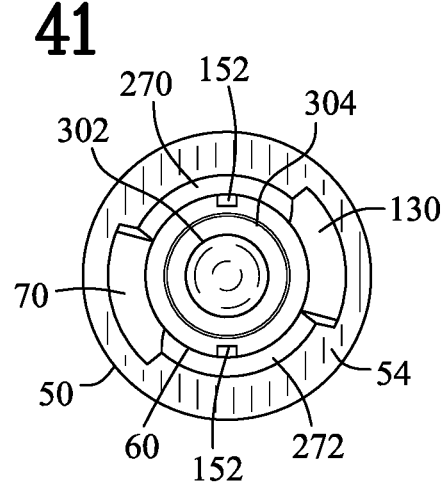
FIG. 43 is a view along line 43-43 in FIG. 40.
Figure 44:
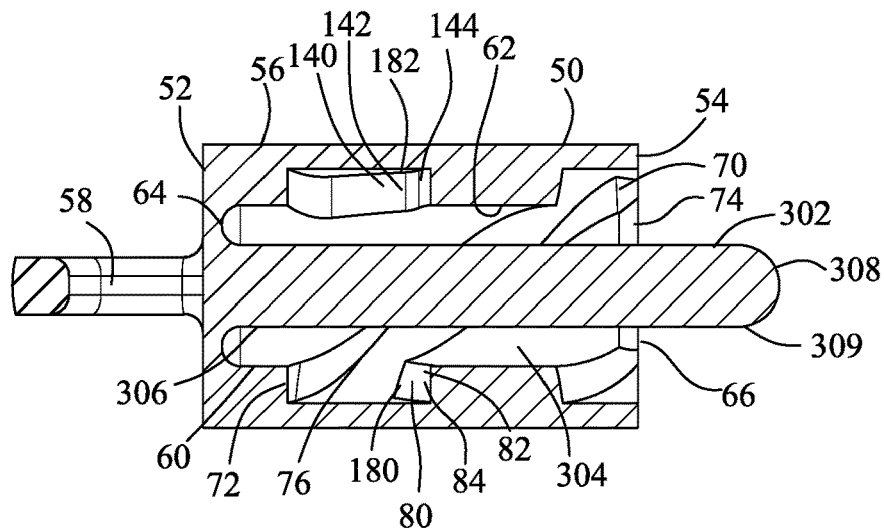
FIG. 44 is a sectional view along line 44-44 in FIG. 40.
Figure 45:
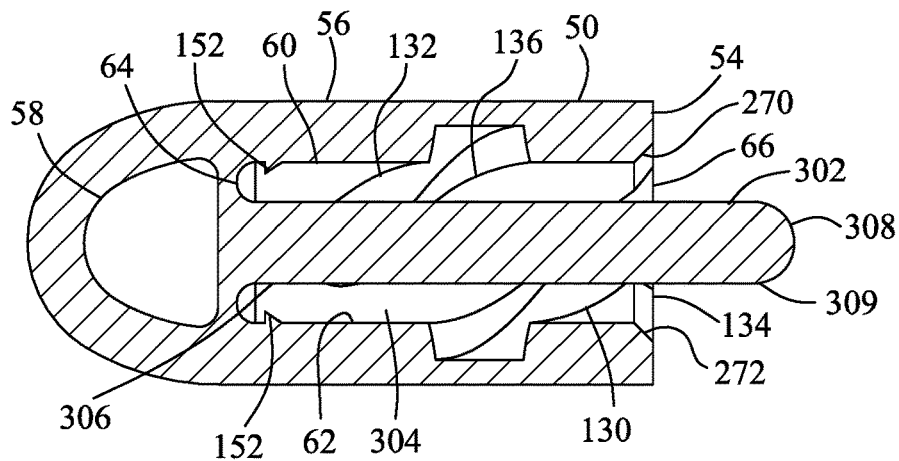
FIG. 45 is a sectional view along line 45-45 in FIG. 41.
Figure 46:
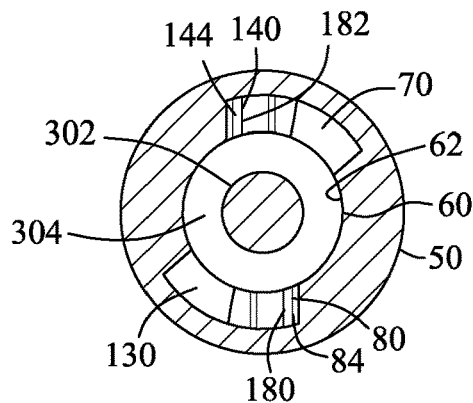
FIG. 46 is a sectional view along line 46-46 in FIG. 41.
Figure 47:
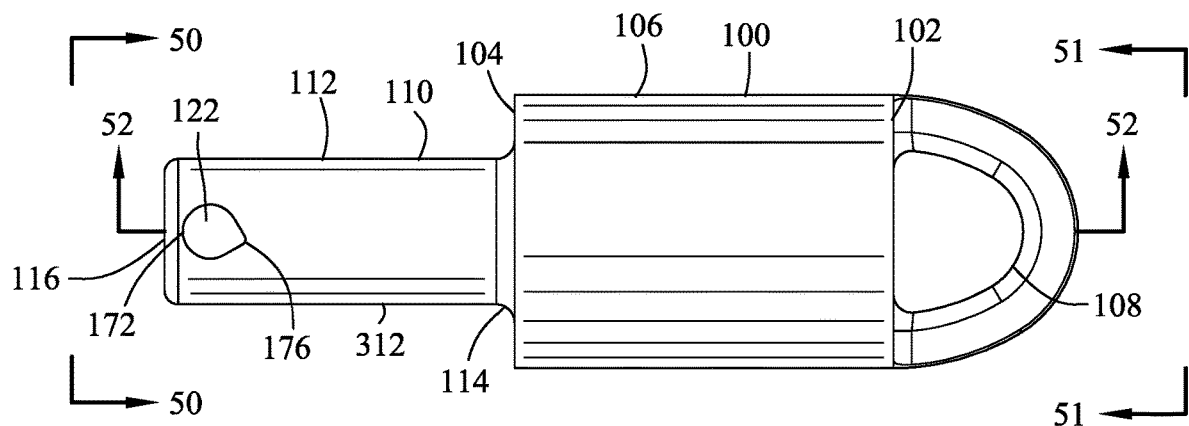
FIG. 47 is a front view of a secondary body in FIG. 33.
Figure 48:
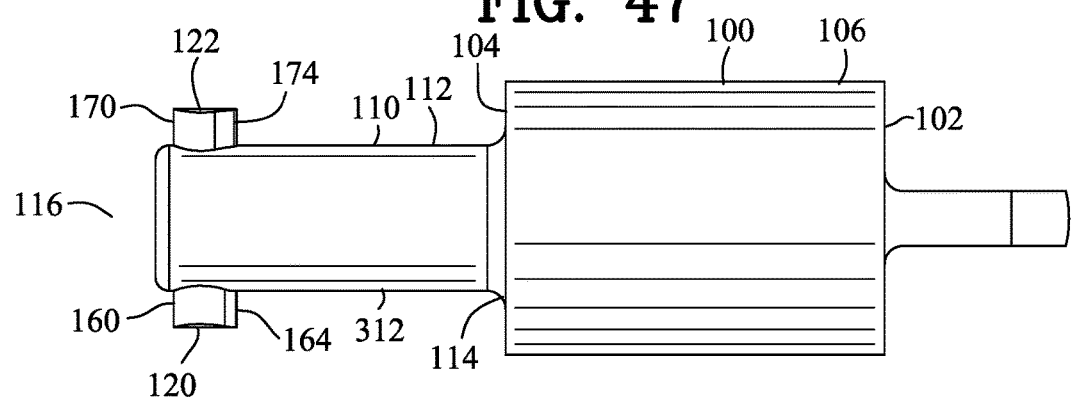
FIG. 48 is a top view of FIG. 47.
Figure 49:
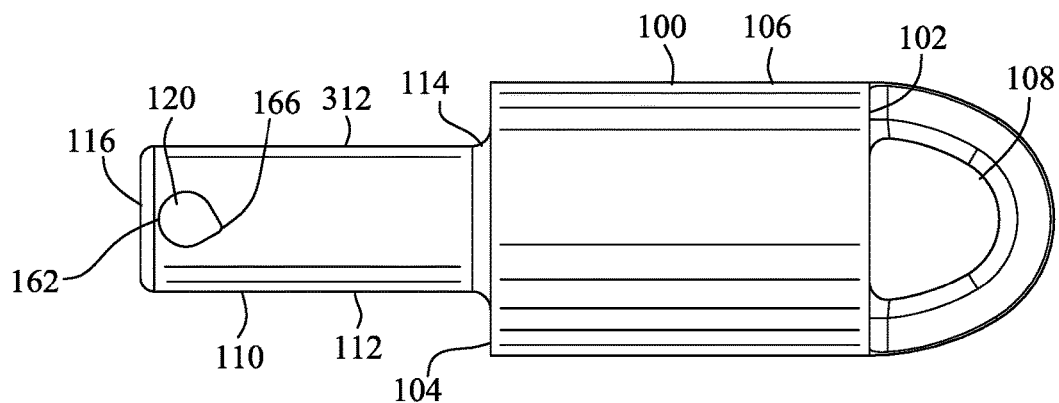
FIG. 49 is a rear view of FIG. 47.
Figure 50:
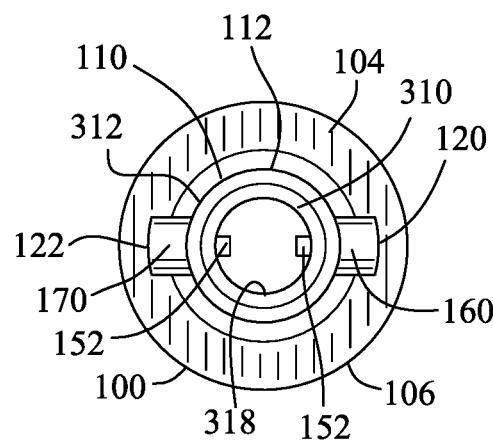
FIG. 50 is a view along line 50-50 in FIG. 47.
Figure 51:
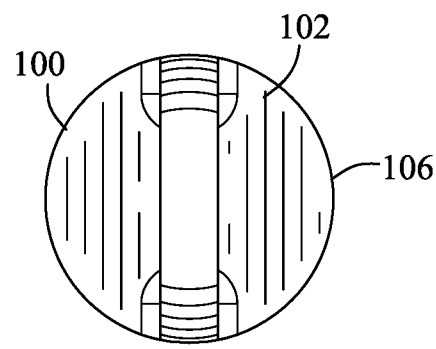
FIG. 51 is a view along line 51-51 in FIG. 47.
Figure 52:
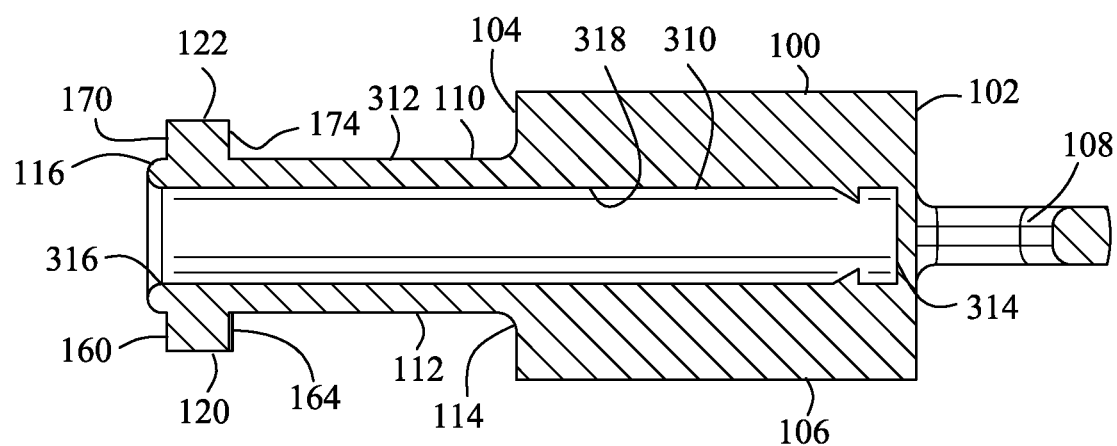
FIG. 52 is a sectional view along line 52-52 in FIG. 47.
Figure 61:
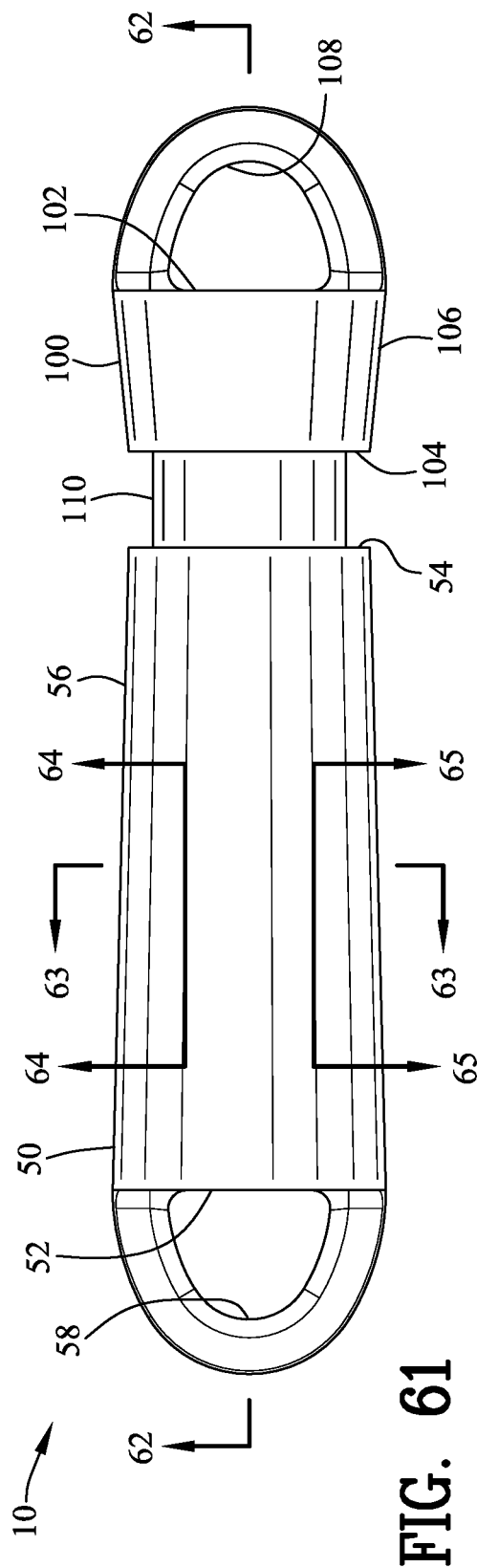
FIG. 61 is a front view of FIG. 59.
Figure 62:
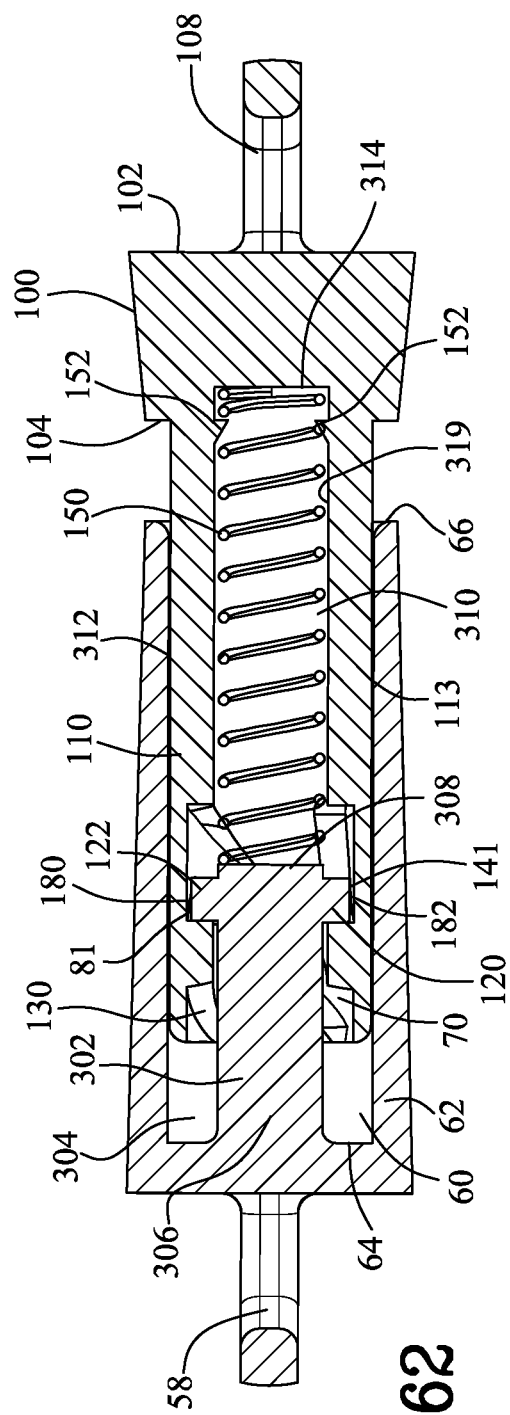
FIG. 62 is a sectional view along line 62-62 in FIG. 61.
Figure 63:
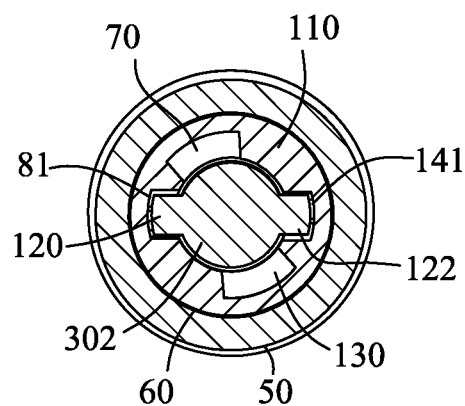
FIG. 63 is a sectional view along line 63-63 in FIG. 61.
Figure 64:
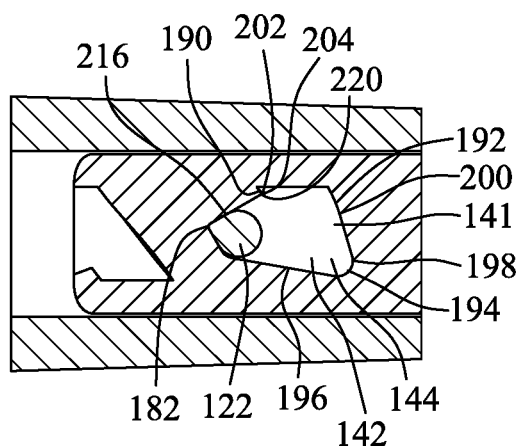
FIG. 64 is a sectional view along line 64-64 in FIG. 61.
Figure 65:
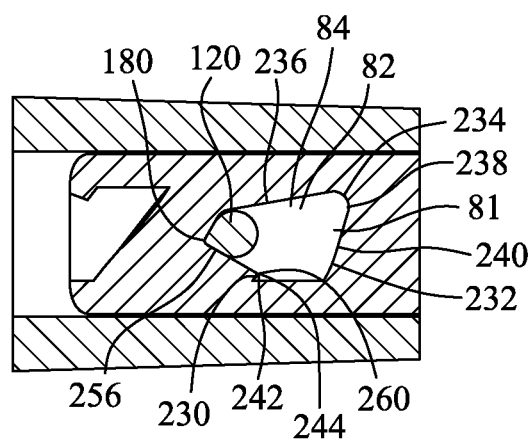
FIG. 65 is a sectional view along line 65-65 in FIG. 61.
Figure 66:
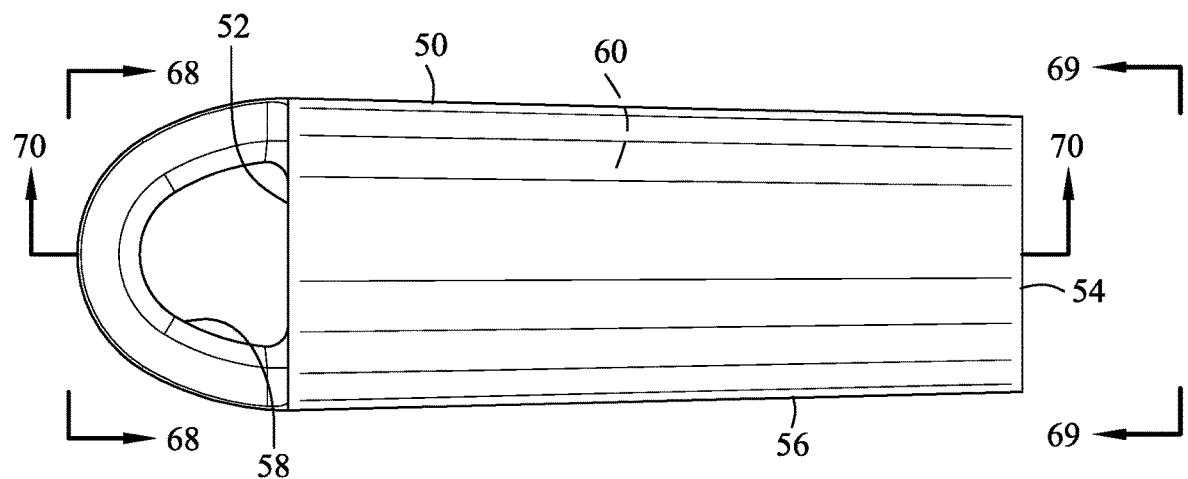
FIG. 66 is a front view of the primary body in FIG. 59.
Figure 67:
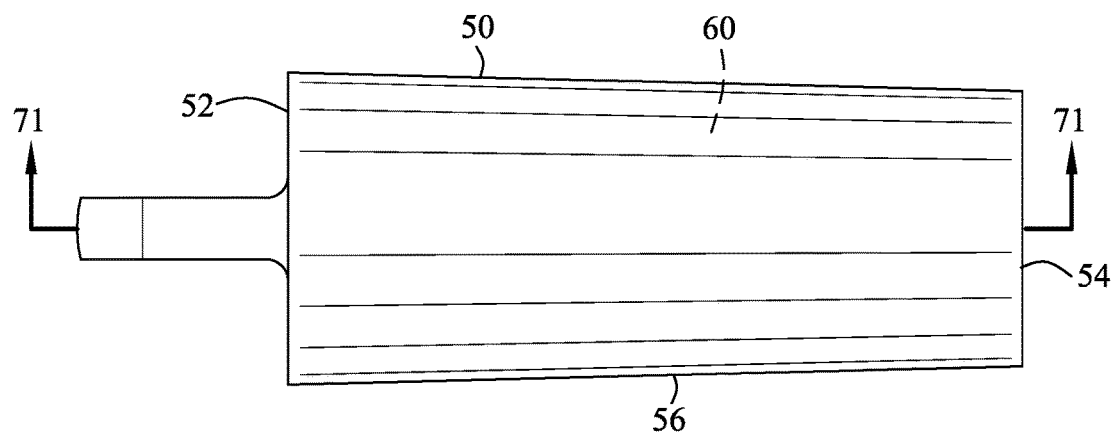
FIG. 67 is a top view of FIG. 66.
Figure 68:
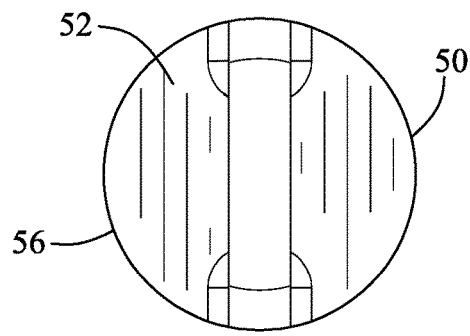
FIG. 68 is a view along line 68-68 in FIG. 66.
Figure 69:
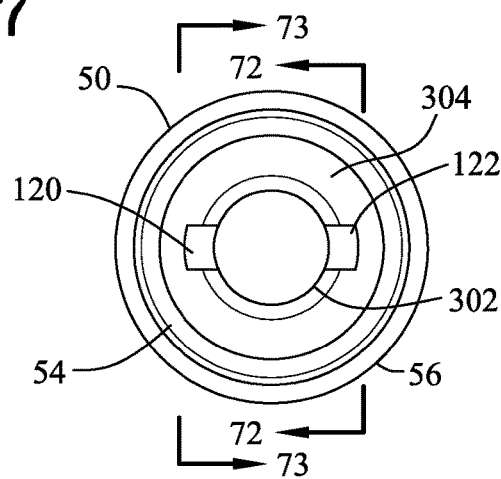
FIG. 69 is a view along line 69-69 in FIG. 66.
Figure 74:
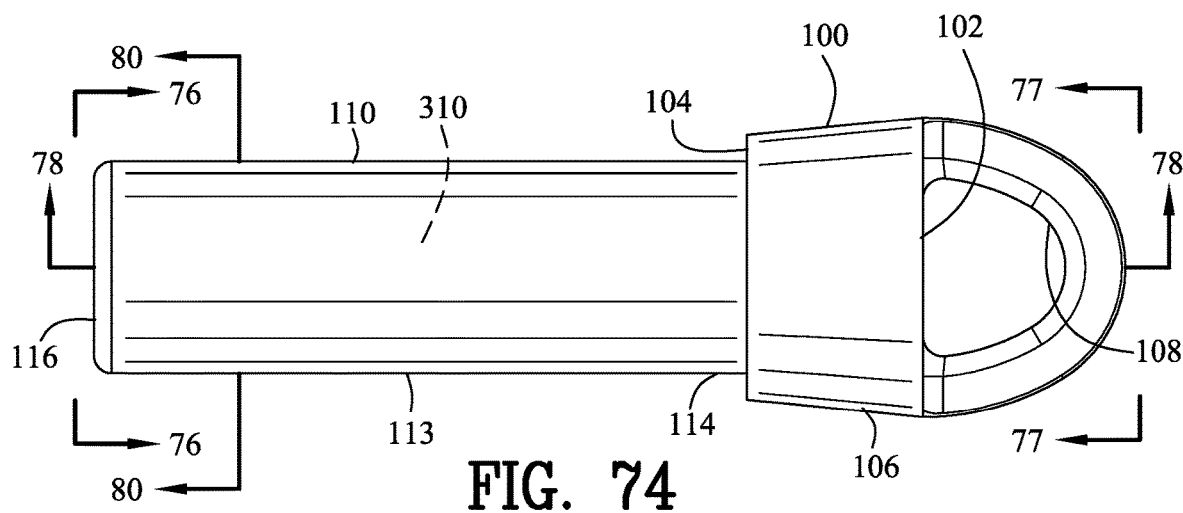
FIG. 74 is a front view of the secondary body in FIG. 59.
Figure 75:
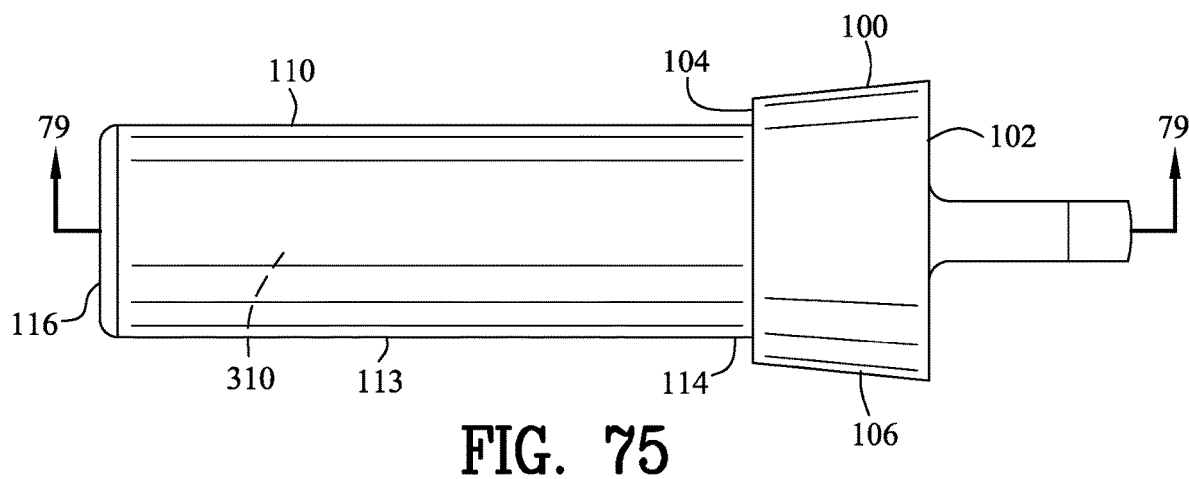
FIG. 75 is a top view of FIG. 74.
Figure 76:
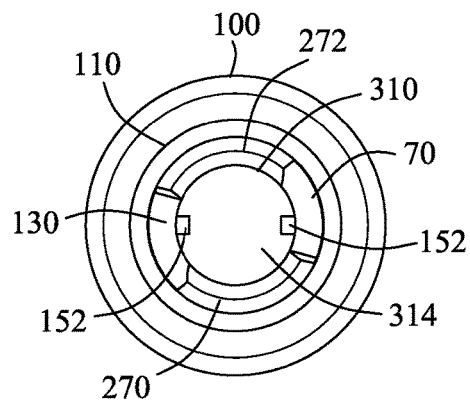
FIG. 76 is a view along line 76-76 in FIG. 74.
Figure 77:
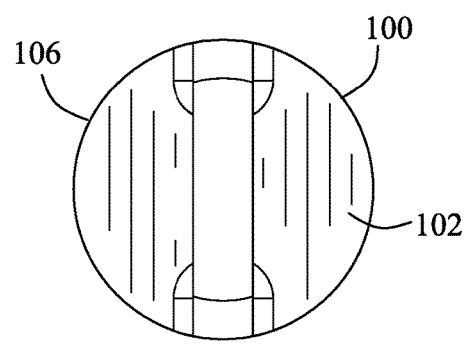
FIG. 77 is a view along line 77-77 in FIG. 74.
Figure 78:
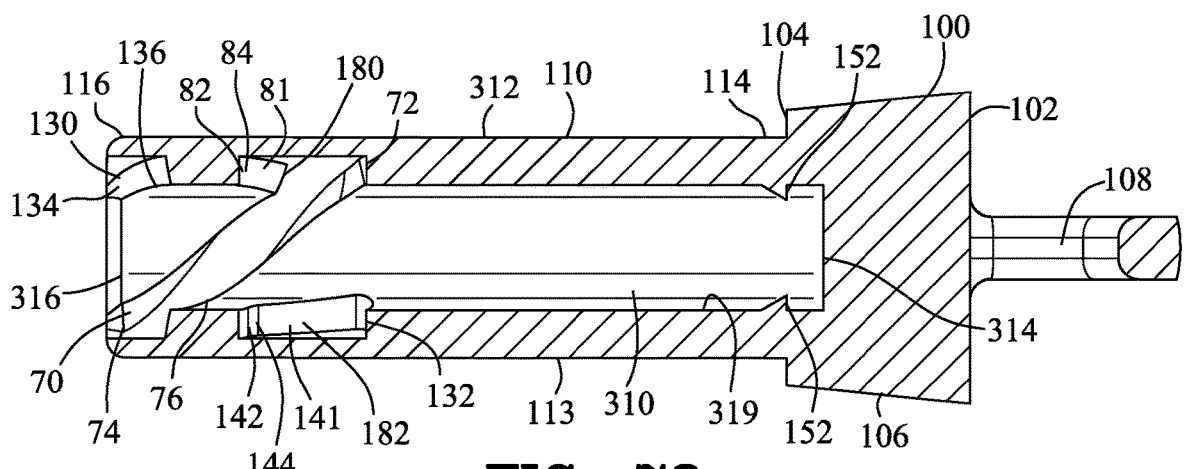
FIG. 78 is a sectional view along line 78-78 in FIG. 74.
Figure 79:
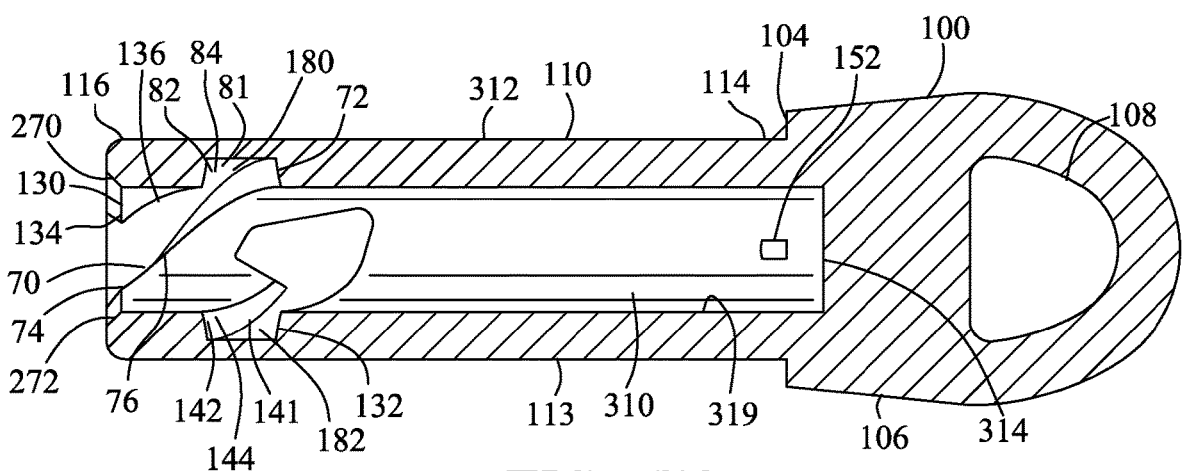
FIG. 79 is a sectional view along line 79-79 in FIG. 75.
Figure 80:
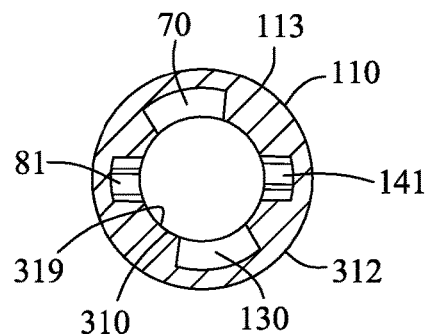
FIG. 80 is a sectional view along line 80-80 in FIG. 74.
Figure 81:
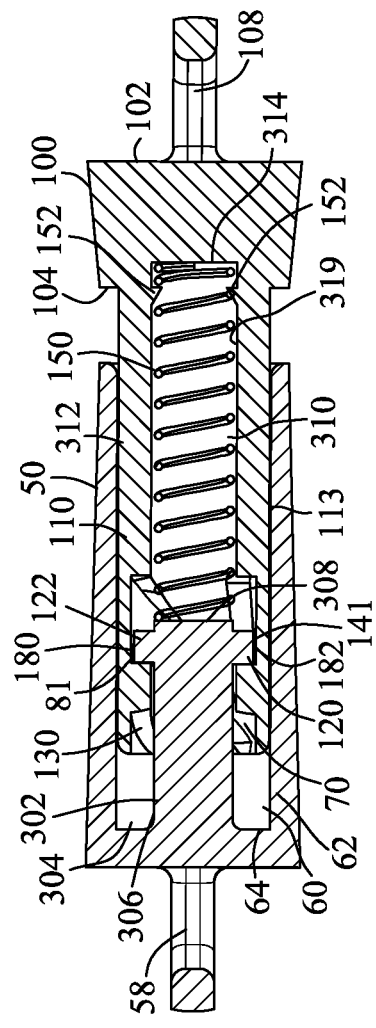
FIG. 81 is a view similar to FIG. 62 illustrating a spring positioned within the secondary body and applying an expansion force for maintaining a first leg within a first locking channel and a second leg within a second locking channel and preventing inadvertent separation of the primary body and the secondary body.
Figure 82:
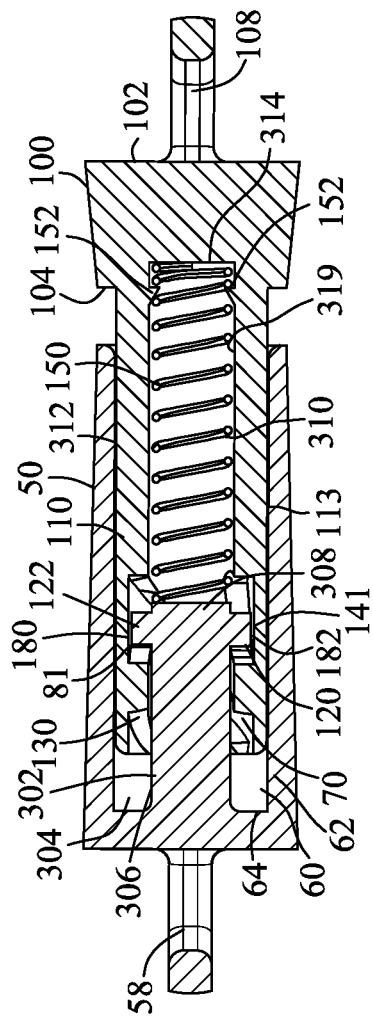
FIG. 82 is a view similar to FIG. 81 illustrating the primary body and the secondary body converging and compressing the spring and the first leg slidably disengaging within the first locking channel and the second leg slidably disengaging within the second locking channel upon converging the primary body with the secondary body.
Figure 83:
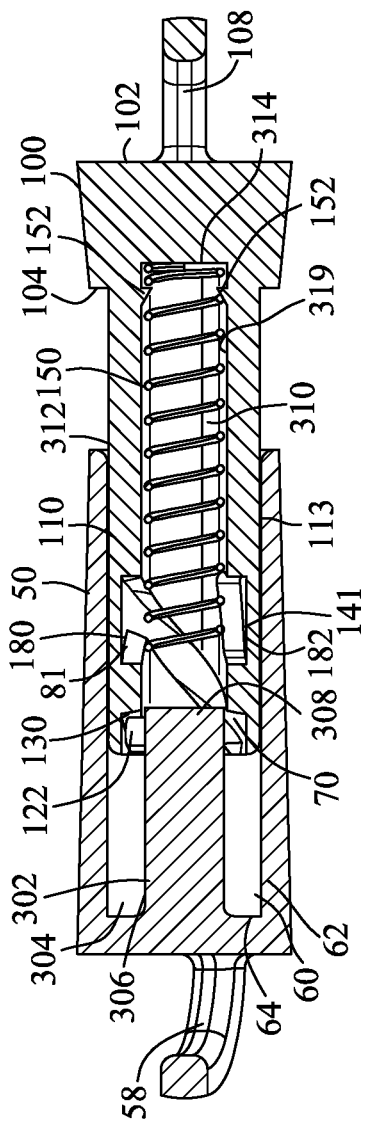
FIG. 83 is a view similar to FIG. 82 illustrating the first leg slidably engaging within a first groove and the second leg slidably engaging within a second groove during diverging and rotating the primary body relative to the secondary body.
Figure 98:
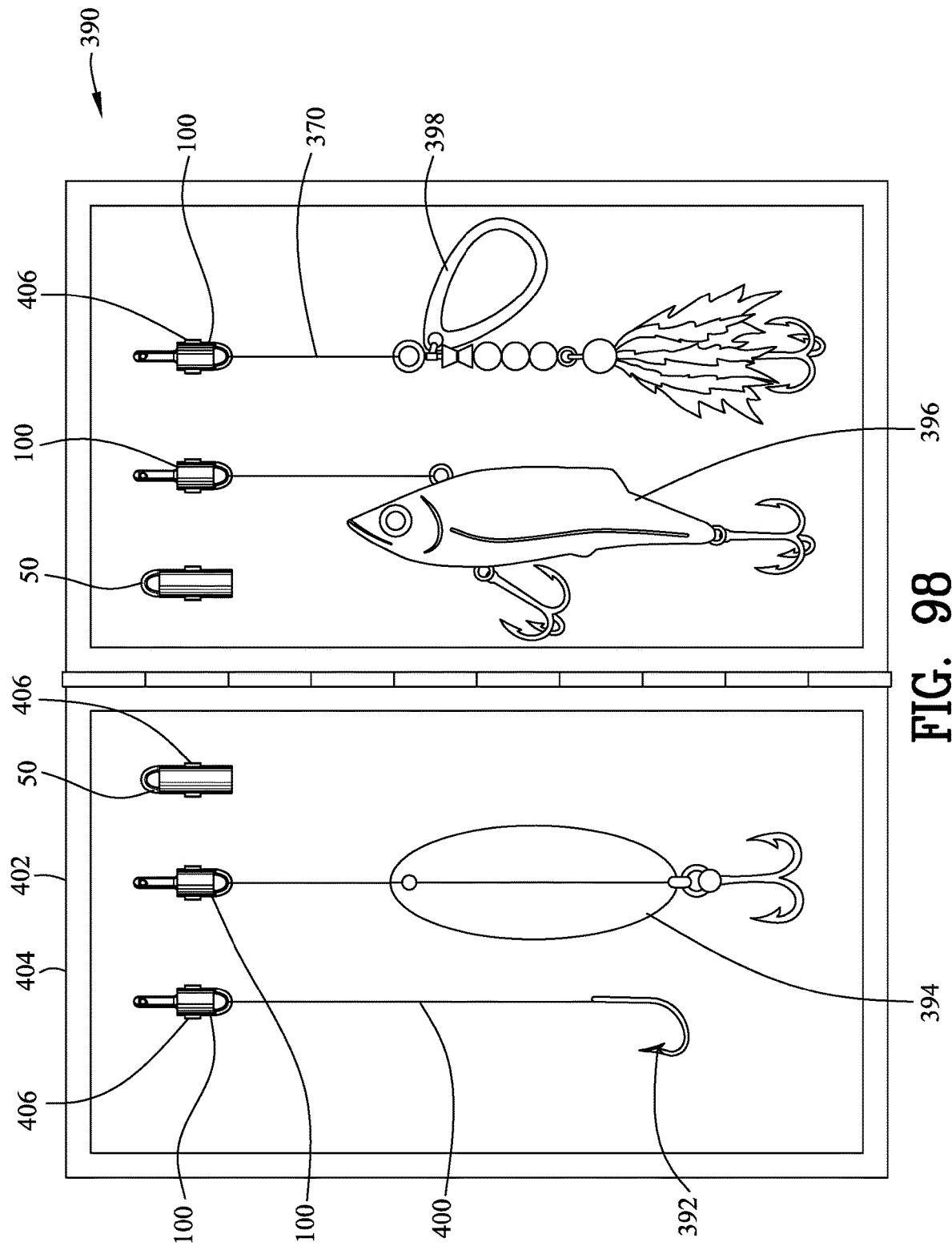
FIG. 98 is a view of a container storing a plurality of the second elongated members in FIGS. 84-87, 90, 91, 94 and 95.

FIGS. 1-98 are various views of a clasp 10 for coupling a first end 12 and a second end 14 of an elongated member 16. The elongated member 16 may include a piece of jewelry 20 such as a necklace 22 worn on the neck 32 of a human 30 or a bracelet 24 worn on the wrist 34 of the human 30. Alternatively, the elongated member 16 may include a rope 40, a cable 42 or a chain 44.

FIGS. 1-58 illustrates a clasp 10 comprises a primary body 50 extending between a primary proximal end 52 and a primary distal end 54. A bore 60 defining a bore wall 62 is within the primary body 50 and extends from a bore proximal end 64 and a bore distal end 66. The bore distal end 66 is commensurate with the primary distal end 54.

A groove 70 is within the bore wall 62 and extends from a first proximal end 72 and a first distal end 74. The first distal end 74 is commensurate to the primary distal end 54. A curved locking channel 80 or a shaped locking channel 84 is coupled to the first proximal end 72 of the groove 70. The primary proximal end 52 of the primary body 50 is coupled to the first end 12 the elongated member 16.

A secondary body 100 extends between a secondary proximal end 102 and a secondary distal end 104. A rod 110 defining a rod wall 112 extends from a rod proximal end 114 and a rod distal end 116. The rod proximal end 114 is coupled to the secondary distal end 104.

A leg 120 extends from the rod wall 112 adjacent to the rod distal end 116. The secondary proximal end 102 of the secondary body 100 is coupled to the second end 14 of the elongated member 16. The leg 120 slidably engages within the groove 70 during converging and rotating the primary body 50 relative to the secondary body 100 and positions the leg 120 adjacent the curved locking channel 80 or the shaped locking channel 84. The leg 120 slidably engages within the curved locking channel 80 or the first shaped locking channel 84 upon diverging the primary body 50 with the secondary body 100 for coupling the primary body 50 with the secondary body 100. The leg 120 slidably disengages within the curved locking channel 80 or the first shaped locking channel 84 upon converging the primary body 50 with the secondary body 100 for decoupling the primary body 50 with the secondary body 100. The leg 120 slidably engages within the groove 70 during diverging and rotating the primary body 50 relative to the secondary body 100 and withdrawing the leg 120 from the groove 70 for decoupling the primary body 50 with the secondary body 100.

Preferably, the primary body 50 further includes a second groove 130 within the bore wall 62 extending from a second proximal end 132 and a second distal end 134. The second distal end 134 is commensurate to the primary distal end 54. A second curved locking channel 140 or a second shaped locking channel 144 is coupled to the second proximal end 132 of the second groove 130. A second leg 122 extends from the rod wall 112 adjacent to the rod distal end 116. The second leg 112 slidably engages within the second groove 130 during converging and rotating the primary body 50 relative to the secondary body 100 and positions the second leg 122 adjacent to the second curved locking channel 140 or the second shaped locking channel 144. The second leg 122 slidably engages within second curved locking channel 140 or the second shaped locking channel 144 upon diverging the primary body 50 with the secondary body 100 for coupling the primary body 50 with the secondary body 100.

The second leg 112 slidably disengages within the second curved locking channel 140 or the second shaped locking channel 144 upon converging the primary body 50 with the secondary body 100 for decoupling the primary body 50 with the secondary body 100. The second leg 122 slidably engages within the second groove 130 during diverging and rotating the primary body 50 relative to the secondary body 100 and withdrawing second leg 122 from the second groove 130 for decoupling the primary body 50 with the secondary body 100.

The groove 70 preferably includes a first spiral groove 76 and the second groove 130 includes a second spiral groove 136. The curved locking channel 80 or the shaped locking channel 84 may include a first general J-shaped locking channel 82. Similarly, the second curved locking channel 140 or the second shaped locking channel 144 may includes a second general J-shaped locking channel 142.

A spring 150 is within the bore 60 and compresses between the bore proximal end 64 and the rod distal end 116 during the leg 120 slidably engaging within the spiral groove 76 and the second leg 122 slidably engaging within the second spiral groove 136 during converging and rotating the primary body 50 relative to the secondary body 100. The spring 150 applies an expansion force between the bore proximal end 64 and the rod distal end 116 during the leg 120 slidably engaging within the curved locking channel 80 or the shaped locking channel 84 and the second leg 122 slidably engaging within the second curved locking channel 140 or the second shaped locking channel 144 upon diverging the primary body 50 relative to the secondary body 100. The expansion force maintains the leg 120 within the first curved locking channel 80 or the shaped locking channel 84 and the second leg 122 within the second curved locking channel 140 or the second shaped locking channel 144 for preventing inadvertent separation of the primary body 50 and the secondary body 100. The spring 150 is compressed between the bore proximal end 64 and the rod distal end 116 during the leg 120 slidably disengaging within the first curved locking channel 80 or the shaped locking channel 84 and the second leg 122 slidably disengaging within the second curved locking channel 140 or the second shaped locking channel 144 upon converging the primary body 50 with the secondary body 100. The spring 150 applies an expansion force between the bore proximal end 64 and the rod distal end 116 during the leg 120 slidably engaging within the groove 70 and the second leg 122 slidably engaging within the second groove 130 during diverging and rotating the primary body 50 relative to the secondary body 100.

A spring retainer 152 may be coupled to the bore wall 62 and approximate to the bore proximal end 64. The spring retainer 152 maintains the spring 150 within the bore 60 during separation of the primary body 50 and the secondary body 100.

The leg 120 includes a front half surface 160 and a rear half surface 164. The front half surface 160 of the leg 120 may include a first general C-shape 162. The rear half surface 164 of the leg 120 may include a first general V-shape 166. The second leg 122 includes a front half surface 170 and a rear half surface 174. The front half surface 170 of the second leg 122 may include a second general C-shape 172. The rear half surface 174 of the second leg 122 may include a second general V-shape 176.

Preferably, the curved locking channel 80 or the shaped locking channel 84 includes a first general V-shape wall 180 for receiving the first general V-shape 166 and assisting in preventing displacement of the leg 120 relative to the curved locking channel 80 or the shaped locking channel 84 during coupling of the primary body 50 with the secondary body 100. In addition, the second curved locking channel 140 or the second shaped locking channel 144 preferably includes a second general V-shape wall 182 for receiving the second general V-shape 176 and assisting in preventing displacement of the second leg 122 relative to the second curved locking channel 140 or the second shaped locking channel 144 during coupling of the primary body 50 with the secondary body 100.

The curved locking channel 80 or the shaped locking channel 84 may include a first upper entrance wall 190 opposing a first lower entrance wall 192 and a first guide wall 194 adjacent to a first terminal wall 196. The first general V-shape wall 180 is positioned between the first upper entrance wall 190 and the first terminal wall 196. The first guide wall 194, the first terminal wall 1% and the first general V-shape wall 180 define a first locking chamber 198 for preventing the inadvertent removal of the first leg 120 from the first locking chamber 198.

The first lower entrance wall 192 may include a first accurate wall 200 for promoting the leg 120 to be channeled into the first locking chamber 198. The first upper entrance wall 190 and the first general V-shape wall 180 define a first upper intersection 202 and a first upper angle 204 there between. The first lower entrance wall 192 and the first guide wall 194 define a first lower intersection 206 and a first lower angle 208 there between. The first guide wall 194 and the first terminal wall 196 define a first main intersection 210 and a first main angle 212 there between.

The first lower intersection 206 preferably defines a first interior offset 214 into the first locking chamber 198 relative to the first upper intersection 202 for preventing the inadvertent removal of the first leg 120 from the first locking chamber 198. The first general V-shape wall 180 may define a first recessed inset 216 relative to the first upper intersection 202. The first recessed inset 216 further prevents the inadvertent removal of the first leg 120 from the first locking chamber 198.

The first upper angle 204 may include a first reflex angle 220. The first lower angle 208 may include a first primary obtuse angle 222. The first main angle 212 may include a first secondary obtuse angle 224. The first reflex angle 220, the first primary obtuse angle 222 and the first secondary obtuse angle 224 promote the first leg 120 to be channeled into the first general V-shape wall 180.

Similarly, the second curved locking channel 140 or the second shaped locking channel 144 may include a second upper entrance wall 230 opposing a second lower entrance wall 232 and a second guide wall 234 adjacent to a second terminal wall 236. The second general V-shape wall 182 is positioned between the second upper entrance wall 230 and the second terminal wall 236. The second guide wall 234, the second terminal wall 236 and the second general V-shape wall 182 define a second locking chamber 238 for preventing the inadvertent removal of the second leg 122 from the second locking chamber 238.

The second lower entrance wall 232 may include a second accurate wall 240 for promoting the second leg 122 to be channeled into the second locking chamber 238. The second upper entrance wall 230 and the second general V-shape wall 182 define a second upper intersection 242 and a second upper angle 244 there between. The second lower entrance wall 232 and the second guide wall 234 define a second lower intersection 246 and a second lower angle 248 there between. The second guide wall 234 and the second terminal wall 236 define a second main intersection 250 and a second main angle 252 there between. The second lower intersection 246 may define a second interior offset 254 into the second locking chamber 238 relative to the second upper intersection 242 for preventing the inadvertent removal of the second leg 122 from the second locking chamber 238.

The second general V-shape wall 182 may define a second recessed inset 256 relative to the second upper intersection 242. The second recessed inset 256 prevents the inadvertent removal of the second leg 122 from the second locking chamber 238. The second upper angle 244 may include a second reflex angle 260. The second lower angle 248 may include a second primary obtuse angle 262. The second main angle 252 may include a second secondary obtuse angle 264. The second reflex angle 260, the second primary obtuse angle 262 and the second secondary obtuse angle 264 promote the second leg 122 to be channeled into the second general V-shape wall 182.

The primary body 50 includes a primary grasping area 56 for handling the primary body 50. The secondary body 100 includes a secondary grasping area 106 for handling the secondary body 100. The proximal end 52 of the primary body 50 includes a primary eyelet 58 for coupling with the first end 12 of the elongated member 16. The proximal end 102 of the secondary body 100 includes a secondary eyelet 108 for coupling with the second end 14 of the elongated member 16.

The clasp 10 may further include a first tapering groove 270 extending from the distal end 54 of the primary body 50 to the groove 70. Similarly, a second tapering groove 272 extends from the distal end 54 of the primary body 50 to the second groove 130. The first tapering groove 270 receives the leg 120 and the second tapering groove 272 receives the second leg 122 for channeling the leg 120 and the second leg 122 into the first groove 70 and the second groove 130 respectively upon converging and the rotating the primary body 50 relative to the secondary body 100.

The clasp 10 may further include a reinforcing cap 280 coupled to the rod distal end 116 for preventing wear between the spring 150 and the rod 110.

FIGS. 33-58 illustrate a second embodiment of the clasp 10. The clasp 10 in FIGS. 33-58 includes a pin 302 coupled to the bore proximal end 64 and extending within the bore 60. The pin 302 and the bore wall 62 define an annular channel 304. A pin bore 310 is within the rod 110 for defining an annular shaft 312. The pin 302 is inserted into the pin bore 310 and the annular shaft 312 slidably engaging within the annular channel 304 during coupling and decoupling the primary body 50 with the secondary body 100 for aligning the primary body 50 relative to the secondary body 100.

The pin 302 extends between a pin proximal end 306 and a pin distal end 308. Preferably, the pin distal end 308 is positioned to the exterior of the primary distal end 54 for defining an alignment head 309. The pin bore 310 extends between a pin bore proximal end 314 and a pin bore distal end 316. The pin bore proximal end 314 is positioned within the secondary body 100 for receiving the alignment head 309 within the pin bore 310. The alignment head 309 is inserted to the pin bore 310 for aligning the bore 60 relative to the rod 110.

As shown in FIGS. 56-58, the spring 150 is positioned within the annular channel 304. The spring 150 is compressed between the bore proximal end 64 and the rod distal end 116 during the leg 120 slidably engaging within the spiral groove 76 and the second leg 122 slidably engaging within the second spiral groove 136 during converging and rotating the primary body 50 relative to the secondary body 100. The spring 150 applies an expansion force between the bore proximal end 64 and the rod distal end 116 during the leg 120 slidably engaging within the curved locking channel 80 or the shaped locking channel 84 and the second leg 122 slidably engaging within the second curved locking channel 140 or the second shaped locking channel 144 upon diverging the primary body 50 relative to the secondary body 100. The expansion force maintains the leg 120 within the first curved locking channel 80 or the shaped locking channel 84 and the second leg 122 within the second curved locking channel 140 or the second shaped locking channel 144 for preventing inadvertent separation of the primary body 50 and the secondary body 100. The spring 150 is compressed between the bore proximal end 64 and the rod distal end 116 during the leg 120 slidably disengaging within the first curved locking channel 80 or the shaped locking channel 84 and the second leg 122 slidably disengaging within the second curved locking channel 140 or the second shaped locking channel 144 upon converging the primary body 50 with the secondary body 100. The spring 150 applies the expansion force between the bore proximal end 64 and the rod distal end 116 during the leg 120 slidably engaging within the groove 70 and the second leg 122 slidably engaging within the second groove 130 during diverging and rotating the primary body 50 relative to the secondary body 100.

The spring retainer 152 is coupled to the bore wall 62 and approximate to the bore proximal end 64. The spring retainer 152 maintains the spring 150 within the bore 60 during separation of the primary body 50 and the secondary body 100.

As shown in FIGS. 56-58, the spring 150 is positioned within the pin bore 310. The spring 150 is compressed between the pin bore proximal end 314 and the pin distal end 308 during the leg 120 slidably engaging within the groove 70 and the second leg 122 slidably engaging within the second groove 122 during converging and rotating the primary body 50 relative to the secondary body 100. The spring 150 applies an expansion force between the pin bore proximal end 314 and the pin distal end 308 during the leg 120 slidably engaging within the curved locking channel 80 or the shaped locking channel 84 and the second leg 122 slidably engaging within the second curved locking channel 140 or the second shaped locking channel 144 upon diverging the primary body 50 relative to the secondary body 100. The expansion force maintains the leg 120 within the first curved locking channel 80 or the shaped locking channel 84 and the second leg 122 within the second curved locking channel 140 or the second shaped locking channel 144 for preventing inadvertent separation of the primary body 50 and the secondary body 100. The spring 150 is compressed between the pin bore proximal end 314 and the pin distal end 308 during the leg 120 slidably disengaging within the first curved locking channel 80 or the shaped locking channel 84 and the second leg 122 slidably disengaging within the second curved locking channel 140 or the second shaped locking channel 144 upon converging the primary body 50 with the secondary body 100. The spring 150 applies the expansion force between the pin bore proximal end 314 and the pin distal end 308 during the leg 120 slidably engaging within the groove 70 and the second leg 122 slidably engaging within the second groove 130 during diverging and rotating the primary body 50 relative to the secondary body 100.

A spring retainer 152 is coupled to a pin bore wall 318 and approximate to the pin bore proximal end 314. The spring retainer 152 maintains the spring 150 within the pin bore 310 during separation of the primary body 50 and the secondary body 100.

The clasp 10 as shown in FIGS. 1-58 may be constructed of only three individual parts, namely the primary body 50, the secondary body 100 and the spring 150. The primary body 50, the secondary body 100 and the spring 150 may be constructed from a metallic, polymeric or combination thereof. Furthermore, the primary body 50 and the secondary body 100 may be constructed by a lower composition and an upper composition. More specifically, a lower composition may include a less expensive, more abundant and/or a filler material and the upper composition may include a more expensive, less abundant and/or more ornate material. For example, the lower composition may be constructed of an aluminum, steel, low purity gold, polymeric material or other materials and the upper composition may be constructed of a silver, platinum, rhodium, palladium, high purity gold or other precious metals. The primary body 50, the secondary body 100 and the spring 150 may be constructed from an injection molding process, a direct metal laser sintering (DMLS), laser deposition or other processes.

The clasp 10 as shown in FIGS. 1-58 is shown to be constructed of a first groove 70 and a second groove 130. However, the clasp 10 may be constructed of only a single groove 70 within the primary body 50. The clasp 10 may further be constructed of a first groove 70, a second groove 130 and a third groove for more easily positioning the rod 110 within the bore 60. The first groove 70, the second groove 130 and the possible third groove may either include a clockwise rotation for a counterclockwise rotation. The rotational displacement of the primary body 50 relative to the secondary body 100 in order to transition the first leg 120 and the second leg 122 between the bore distal end 66 and the bore proximal end 64 may be varied depending upon the angular configuration of the first groove 70 and the angular configuration of the second groove 130. The rotational displacement of the primary body 50 relative to the secondary body 100 may be between 45° and 270°. Preferably the rotational displacement of the primary body 50 relative to the secondary body 100 may be between 90° and 180°. The clasp of 10 permits a user to coupled the primary body 50 with the secondary body 100 by merely utilizing two fingers to compress the primary body 50 and the secondary body 100 together.

In an alternative embodiment to the clasp 10, the dimensions of the primary body 50 and the dimensions of the secondary body 100 are such that they first friction coupling. Furthermore, the dimensions between the secondary distal end 104 and the first leg 120 and the second leg 122 are only slightly greater than the dimensions between the primary distal end 54 and the first shaped locking channel 84 and the second shaped locking channel 144 for providing a second friction coupling. The first friction coupling and the second friction coupling permit the elimination of the spring 150.

FIGS. 59-78 a third embodiment of the clasp 10. The third embodiment shown in FIGS. 59-78 A clasp 10 comprises a primary body 50 extending between a primary proximal end 52 and a primary distal end 54. A bore 60 defines a bore wall 62 within the primary body 50 extending from a bore proximal end 64 and a bore distal end 66. The bore distal end 66 is commensurate with the primary distal end 54. A pin 302 is coupled to the bore proximal end 64 and extending within the bore 60. The pin 302 and the bore wall 62 define an annular channel 304. A leg 120 is coupled to the pin 302 and extends into the annular channel 304. The primary proximal end 52 of the primary body 50 is coupled to the first end 12 the elongated member 16.

A secondary body 100 extends between a secondary proximal end 102 and a secondary distal end 104. A rod 110 defines an exterior rod wall 112 extending from a rod proximal end 114 and a rod distal end 116. The rod proximal end 114 is coupled to the secondary distal end 104. A pin bore 310 is within the rod 110 for defining an annular shaft 312 and an interior rod wall 318. A groove 70 is within the interior rod wall 318 and extends from a first proximal end 72 and a first distal end 74. The first distal end 74 is commensurate to the rod distal end 116. A locking channel 81 is coupled to the first proximal end 72 of the groove 70. The secondary proximal end 102 of the secondary body 100 is coupled to the second end 14 of the elongated member 16.

The annular shaft 312 is inserted into the bore 60 and the annular shaft 312 slidably engages within the annular channel 304 during coupling and decoupling the primary body 50 with the secondary body 100 for aligning the primary body 50 relative to the secondary body 100. The leg 120 slidably engages within the groove 70 during converging and rotating the primary body 50 relative to the secondary body 100 and positioning the leg 120 adjacent to the locking channel 81. The leg 120 slidably engages within the locking channel 81 upon diverging the primary body 50 with the secondary body 100 for coupling the primary body 50 with the secondary body 100. The leg 120 slidably disengages within the locking channel 80 upon converging the primary body 50 with the secondary body 100 for decoupling the primary body 50 with the secondary body 100. The leg 120 slidably engages within the groove 70 during diverging and rotating the primary body 50 relative to the secondary body 100 and withdrawing the leg 120 from the groove 70 for decoupling the primary body 50 with the secondary body 100.

A second groove 130 may be within the interior rod wall 319 and extending from a second proximal end 132 and a second distal end 134. The second distal end 134 is commensurate to the rod distal end 116. A second locking channel 141 is coupled to the second proximal end 132 of the second groove 130. A second leg 122 is coupled to the pin 302 and extends into the annular channel 304. The second leg 122 slidably engages within the second groove 130 during converging and rotating the primary body 50 relative to the secondary body 100 and positioning the second leg 122 adjacent to the second locking channel 141. The second leg 122 slidably engages within second locking channel 141 upon diverging the primary body 50 with the secondary body 100 for coupling the primary body 50 with the secondary body 100. The second leg 122 slidably disengages within the second locking channel 141 upon converging the primary body 50 with the secondary body 100 for decoupling the primary body 50 with the secondary body 100. The second leg 122 slidably engages within the second groove 130 during diverging and rotating the primary body 50 relative to the secondary body 100 and withdrawing second leg 122 from the second groove 130 for decoupling the primary body 10 with the secondary body.

The groove 70 may include a first spiral groove 76. Similarly, the second groove 130 may include a second spiral groove 136. The locking channel 81 may include a first general J-shaped locking channel 82. Similarly, the second locking channel 141 may include a second general J-shaped locking channel 142.

The clasp 10 may further include a spring 150 within the pin bore 310. The spring 150 compresses against the pin 302 during the leg 120 slidably engaging within the groove 70 and the second leg 122 slidably engaging within the second groove 130 during converging and rotating the primary body 50 relative to the secondary body 100. The spring 150 further applies an expansion force against the pin 302 during the leg 120 slidably engaging within the locking channel 81 and the second leg 122 slidably engaging within the second locking channel 141 upon diverging the primary body 50 relative to the secondary body 100. The expansion force maintaining the leg 120 within the first locking channel 81 and the second leg 122 within the second locking channel 141 for preventing inadvertent separation of the primary body 50 and the secondary body 100.

The spring 150 is compressed against the pin 302 during the leg 120 slidably disengaging within the first locking channel 81 and the second leg 122 slidably disengaging within the second locking channel 141 upon converging the primary body 50 with the secondary body 100. The spring 150 applies the expansion force against the pin 302 during the leg 120 slidably engaging within the groove 70 and the second leg 122 slidably engaging within the second groove 130 during diverging and rotating the primary body 50 relative to the secondary body 100.

A spring retainer 152 may be coupled to the interior rod wall 319. The spring retainer 152 maintains the spring 150 within the pin bore 310 during separation of the primary body 50 and the secondary body 100.

The leg 120 may include a front half surface 160 and a rear half surface 164. The front half surface 160 of the leg 120 includes a first general C-shape 162. The rear half surface 164 of the leg 120 includes a first general V-shape 166. Similarly, the second leg 122 may include a front half surface 170 and a rear half surface 174. The front half surface 170 of the second leg 120 includes a second general C-shape 172. The rear half surface 174 of the second leg 122 includes a second general V-shape 176.

The locking channel 81 may include a first general V-shape wall 180 for receiving the first general V-shape 166 and assisting in preventing displacement of the leg 120 relative to the locking channel 81 during coupling of the primary body 50 with the secondary body 100. Similarly, the second locking channel 141 may include a second general V-shape wall 182 for receiving the second general V-shape 176 and assisting in preventing displacement of the second leg 122 relative to the second locking channel 141 during coupling of the primary body 50 with the secondary body 100.

The locking channel 81 may include a first upper entrance wall 190 opposing a first lower entrance wall 192 and a first guide wall 194 adjacent to a first terminal wall 196. The first general V-shape wall 180 is between the first upper entrance wall 190 and the first terminal wall 196. The first guide wall 194, the first terminal wall 196 and the first general V-shape wall 180 define a first locking chamber 198 for preventing the inadvertent removal of the first leg 120 from the first locking chamber 198.

The second locking channel 141 includes a second upper entrance wall 230 opposing a second lower entrance wall 232 and a second guide wall 234 adjacent to a second terminal wall 236. The second general V-shape wall 182 is between the second upper entrance wall 230 and the second terminal wall 236. The second guide wall 234, the second terminal wall 236 and the second general V-shape wall 182 define a second locking chamber 238 for preventing the inadvertent removal of the second leg 122 from the second locking chamber 238.

The first lower entrance wall 192 may include a first accurate wall 200 for promoting the leg 120 to be channeled into the first locking chamber 198. Similarly, the second lower entrance wall 232 may include a second accurate wall 240 for promoting the second leg 122 to be channeled into the second locking chamber 238.

The first upper entrance wall 190 and the first general V-shape wall 180 define a first upper intersection 202 and a first upper angle 204 there between. The first lower entrance wall 192 and the first guide wall 194 define a first lower intersection 206 and a first lower angle 208 there between. The first guide wall 194 and the first terminal wall 196 define a first main intersection 210 and a first main angle 212 there between. The first lower intersection 206 defines a first interior offset 214 into the first locking chamber 198 relative to the first upper intersection 202 for preventing the inadvertent removal of the first leg 120 from the first locking chamber 198.

The second upper entrance wall 230 and the second general V-shape wall 182 define a second upper intersection 242 and a second upper angle 244 there between. The second lower entrance wall 232 and the second guide wall 234 define a second lower intersection 246 and a second lower angle 248 there between. The second guide wall 234 and the second terminal wall 236 define a second main intersection 250 and a second main angle 252 there between. The second lower intersection 246 defines a second interior offset 254 into the second locking chamber 238 relative to the second upper intersection 242 for preventing the inadvertent removal of the second leg 122 from the second locking chamber 238.

The first general V-shape wall 180 may define a first recessed inset 216 relative to the first upper intersection 202. The first recessed inset 216 prevents the inadvertent removal of the first leg 120 from the first locking chamber 198. Similarly, the second general V-shape wall 182 may define a second recessed inset 256 relative to the second upper intersection 242. The second recessed inset 256 prevents the inadvertent removal of the second leg 122 from the second locking chamber 238.

The first upper angle 204 may include a first reflex angle 220. The first lower angle 208 may include a first primary obtuse angle 222. The first main angle 212 may include a first secondary obtuse angle 224. The first reflex angle 220, the first primary obtuse angle 222 and the first secondary obtuse angle 224 promote the first leg 120 to be channeled into the first general V-shape wall 180.

The second upper angle 244 may include a second reflex angle 260. The second lower angle 248 may include a second primary obtuse angle 262. The second main angle 252 may include a second secondary obtuse angle 264. The second reflex angle 260, the second primary obtuse angle 262 and the second secondary obtuse angle 264 promote the second leg 122 to be channeled into the second general V-shape wall 182.

The primary body 50 may include a primary grasping area 56 for handling the primary body 50. The secondary body 150 including a secondary grasping area 106 for handling the secondary body 150.

The proximal end 52 of the primary body 50 may include a primary eyelet 58 for coupling with the first end 12 of the elongated member 16. The proximal end 102 of the secondary body 100 may include a secondary eyelet 108 for coupling with the second end 14 of the elongated member 16.

The clasp 10 may further include a first tapering groove 270 extending from the rod distal end 116 of the rod 110 to the groove 70. A second tapering groove 272 may extend from the rod distal end 116 of the rod 110 to the second groove 130. The first tapering groove 270 receives the leg 120 and the second tapering groove 272 receiving the second leg 122 for channeling the leg 120 and the second leg 122 into the first groove 70 and the second groove 130 respectively upon converging and the rotating the primary body 50 relative to the secondary body 100.

FIGS. 84-89 and 98 illustrate the clasp 10 as shown in FIGS. 1-32 and described above, utilized for coupling a first elongated member 350 with a second elongated member 360. The first elongated member 350 extends between a first elongated member end 352 and a second elongated member end 354. The second elongated member 360 extends between a first elongated member end 362 and a second elongated member end 364.

The first elongated member 350 and the second elongated member 360 may include a tether 370 or other flexible or rigid members. As shown in FIGS. 84-87, the tether 370 may include fishing line 372, trolling line 374, fishing net line 376 or towing line 380.

The first elongated member end 352 of the first elongated member 350 is coupled to the primary eyelet 58 of the primary body 50. The second elongated member end 354 of the first elongated member 350 maybe coupled as illustrated in FIGS. 84-87 to a fishing reel 416. The fishing reel 416 is coupled to a fishing pole 410.

The first elongated member end 362 of the second elongated member 360 is coupled to the secondary eyelets 108 of the primary body 100. The second elongated member end 364 of the second elongated member 360 may be coupled to an object 390. The object 390 may include a fishing hook 392, fishing spoon 394, fishing lure 396, a fishing spinner bait 398 or other objects. The second elongated member 360 may include a fishing leader line 400 that is resistant to breakage upon contact with a fish. The fishing leader line 400 may include a metallic cable or other reinforced tethers.

As shown in FIG. 1-32, 84, 88, 89 and described above, the primary body 50 and the secondary body 100 of the clasp 10 may be coupled for joining the object 390 with the first elongated member 350. As shown in FIG. 1-32, 85, 88, 89 and described above, the primary body 50 and the secondary body 100 of the clasp 10 may be decoupled for removing the object 390 with the first elongated member 350. As shown in FIG. 1-32, 86-89 and described above, the primary body 50 and the secondary body 100 of the clasp 10 may be coupled for joining an alternative object 390 such as a fishing spoon 392 with the first elongated member 350. The clasp 10 permits the expedited exchange of different objects 390 from the tether 370. More specifically, the clasp 10 permits the expedited exchange of different fishing devices from the fishing pole 410 and the fishing reel 412 combination. Furthermore, the clasp 10 prevents the inadvertent disengagement of the object 390 from the tether 370 by requiring converging the primary body 50 with the secondary body 100 for decoupling the primary body 50 with the secondary body 100.

FIG. 98 illustrates a plurality of objects 390 housed within a container 402. The container 402 may include a tackle box 404. The container 402 may include a plurality of spring holder devices 406 that secure the secondary body 100 within the container. The container 402 may further include a plurality of spring holder devices 406 that secure the s primary body 50 within the container. The container 402 provides more convenient transportation of the plurality of objects 309 coupled to the secondary body 100 by the tether 370. The plurality of spring holder devices 406 facilitates the easy and quick removal of the plurality of objects 309 coupled to the secondary body 100 by the tether 370.

FIGS. 90-93 illustrate the clasp 10 as shown in FIGS. 33-58 and described above, utilized for coupling the first elongated member 350 with the second elongated member 360. The first elongated member 350 extends between the first elongated member end 352 and the second elongated member end 354. The second elongated member 360 extends between the first elongated member end 362 and the second elongated member end 364.

The first elongated member 350 and the second elongated member 360 may include the tether 370 or other flexible or rigid members. As shown in FIGS. 90 and 91, the tether 370 may include fishing line 372, trolling line 374, fishing net line 376 or towing line 380.

The first elongated member end 352 of the first elongated member 350 is coupled to the primary eyelet 58 of the primary body 50. The second elongated member end 354 of the first elongated member 350 maybe coupled as illustrated in FIGS. 90 and 91 to the fishing reel 416. The fishing reel 416 is coupled to the fishing pole 410.

The first elongated member end 362 of the second elongated member 360 is coupled to the secondary eyelets 108 of the primary body 100. The second elongated member end 364 of the second elongated member 360 may be coupled to the object 390. The object 390 may include the fishing hook 392, fishing spoon 394, fishing lure 396, the fishing spinner bait 398 or other objects. The second elongated member 360 may include the fishing leader line 400 that is resistant to breakage upon contact with a fish. The fishing leader line 400 may include a metallic cable or other reinforced tethers.

As shown in FIG. 33-58, 90-93 and described above, the primary body 50 and the secondary body 100 of the clasp 10 may be coupled for joining the object 390 with the first elongated member 350. As shown in FIG. 33-58, 90-93 and described above, the primary body 50 and the secondary body 100 of the clasp 10 may be decoupled for removing the object 390 with the first elongated member 350. As shown in FIG. 33-58, 90-93 and described above, the primary body 50 and the secondary body 100 of the clasp 10 may be coupled for joining an alternative object 390 with the first elongated member 350. The clasp 10 permits the expedited exchange of different objects 390 from the tether 370. More specifically, the clasp 10 permits the expedited exchange of different fishing devices from the fishing pole 410 and the fishing reel 412 combination. Furthermore, the clasp 10 prevents the inadvertent disengagement of the object 390 from the tether 370 by requiring converging the primary body 50 with the secondary body 100 for decoupling the primary body 50 with the secondary body 100.

FIGS. 94-97 illustrate the clasp 10 as shown in FIGS. 59-83 and described above, utilized for coupling the first elongated member 350 with the second elongated member 360. The first elongated member 350 extends between the first elongated member end 352 and the second elongated member end 354. The second elongated member 360 extends between the first elongated member end 362 and the second elongated member end 364.

The first elongated member 350 and the second elongated member 360 may include the tether 370 or other flexible or rigid members. As shown in FIGS. 94 and 95, the tether 370 may include fishing line 372, trolling line 374, fishing net line 376 or towing line 380.

The first elongated member end 352 of the first elongated member 350 is coupled to the primary eyelet 58 of the primary body 50. The second elongated member end 354 of the first elongated member 350 maybe coupled as illustrated in FIGS. 94 and 95 to the fishing reel 416. The fishing reel 416 is coupled to the fishing pole 410.

The first elongated member end 362 of the second elongated member 360 is coupled to the secondary eyelets 108 of the primary body 100. The second elongated member end 364 of the second elongated member 360 may be coupled to the object 390. The object 390 may include the fishing hook 392, fishing spoon 394, fishing lure 396, the fishing spinner bait 398 or other objects. The second elongated member 360 may include the fishing leader line 400 that is resistant to breakage upon contact with a fish. The fishing leader line 400 may include a metallic cable or other reinforced tethers.

As shown in FIG. 59-83, 94-97 and described above, the primary body 50 and the secondary body 100 of the clasp 10 may be coupled for joining the object 390 with the first elongated member 350. As shown in FIG. 33-58 and 94-97 and described above, the primary body 50 and the secondary body 100 of the clasp 10 may be decoupled for removing the object 390 with the first elongated member 350. As shown in FIG. 59-83 and described above, the primary body 50 and the secondary body 100 of the clasp 10 may be coupled for joining an alternative object 390 with the first elongated member 350. The clasp 10 permits the expedited exchange of different objects 390 from the tether 370. More specifically, the clasp 10 permits the expedited exchange of different fishing devices from the fishing pole 410 and the fishing reel 412 combination. Furthermore, the clasp 10 prevents the inadvertent disengagement of the object 390 from the tether 370 by requiring converging the primary body 50 with the secondary body 100 for decoupling the primary body 50 with the secondary body 100.

The spring 150 as described above may include an expansion force device 420 including a coiled spring, a rubber structure, a polymeric structure, a foam structure or other devices which provides an expansion force in response to an exterior compressive force. The expansion force device 420 is within the bore 60 and compresses between the bore proximal end 64 and the rod distal end 116 during the leg 120 slidably engaging within the spiral groove 76 and the second leg 122 slidably engaging within the second spiral groove 136 during converging and rotating the primary body 50 relative to the secondary body 100. The expansion force device 420 applies an expansion force between the bore proximal end 64 and the rod distal end 116 during the leg 120 slidably engaging within the curved locking channel 80 or the shaped locking channel 84 and the second leg 122 slidably engaging within the second curved locking channel 140 or the second shaped locking channel 144 upon diverging the primary body 50 relative to the secondary body 100. The expansion force maintains the leg 120 within the first curved locking channel 80 or the shaped locking channel 84 and the second leg 122 within the second curved locking channel 140 or the second shaped locking channel 144 for preventing inadvertent separation of the primary body 50 and the secondary body 100. The expansion force device 420 is compressed between the bore proximal end 64 and the rod distal end 116 during the leg 120 slidably disengaging within the first curved locking channel 80 or the shaped locking channel 84 and the second leg 122 slidably disengaging within the second curved locking channel 140 or the second shaped locking channel 144 upon converging the primary body 50 with the secondary body 100. The expansion force device 420 applies an expansion force between the bore proximal end 64 and the rod distal end 116 during the leg 120 slidably engaging within the groove 70 and the second leg 122 slidably engaging within the second groove 130 during diverging and rotating the primary body 50 relative to the secondary body 100.

An expansion force retainer 422 may be coupled to the bore wall 62 and approximate to the bore proximal end 64. The expansion force retainer 422 maintains the expansion force device 420 within the bore 60 during separation of the primary body 50 and the secondary body 100. The expansion force retainer 422 may include a one or more protruding knobs, an adhesive or other structures or coupling methods.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A clasp for coupling a first elongated member with a second elongated member, comprising:
   a primary body extending between a primary proximal end and a primary distal end;
   a bore defining a bore wall within said primary body extending from a bore proximal end and a bore distal end;
   said bore distal end commensurate with said primary distal end;
   a groove within said bore wall extending from a first proximal end and a first distal end;
   said first distal end commensurate to said primary distal end;
   a curved locking channel within said bore wall coupled to said first proximal end of said groove;
   said primary proximal end of said primary body coupled to the first elongated member;
   a secondary body extending between a secondary proximal end and a secondary distal end;
   a rod defining a rod wall extending from a rod proximal end and a rod distal end;
   said rod proximal end coupled to said secondary distal end;
   a leg extending from said rod wall adjacent to said rod distal end;
   said secondary proximal end of said secondary body coupled to the second elongated member;
   said leg slidably engaging within said groove during converging and rotating said primary body relative to said secondary body and positioning said leg adjacent to said curved locking channel;
   said leg slidably engaging within said curved locking channel upon diverging said primary body with said secondary body for coupling said primary body with said secondary body;
   said leg slidably disengaging within said curved locking channel upon converging said primary body with said secondary body for decoupling said primary body with said secondary body;
   said leg slidably engaging within said groove during diverging and rotating said primary body relative to said secondary body and withdrawing said leg from said groove for decoupling said primary body with said secondary body;
   said curved locking channel includes a first general J-shaped locking channel within said bore wall; and
   said first general J-shaped locking channel defining a first recessed inset relative to said groove for requiring diverging said primary body with said secondary body for coupling said primary body with said secondary body and converging said primary body with said secondary body for decoupling said primary body with said secondary body.

2. The clasp as set forth in claim 1, further including a second groove within said bore wall extending from a second proximal end and a second distal end;
   said second distal end commensurate to said primary distal end;
   a second curved locking channel coupled to said second proximal end of said second groove;
   a second leg extending from said rod wall adjacent to said rod distal end;
   said second leg slidably engaging within said second groove during converging and rotating said primary body relative to said secondary body and positioning said second leg adjacent to said second curved locking channel;
   said second leg slidably engaging within second curved locking channel upon diverging said primary body with said secondary body for coupling said primary body with said secondary body;
   said second leg slidably disengaging within said second curved locking channel upon converging said primary body with said secondary body for decoupling said primary body with said secondary body; and
   said second leg slidably engaging within said second groove during diverging and rotating said primary body relative to said secondary body and withdrawing second leg from said second groove for decoupling said primary body with said secondary body.

3. The clasp as set forth in claim 2, wherein said groove includes a first spiral groove; and said second groove includes a second spiral groove.

4. The clasp as set forth in claim 2, wherein said second curved locking channel includes a second general J-shaped locking channel.

5. The clasp as set forth in claim 2, further including a spring within said bore; and
   said spring being compressed between said bore proximal end and said rod distal end during said leg slidably engaging within said spiral groove and said second leg slidably engaging within said second spiral groove during converging and rotating said primary body relative to said secondary body;
   said spring applying an expansion force between said bore proximal end and said rod distal end during said leg slidably engaging within said curved locking channel and said second leg slidably engaging within said second curved locking channel upon diverging said primary body relative to said secondary body;
   said expansion force maintaining said leg within said first curved locking channel and said second leg within said second curved locking channel for preventing inadvertent separation of said primary body and said secondary body;
   said spring being compressed between said bore proximal end and said rod distal end during said leg slidably disengaging within said first curved locking channel and said second leg slidably disengaging within said second curved locking channel upon converging said primary body with said secondary body; and
   said spring applying said expansion force between said bore proximal end and said rod distal end during said leg slidably engaging within said groove and said second leg slidably engaging within said second groove during diverging and rotating said primary body relative to said secondary body.

6. The clasp as set forth in claim 5, further including a spring retainer coupled to said bore wall and approximate to said bore proximal end; and
   said spring retainer maintaining said spring within said bore during separation of said primary body and said secondary body.

7. The clasp as set forth in claim 2, wherein said leg includes a front half surface and a rear half surface;
   said front half surface of said leg includes a first general C-shape;
   said rear half surface of said leg includes a first general V-shape;
   said second leg includes a front half surface and a rear half surface;
   said front half surface of said second leg includes a second general C-shape;
   said rear half surface of said second leg includes a second general V-shape;
   said curved locking channel includes a first general V-shape wall for receiving said first general V-shape and assisting in preventing displacement of said leg relative to said curved locking channel during coupling of said primary body with said secondary body; and
   said second curved locking channel includes a second general V-shape wall for receiving said second general V-shape and assisting in preventing displacement of said second leg relative to said second curved locking channel during coupling of said primary body with said secondary body.

8. The clasp as set forth in claim 7, wherein said curved locking channel includes an first upper entrance wall opposing a first lower entrance wall and a first guide wall adjacent to a first terminal wall;
   said first general V-shape wall between said first upper entrance wall and said first terminal wall;
   said first guide wall, said first terminal wall and said first general V-shape wall defining a first locking chamber for preventing the inadvertent removal of said first leg from said first locking chamber;
   said second curved locking channel includes an second upper entrance wall opposing a second lower entrance wall and a second guide wall adjacent to a second terminal wall;
   said second general V-shape wall between said second upper entrance wall and said second terminal wall; and
   said second guide wall, said second terminal wall and said second general V-shape wall defining a second locking chamber for preventing the inadvertent removal of said second leg from said second locking chamber.

9. The clasp as set forth in claim 8, wherein said first lower entrance wall includes a first accurate wall for promoting said leg to be channeled into said first locking chamber; and
   said second lower entrance wall includes a second accurate wall for promoting said second leg to be channeled into said second locking chamber.

10. The clasp as set forth in claim 8, wherein said first upper entrance wall and said first general V-shape wall define a first upper intersection and a first upper angle there between;
    said first lower entrance wall and said first guide wall define a first lower intersection and a first lower angle there between;
    said first guide wall and said first terminal wall define a first main intersection and a first main angle there between;

said first lower intersection defining a first interior offset into said first locking chamber relative to said first upper intersection for preventing the inadvertent removal of said first leg from said first locking chamber;

said second upper entrance wall and said second general V-shape wall define a second upper intersection and a second upper angle there between;

said second lower entrance wall and said second guide wall define a second lower intersection and a second lower angle there between;

said second guide wall and said second terminal wall define a second main intersection and a second main angle there between; and said second lower intersection defining a second interior offset into said second locking chamber relative to said second upper intersection for preventing the inadvertent removal of said second leg from said second locking chamber.

11. The clasp as set forth in claim 8, wherein said first upper entrance wall and said first general V-shape wall define a first upper intersection and a first upper angle there between;

said first lower entrance wall and said first guide wall define a first lower intersection and a first lower angle there between;

said first guide wall and said first terminal wall define a first main intersection and a first main angle there between;

said first general V-shape wall defining said first recessed inset relative to said first upper intersection;

said first recessed inset preventing the inadvertent removal of said first leg from said first locking chamber;

said second upper entrance wall and said second general V-shape wall define a second upper intersection and a second upper angle there between;

said second lower entrance wall and said second guide wall define a second lower intersection and a second lower angle there between;

said second guide wall and said second terminal wall define a second main intersection and a second main angle there between;

said second general V-shape wall defining a second recessed inset relative to said second upper intersection; and said second recessed inset preventing the inadvertent removal of said second leg from said second locking chamber.

12. The clasp as set forth in claim 8, wherein said first upper entrance wall and said first general V-shape wall define a first upper intersection and a first upper angle there between;

said first lower entrance wall and said first guide wall define a first lower intersection and a first lower angle there between;

said first guide wall and said first terminal wall define a first main intersection and a first main angle there between;

said first upper angle is a first reflex angle;
said first lower angle is an first primary obtuse angle;
said first main angle is a first secondary obtuse angle;
said first reflex angle, said first primary obtuse angle and said first secondary obtuse angle promoting said first leg to be channeled into said first general V-shape wall;

said second upper entrance wall and said second general V-shape wall define a second upper intersection and a second upper angle there between;

said second lower entrance wall and said second guide wall define a second lower intersection and a second lower angle there between;

said second guide wall and said second terminal wall define a second main intersection and a second main angle there between;

said second upper angle is a second reflex angle;
said second lower angle is an second primary obtuse angle;
said second main angle is a second secondary obtuse angle; and
said second reflex angle, said second primary obtuse angle and said second secondary obtuse angle promoting said second leg to be channeled into said second general V-shape wall.

13. The clasp as set forth in claim 1, wherein said primary body includes a primary grasping area for handling said primary body; and said secondary body including a secondary grasping area for handling said secondary body.

14. The clasp as set forth in claim 1, wherein said proximal end of said primary body includes a primary eyelet for coupling with the first end of the elongated member; and said proximal end of said secondary body includes a secondary eyelet for coupling with the second end of the elongated member.

15. The clasp as set forth in claim 2, further including a first tapering groove extending from said distal end of said primary body to said groove;

a second tapering groove extending from said distal end of said primary body to said second groove; and said first tapering groove receiving said leg and said second tapering groove receiving said second leg for channeling said leg and said second leg into said first groove and said second groove respectively upon converging and said rotating said primary body relative to said secondary body.

16. The clasp as set forth in claim 2, further including a reinforcing cap coupled to said rod distal end for preventing wear between said spring and said rod.

17. A clasp for coupling a first elongated member with a second elongated member, comprising:

a primary body extending between a primary proximal end and a primary distal end;

a bore defining a bore wall within said primary body extending from a bore proximal end and a bore distal end;

said bore distal end commensurate with said primary distal end;

a groove within said bore wall extending from a first proximal end and a first distal end;

said first distal end commensurate to said primary distal end;

a curved locking channel within said bore wall and coupled to said first proximal end of said groove;

a pin coupled to said bore proximal end and extending within said bore;

said pin and said bore wall defining an annular channel;

said primary proximal end of said primary body coupled to the first elongated member;

a secondary body extending between a secondary proximal end and a secondary distal end;

a rod defining a rod wall extending from a rod proximal end and a rod distal end;

said rod proximal end coupled to said secondary distal end;

a leg extending from said rod wall adjacent to said rod distal end;

a pin bore within said rod for defining an annular shaft;

said secondary proximal end of said secondary body coupled to the second elongated member;

said pin inserting into said pin bore and said annular shaft slidably engaging within said annular channel during coupling and decoupling said primary body with said secondary body for aligning said primary body relative to said secondary body;

said leg slidably engaging within said groove during converging and rotating said primary body relative to said secondary body and positioning said leg adjacent to said curved locking channel;

said leg slidably engaging within said curved locking channel upon diverging said primary body with said secondary body for coupling said primary body with said secondary body;

said leg slidably disengaging within said curved locking channel upon converging said primary body with said secondary body for decoupling said primary body with said secondary body;

said leg slidably engaging within said groove during diverging and rotating said primary body relative to said secondary body and withdrawing said leg from said groove for decoupling said primary body with said secondary body;

said annular channel receiving said annular shaft during engaging of said leg with said groove and said leg with said curved locking channel.

18. The clasp as set forth in claim 17, wherein said pin extends between a pin proximal end and a pin distal end;

said pin distal end positioned to the exterior of said primary distal end for defining an alignment head;

said pin bore extending between a pin bore proximal end and a pin bore distal end;

said pin bore proximal end positioned within said secondary body for receiving said alignment head within said pin bore; and said alignment head inserted to said pin bore for aligning said bore relative to said rod.

19. The clasp as set forth in claim 17, further including a second groove within said bore wall extending from a second proximal end and a second distal end;

said second distal end commensurate to said primary distal end;

a second curved locking channel coupled to said second proximal end of said second groove;

a second leg extending from said rod wall adjacent to said rod distal end;

said second leg slidably engaging within said second groove during converging and rotating said primary body relative to said secondary body and positioning said second leg adjacent to said second curved locking channel;

said second leg slidably engaging within second curved locking channel upon diverging said primary body with said secondary body for coupling said primary body with said secondary body;

said second leg slidably disengaging within said second curved locking channel upon converging said primary body with said secondary body for decoupling said primary body with said secondary body; and said second leg slidably engaging within said second groove during diverging and rotating said primary body relative to said secondary body and withdrawing second leg from said second groove for decoupling said primary body with said secondary body.

20. The clasp as set forth in claim 19, wherein said groove includes a first spiral groove; and said second groove includes a second spiral groove.

21. The clasp as set forth in claim 19, wherein said curved locking channel includes a first general J-shaped locking channel; and said second curved locking channel includes a second general J-shaped locking channel.

22. The clasp as set forth in claim 19, further including a spring within said annular channel; and said spring being compressed between said bore proximal end and said rod distal end during said leg slidably engaging within said spiral groove and said second leg slidably engaging within said second spiral groove during converging and rotating said primary body relative to said secondary body;

said spring applying an expansion force between said bore proximal end and said rod distal end during said leg slidably engaging within said curved locking channel and said second leg slidably engaging within said second curved locking channel upon diverging said primary body relative to said secondary body;

said expansion force maintaining said leg within said first curved locking channel and said second leg within said second curved locking channel for preventing inadvertent separation of said primary body and said secondary body;

said spring being compressed between said bore proximal end and said rod distal end during said leg slidably disengaging within said first curved locking channel and said second leg slidably disengaging within said second curved locking channel upon converging said primary body with said secondary body; and said spring applying said expansion force between said bore proximal end and said rod distal end during said leg slidably engaging within said groove and said second leg slidably engaging within said second groove during diverging and rotating said primary body relative to said secondary body.

23. The clasp as set forth in claim 19, further including a spring within said annular channel; and said spring being compressed between said bore proximal end and said rod distal end during said leg slidably engaging within said spiral groove and said second leg slidably engaging within said second spiral groove during converging and rotating said primary body relative to said secondary body;

said spring applying an expansion force between said bore proximal end and said rod distal end during said leg slidably engaging within said curved locking channel and said second leg slidably engaging within said second curved locking channel upon diverging said primary body relative to said secondary body;

said expansion force maintaining said leg within said first curved locking channel and said second leg within said second curved locking channel for preventing inadvertent separation of said primary body and said secondary body;

said spring being compressed between said bore proximal end and said rod distal end during said leg slidably disengaging within said first curved locking channel and said second leg slidably disengaging within said second curved locking channel upon converging said primary body with said secondary body;

said spring applying said expansion force between said bore proximal end and said rod distal end during said leg slidably engaging within said groove and said second leg slidably engaging within said second groove during diverging and rotating said primary body relative to said secondary body;

a spring retainer coupled to said bore wall and approximate to said bore proximal end; and said spring retainer maintaining said spring within said bore during separation of said primary body and said secondary body.

24. The clasp as set forth in claim 19, further including a spring within said pin bore; and said spring being compressed between said pin bore proximal end and said pin distal end during said leg slidably engaging within said groove and said second leg slidably engaging within said second groove during converging and rotating said primary body relative to said secondary body;

said spring applying an expansion force between said pin bore proximal end and said pin distal end during said leg slidably engaging within said curved locking channel and said second leg slidably engaging within said second curved locking channel upon diverging said primary body relative to said secondary body;

said expansion force maintaining said leg within said first curved locking channel and said second leg within said second curved locking channel for preventing inadvertent separation of said primary body and said secondary body;

said spring being compressed between said pin bore proximal end and said pin distal end during said leg slidably disengaging within said first curved locking channel and said second leg slidably disengaging within said second curved locking channel upon converging said primary body with said secondary body;

said spring applying said expansion force between said pin bore proximal end and said pin distal end during said leg slidably engaging within said groove and said second leg slidably engaging within said second groove during diverging and rotating said primary body relative to said secondary body;

a spring retainer coupled to said a pin bore wall and approximate to said pin bore proximal end; and said spring retainer maintaining said spring within said pin bore during separation of said primary body and said secondary body.

25. A clasp for coupling a first elongated member with a second elongated member, comprising:

a primary body extending between a primary proximal end and a primary distal end;

a bore defining a bore wall within said primary body extending from a bore proximal end and a bore distal end;

said bore distal end commensurate with said primary distal end;

a groove within said bore wall extending from a first proximal end and a first distal end;

said first distal end commensurate to said primary distal end;

a shaped locking channel within said bore wallcoupled to said first proximal end of said groove;

said primary proximal end of said primary body coupled to the first elongated member;

a secondary body extending between a secondary proximal end and a secondary distal end;

a rod defining a rod wall extending from a rod proximal end and a rod distal end;

said rod proximal end coupled to said secondary distal end;

a leg extending from said rod wall adjacent to said rod distal end;

said secondary proximal end of said secondary body coupled to the second elongated member;

said leg slidably engaging within said groove during converging and rotating said primary body relative to said secondary body and positioning said leg adjacent to said shaped locking channel;

said leg slidably engaging within said shaped locking channel upon diverging said primary body with said secondary body for coupling said primary body with said secondary body;

said leg slidably disengaging within said shaped locking channel upon converging said primary body with said secondary body for decoupling said primary body with said secondary body;

said leg slidably engaging within said groove during diverging and rotating said primary body relative to said secondary body and withdrawing said leg from said groove for decoupling said primary body with said secondary body;

said shaped locking channel includes a first general J-shaped locking channel within said bore wall; and said first general J-shaped locking channel defining a first recessed inset relative to said groove for requiring diverging said primary body with said secondary body for coupling said primary body with said secondary body and converging said primary body with said secondary body for decoupling said primary body with said secondary body.

26. A clasp for coupling a first elongated member with a second elongated member, comprising:

a primary body extending between a primary proximal end and a primary distal end;

a bore defining a bore wall within said primary body extending from a bore proximal end and a bore distal end;

said bore distal end commensurate with said primary distal end;

a groove within said bore wall extending from a first proximal end and a first distal end;

said first distal end commensurate to said primary distal end;

a shaped locking channel within said bore wall and coupled to said first proximal end of said groove;

a pin coupled to said bore proximal end and extending within said bore;

said pin and said bore wall defining an annular channel;

said primary proximal end of said primary body coupled to the first elongated member;

a secondary body extending between a secondary proximal end and a secondary distal end;

a rod defining a rod wall extending from a rod proximal end and a rod distal end;

said rod proximal end coupled to said secondary distal end;

a leg extending from said rod wall adjacent to said rod distal end;

a pin bore within said rod for defining an annular shaft;

said secondary proximal end of said secondary body coupled to the second elongated member;

said pin inserting into said pin bore and said annular shaft slidably engaging within said annular channel during coupling and decoupling said primary body with said secondary body for aligning said primary body relative to said secondary body;

said leg slidably engaging within said groove during converging and rotating said primary body relative to said secondary body and positioning said leg adjacent to said shaped locking channel;

said leg slidably engaging within said shaped locking channel upon diverging said primary body with said secondary body for coupling said primary body with said secondary body;

said leg slidably disengaging within said shaped locking channel upon converging said primary body with said secondary body for decoupling said primary body with said secondary body;

said leg slidably engaging within said groove during diverging and rotating said primary body relative to said secondary body and withdrawing said leg from said groove for decoupling said primary body with said secondary body;

said shaped locking channel includes a first general J-shaped locking channel within said bore wall; and said first general J-shaped locking channel defining a first recessed inset relative to said groove for requiring diverging said primary body with said secondary body for coupling said primary body with said secondary body and converging said primary body with said secondary body for decoupling said primary body with said secondary body.

27. A clasp for coupling a first elongated member with a second elongated member, comprising:
 a primary body extending between a primary proximal end and a primary distal end;
 a bore defining a bore wall within said primary body extending from a bore proximal end and a bore distal end;
 said bore distal end commensurate with said primary distal end;
 a pin coupled to said bore proximal end and extending within said bore;
 said pin and said bore wall defining an annular channel;
 a leg coupled to said pin and extending into said annular channel;
 said primary proximal end of said primary body coupled to the first elongated member;
 a secondary body extending between a secondary proximal end and a secondary distal end;
 a rod defining an exterior rod wall extending from a rod proximal end and a rod distal end;
 said rod proximal end coupled to said secondary distal end;
 a pin bore within said rod for defining an annular shaft and an interior rod wall;
 a groove within said interior rod wall extending from a first proximal end and a first distal end;
 said first distal end commensurate to said rod distal end;
 a locking channel coupled to said first proximal end of said groove;
 said secondary proximal end of said secondary body coupled to the second elongated member;
 said annular shaft inserting into said bore and said annular shaft slidably engaging within said annular channel during coupling and decoupling said primary body with said secondary body for aligning said primary body relative to said secondary body;
 said leg slidably engaging within said groove during converging and rotating said primary body relative to said secondary body and positioning said leg adjacent to said locking channel;
 said leg slidably engaging within said locking channel upon diverging said primary body with said secondary body for coupling said primary body with said secondary body;
 said leg slidably disengaging within said locking channel upon converging said primary body with said secondary body for decoupling said primary body with said secondary body; and
 said leg slidably engaging within said groove during diverging and rotating said primary body relative to said secondary body and withdrawing said leg from said groove for decoupling said primary body with said secondary body.

* * * * *